United States Patent
de los Reyes

(10) Patent No.: US 10,518,222 B2
(45) Date of Patent: *Dec. 31, 2019

(54) CYCLING ULTRA-THIN CHANNEL FILTRATION

(71) Applicant: SPF Technologies LLC, Somerville, MA (US)

(72) Inventor: Gaston de los Reyes, Somerville, MA (US)

(73) Assignee: SPF TECHNOLOGIES, LLC, Somerville, MA (US)

( * ) Notice: Subject to any disclaimer, the term of this patent is extended or adjusted under 35 U.S.C. 154(b) by 86 days.

This patent is subject to a terminal disclaimer.

(21) Appl. No.: 15/368,615

(22) Filed: Dec. 4, 2016

(65) Prior Publication Data

US 2017/0095774 A1    Apr. 6, 2017

Related U.S. Application Data

(63) Continuation-in-part of application No. 14/915,888, filed as application No. PCT/US2014/056715 on Sep. 22, 2014, now Pat. No. 9,511,326.

(60) Provisional application No. 61/880,972, filed on Sep. 22, 2013.

(51) Int. Cl.
*B01D 65/02* (2006.01)
*B01D 61/22* (2006.01)
*B01D 61/14* (2006.01)

(52) U.S. Cl.
CPC ........... *B01D 65/02* (2013.01); *B01D 61/145* (2013.01); *B01D 61/147* (2013.01); *B01D 61/22* (2013.01); *B01D 2313/24* (2013.01); *B01D 2321/04* (2013.01)

(58) Field of Classification Search
CPC ........... B01D 2313/18; B01D 2313/24; B01D 2315/16; B01D 2321/02; B01D 2321/04; B01D 61/14; B01D 61/22; B01D 63/02; B01D 63/087; B01D 63/088; B01D 65/022; B01D 69/081
USPC .......................................... 210/636, 637, 98
See application file for complete search history.

(56) References Cited

U.S. PATENT DOCUMENTS

| 4,110,220 A * | 8/1978 | Lavender | B01D 63/082 210/321.75 |
| 5,065,551 A * | 11/1991 | Fraser | B05B 7/1431 451/40 |
| 7,384,549 B2 * | 6/2008 | de los Reyes | B01D 61/14 210/321.72 |
| 8,231,788 B2 | 7/2012 | Mir et al. | |

(Continued)

OTHER PUBLICATIONS

EP Extended Search Report EP 14845977.9 / 304660, dated Apr. 5, 2017, pp. 6.

(Continued)

*Primary Examiner* — Dirk R Bass
(74) *Attorney, Agent, or Firm* — Barry Gaiman

(57) ABSTRACT

A cycling ultra-thin channel filtration (cUTF) method, system and module are disclosed for concentration and purification of biomolecules. In one embodiment, a cUTF system includes a cUTF module and a cycle controller to load a feed aliquot of a feed stream into the cUTF module inducing permeation of the feed stream to build a boundary layer by pressurizing the feed stream, to stop permeation and to recover a retentate aliquot in a repeating cycle.

19 Claims, 24 Drawing Sheets

(56) References Cited

U.S. PATENT DOCUMENTS

| | | | |
|---|---|---|---|
| 8,747,669 B1* | 6/2014 | Bonner | B01L 3/50255 |
| | | | 210/321.6 |
| 2009/0057210 A1 | 3/2009 | Barrett et al. | |
| 2009/0098250 A1* | 4/2009 | Py | A23L 2/46 |
| | | | 426/62 |
| 2009/0277833 A1* | 11/2009 | Mir | B01D 61/145 |
| | | | 210/637 |
| 2011/0008866 A1 | 1/2011 | Dibel et al. | |
| 2011/0100909 A1 | 5/2011 | Stange | |
| 2011/0309018 A1 | 12/2011 | Kopf et al. | |
| 2012/0091060 A1 | 4/2012 | Hamatschek et al. | |

OTHER PUBLICATIONS

International Search Report and the Written Opinion, PCT/US2014/056715, dated Dec. 15, 2014, pp. 4.

Written Opinion of the ISA, PCT/US2014/056715, dated Dec. 15, 2014, pp. 4.

* cited by examiner

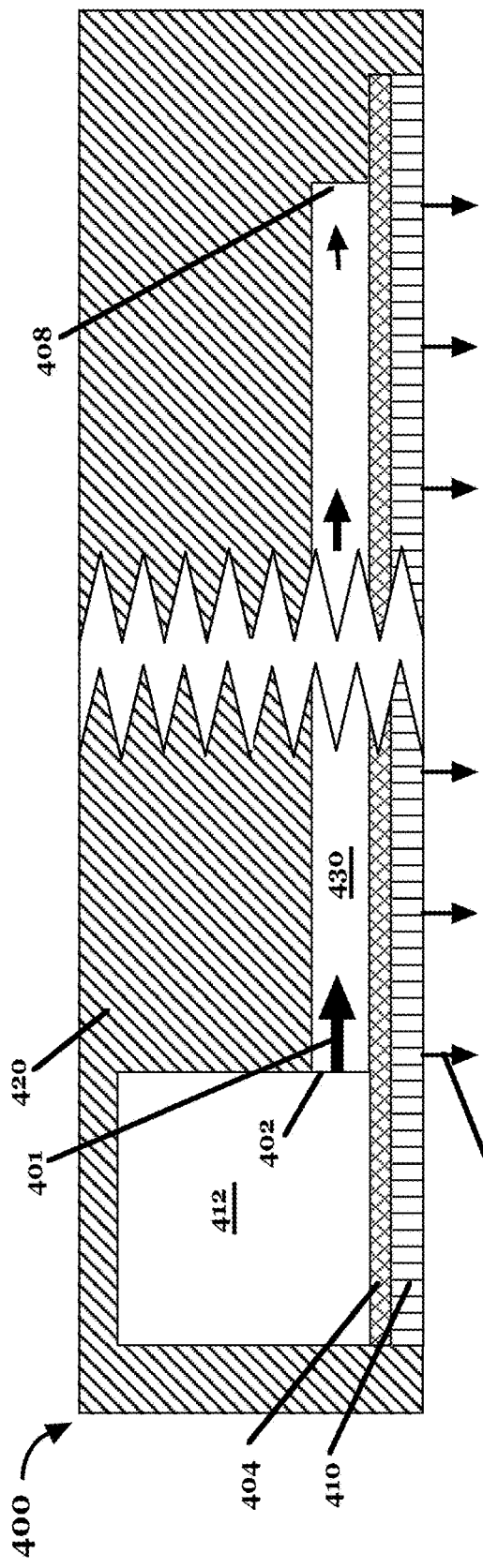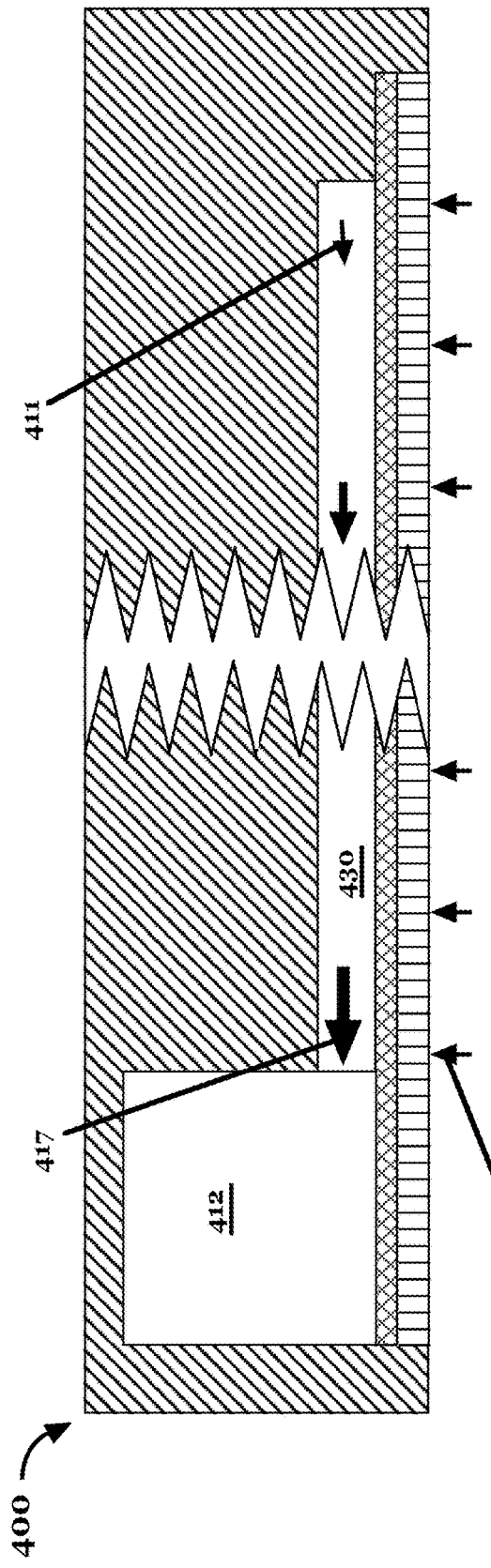

$h_e = \frac{1}{2}h$ $h_e = \frac{1}{4}h$ $h_e = \dfrac{h}{2\sqrt{1+4\left(\dfrac{h}{w}\right)^2}}$

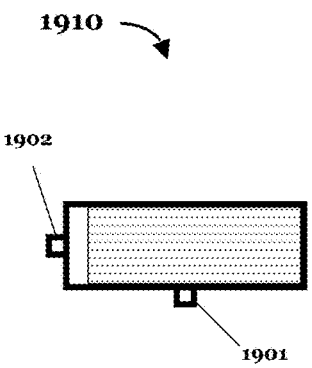
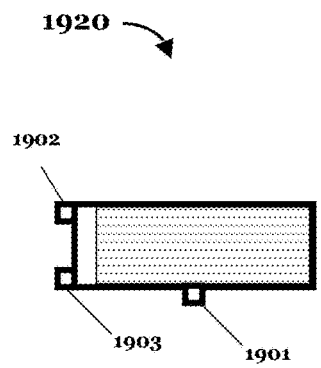
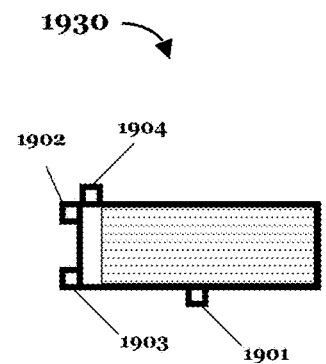
Fig. 19A  Fig. 19B  Fig. 19C
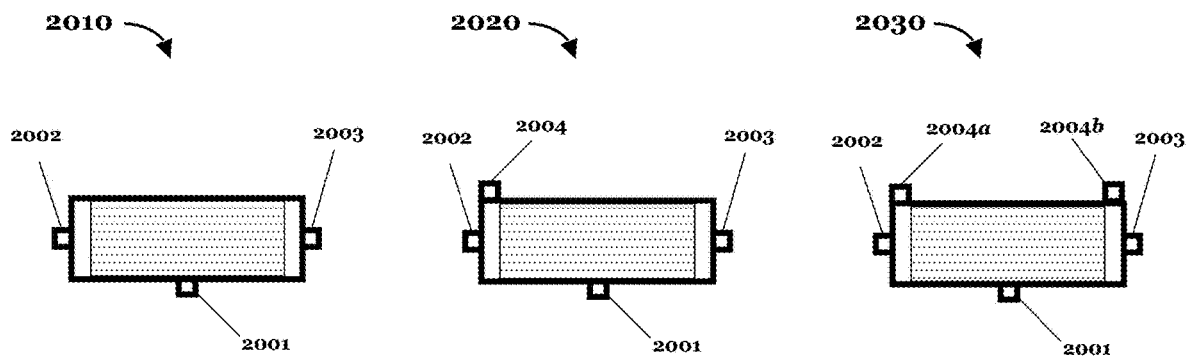
Fig. 20A  Fig. 20B  Fig. 20C

CYCLING ULTRA-THIN CHANNEL FILTRATION

FIELD OF THE INVENTION

Embodiments of the present invention include a filter device intended for separation and purification of components from biological material and other fluids. This invention relates to membrane purification, more specifically to purification with microfiltration ("MF") and ultrafiltration ("UF") membranes.

BACKGROUND OF THE INVENTION

Ultrafiltration (UF) and microfiltration (MF) membranes have become essential to the separation and purification in manufacture of biomolecules. Biomolecular manufacturing, regardless of its scale, generally employs one or more steps using filtration. The attractiveness of these membrane separations rests on several features including, for example, high separation power, and simplicity, requiring only the application of pressure differentials between feed and permeate. This simple and reliable one-stage filtering of the sample into two fractions makes membrane separation a valuable approach to separation and purification.

In one class of membrane separations, the species of interest is retained by the membrane, in which case the objective of the separation is typically to remove smaller contaminants, to concentrate the solution, or to effect a buffer exchange using diafiltration. In another class of membrane separations, the species of interest is that which permeates through the filter, and the objective is typically to remove larger contaminants. In MF, the retained species are generally particulates, organelles, bacteria or other microorganisms, and species that permeate are proteins, colloids, peptides, small molecules and ions. In UF the retained species are typically proteins and, in general, macromolecules, and species that permeate are peptides, ions and, in general, small molecules.

Permeation flux, also referred to as flux, is the permeation velocity of a solution through a filter. The ability to maintain a reasonably high flux is essential in the membrane separation filtration process. Low flux can result in long filtration times or require large filter assemblies, resulting in increased cost and large hold-up volumes retained in the modules and associated filter system equipment. The filtration process itself induces the creation of a highly concentrated layer of the retained species on the surface of the membrane, a phenomenon referred to as "concentration polarization," which reduces the flux from initial membrane conditions. In the absence of counter measures, accumulation of retained particles or solutes on the surface of the membrane results in decreased flux and if not corrected the filtering process ceases to function efficiently. A conventional approach to overcoming the effects of concentration polarization in the practice of microfiltration and ultrafiltration is to operate the separation process in tangential flow filtration (TFF) mode.

TFF filters, modules and systems include devices having retentate channels formed by membranes through which the feed stream flows tangentially to the surface of the membrane. The tangential flow induces a sweeping action that reduces the thickness of the boundary layer, removes the retained species and prevents accumulation, thereby maintaining a high and stable flux. Because higher tangential velocities produce higher fluxes, the conventional practice of TFF requires the use of high velocities in the retentate channels, which in turn result in very high feed rates. These high feed rates result in low conversion, typically less than about 10 percent and often less than about five percent. Low conversion means that the bulk of the feed stream exits the module as retentate in a first pass without being materially concentrated in the retained solutes. Since many UF separations require high concentration factors, as high as about 99 percent, the retentate is typically recirculated back to the inlet of that module for further processing. This process requires recirculation loops. Systems with recirculation loops are complicated by the requirement of additional piping, storage, heat exchangers, valves, sensors and control instrumentation. Additionally, these systems are operated in batch mode resulting in undesirable effects, including subjecting the feed solution to processing conditions for long time periods often several hours.

A commercially important area for UF separations and purification is the purification of biomolecules for therapeutic drugs. Both naturally derived and genetically engineered biomolecules require multiple TFF steps to concentrate the biomolecule and to purify the biomolecule, including a process to wash the biomolecule by a process known as diafiltration. These TFF steps require custom systems to carry out batch processes that last several hours requiring large in-process tanks to hold the batch while it is being processed. These custom systems have large hold up volumes, are complicated and expensive, and have other limitations.

A commercially important area for UF separations and purification is the preparation of analytical samples (e.g., sample volumes less than about 1000 ml). The application of conventional TFF processes to sample preparation at the analytical scale is generally believed to be unpractical due to complications inherent in the use of pumps and recirculation loops. As a result, UF separations at these scales are practiced almost exclusively in a "dead-ended" mode, resulting in an inherently low flux due to concentration polarization. Centrifugal UF devices have been developed for this scale to mitigate the low flux of dead-ended UF separations. However, while these have become the dominant format for analytical scale UF, they typically require centrifuges capable of exposing the UF device to accelerations as high as 14,000 g. Furthermore, in spite of these accelerations, many separations still require long time periods, as long as one hour. Finally, the recovery of the retentate presents special difficulties in these approaches since it may be spread as a thin film over the surface of the membrane.

TFF has been the dominant method for the practice of MF and UF in manufacturing processes, whereas dead-ended centrifugal filtration has become the dominant method for processing of analytical samples. Other methods to practice MF and UF have been developed.

Dynamic membrane filtration is a class of filtration methods whereby the surface of the membrane is actively disrupted or agitated to induce mixing and reduce concentration polarization. Multiple dynamic filtration methods have been developed and commercialized, among them: Taylor vortex filtration (U.S. Pat. No. 7,425,265 to Schoendorfer; U.S. Pat. Nos. 4,670,147, 7,220,354 and 7,374,677 to Schoendorfer and McLaughlin); spinning disc filtration (SpinTek™ filtration system from SpinTek Corporation); vibrating membrane filtration (Vsep™ filters from New Logic and PallSep™ filter from Pall Corporation). These methods are effective in some applications but the filter modules and/or the systems are complex or expensive. In Taylor vortex and spinning disc devices the boundary layer at the surface of the membrane is disrupted by "active" mixing of the fluid in the retentate channel. In vibrating membrane filtration the filter modules and their holders are subjected to very high accelerations and torsional stresses and are prone to mechanical failure.

More recently single-pass TFF ("SP-TFF") has been developed (U.S. Pat. Nos. 7,384,549, 7,682,511, 7,967,987 and 8,157,999 to de los Reyes and Mir). According to this mode of filtration, SP-TFF modules have long and thin channels, with or without internal staging, that enable high conversion in a single pass. SP-TFF has the advantages of TFF without the complexity of the recirculation loop. Because it is inherently a TFF process this technique has been rapidly adopted in bioprocessing for concentration processes. Diafiltration SP-TFF modules and processes have not yet been developed possibly because of the increased complexity of the flow distributors inside the module for the diafiltrate stream, lower productivity in comparison with conventional TFF and increased buffer consumption. In summary, SP-TFF modules and processes have found important applications in bioprocessing, but their rate of adoption has been limited due to the increased complexity of the internally staged SP-TFF modules.

SUMMARY OF INVENTION

A need still exists for a MF and UF processes suitable for bioprocessing which are able to yield high conversion, high productivity and lower buffer consumption without the need of recirculation loops, intermediate pumps, and without the complexity of the systems and the modules of the single-pass processes developed to date. It would be desirable to operate a bio-processing separation process in a single pass mode without a recirculation loop while providing a high conversion with a relatively low hold up volume and simple separation modules. It would be further desirable to operate the separation without the requirement of a high capacity feed pump and associated system interconnections. Operation of a diafiltration process in a single pass mode with simple separation modules would also be desirable especially when the technique does not require high buffer consumption. It would also be desirable to reduce bioprocessing system cost by reducing the complexity of the system and by using simpler more versatile separation modules.

All membrane separation processes in which the target species is retained by the membrane have as a first objective the concentration of the target species, and in the case of diafiltration processes, washing the retained species in a concentrated state. Embodiments disclosed herein result from the observation that when the target species is retained, the target species becomes accumulated in the retentate channel as a highly concentrated boundary layer (BL) on the surface of the membrane, and that it is not just possible, but advantageous to recover the BL directly from the surface of the membrane, and in the case of diafiltration processes, to wash the BL directly on the surface of the membrane. In effect, embodiments of the present invention teach away from conventional TFF devices and processes. Rather than mitigate the effects of concentration polarization by sweeping of the BL out of the retentate channel, or reducing its thickness by mixing of the bulk stream flowing within the retentate channel to maintain constant and practical permeation, embodiments of the present invention deliberately promote concentration polarization to build a BL on the surface of the membrane, followed by effective washing and recovery of the concentrated BL layer.

The inventor has discovered that the BL can be effectively recovered with minimal dilution by using a module having channels characterized by thicknesses that are of the same order of magnitude as the thickness of the BL. These channels are referred herein as ultra-thin channels, and have channel dimensions smaller that 150 µm, smaller than 100 µm in some embodiment and still smaller than 50 µm in other embodiments. When ultra-thin channels are combined with a cycling process (e.g., where the BL is first built by operating the filtration module in full dead-ended mode, followed by recovery of the built up BL) high and sustainable productivity can be achieved, equal or superior to that possible with conventional TFF. The result is a continuous rapid cycling process, with full cycles shorter than ten minutes in certain embodiments, shorter than five minutes, and as short as 90 seconds in other embodiments.

It contrast to the conventional wisdom and established practices of tangential flow filtration, which attempts to eliminate or reduce the thickness of the concentrated stagnant film on the surface of the membrane, embodiments disclosed herein exploit the formation of a highly concentrated stagnant film of the retained species on the surface of a membrane (i.e., building a BL) in combination with a rapid cycling process, referred to herein as Cycling Ultra-Thin Channel Filtration (cUTF) and corresponding devices and systems are referred to herein as cUTF modules and cUTF systems, respectively.

In one embodiment, an exemplary cUTF system includes a cUTF module having a filtration membrane separating an interior of said cUTF module into a retentate compartment and a permeate compartment, a feed port fluidly coupled to a first end of the retentate compartment, a retentate port fluidly coupled to a second end of the retentate compartment, a permeate port fluidly coupled to the permeate compartment, a retentate valve coupled to the retentate port and a permeate pressurization valve coupled to the permeate port. The cUTF system further includes a cycle controller controllably connected to the retentate valve and the permeate pressurization valve. The cycle controller includes at least one of: a timing circuit to control the retentate valve and the permeate pressurization valve, a load detector to control the retentate valve and the permeate pressurization valve and a recovery detector to control the retentate valve and the permeate pressurization valve.

Such a cUTF module and system provide the following advantages: cUTF modules are highly versatile as the same module can be used for many applications. Modules having smaller channel heights may be desirable in some applications, but the same module can be used for all applications and cUTF modules are linearly scalable over a very large dynamic range, from several milliliters to thousands of liters. In another embodiment, the retentate compartment further includes an array of substantially similar channels having a feed end fluidly coupled to the feed port and a retentate end fluidly coupled to the retentate port, a plurality of feed distribution passageways in fluid communication with the feed end of the array of substantially similar channels and a plurality of retentate distribution passageways in fluid communication with the retentate end of the array of substantially similar channels. In yet another embodiment, each of the substantially similar channels has an effective channel height less than about 150 µm and a dimensionless length less than about 1000.

In a further embodiment, the cUTF module further includes at least one wash port and a corresponding wash shut-off valve connected to the cycle controller controllably coupling a wash source through a plurality of wash distribution passageways to at least one of the feed end of the array of substantially similar channels and the retentate end of the array of substantially similar channels. In a still further embodiment, the plurality of feed distribution passageways and the plurality of retentate distribution passageways include isoflow distributors.

In another embodiment, the cUTF module further includes a first planar sheet having a first surface, a first plurality of grooves embedded in the first surface and a second surface, a second planar sheet having a third surface, a third plurality of grooves embedded in the third surface and a fourth surface. The filtration membrane includes a planar membrane disposed between the first and third surfaces where each channel of the array of substantially similar channels forming the retentate compartment is formed by a corresponding one of the first plurality of grooves and a portion of the planar membrane disposed between the first and second planar sheets and where the permeate compartment is formed by the third plurality of grooves and a portion of the planar membrane disposed between the first and second planar sheets.

In another embodiment, the first and second planar sheets include one or more of etched glass plates, etched metal plates, etched silicon plates or molded plastic plates and sheets.

The cUTF system can further include a second plurality of grooves embedded in the second surface forming a plurality of feed distribution passageways in fluid communication with the feed end of the array of substantially similar channels, and a fourth plurality of grooves embedded in the fourth surface forming a plurality of permeate distribution passageways in fluid communication with the permeate compartment. In another embodiment, the cUTF system further includes a permeate pressurizer fluidly coupled to the permeate port, the permeate pressurizer including a permeate accumulator fluidly coupled to the permeate port and coupled to a ventable pressure source and the permeate pressurization valve. The ventable pressure source includes in one embodiment a pressure source coupled to the permeate accumulator through a three-way valve; in some embodiments the ventable pressure source is a compressed gas, e.g., compressed air.

In other embodiments, the load detector includes at least one sensor to detect a volume or a mass of a feed aliquot; in other embodiments the recovery detector includes at least one sensor to detect a volume or mass of a retentate aliquot; in still other embodiments the cUTF system further includes a retentate aliquot cavity having an adjustable constant volume and fluidly coupled to the retentate port.

An exemplary cUTF process and method of fractionation of a feed stream includes providing a cycling ultra-thin channel filtration (cUTF) system having a cUTF module having a filtration membrane separating an interior of said cUTF module into a retentate compartment having an array of substantially similar channels and a permeate compartment, a feed port fluidly coupled to a feed end of the array of substantially similar channels, a retentate port fluidly coupled to a retentate end of the array of substantially similar channels and a permeate port fluidly coupled to the permeate compartment. The cUTF system further includes a retentate valve fluidly coupled to the retentate port and a permeate pressurization valve fluidly coupled to the permeate port. The method further includes loading a feed aliquot of the feed stream into cUTF module and inducing permeation of the feed stream to build a boundary layer by closing the retentate valve, opening the permeate pressurization valve and pressurizing the feed stream through the feed port. The method further includes stopping permeation by closing the permeate pressurization valve and recovering a retentate aliquot from the retentate port by opening the retentate valve. Such a method has a single degree of freedom, which is the load volume (the volume of the feed aliquot). The operating pressure is determined by the limits of the process equipment used to drive the feed stream such that the higher the feed pressure the higher the productivity of the process. The other operating parameters in a cUTF concentration processes are the load volume of the feed stream in a single cycle (the feed aliquot), and the volume of the retentate stream collected in a single cycle, the retentate aliquot. The desired concentration factor is determined by the ratio of these two volumes. Furthermore, since the volume of the retentate aliquot is approximately equal to the volume of the retentate compartment, once the concentration factor is specified, the volume of the feed aliquot is determined (e.g., if the desired concentration factor is 8, then the volume of the load aliquot will be equal to 8 times the volume of the retentate aliquot, which is approximately equal to the volume of the retentate compartment of the cUTF module). Likewise, in cUTF washing processes there are two user-selectable parameters: the volume of the load aliquot and the volume of the wash aliquot in a single cycle, which are determined by the desired concentration factor and the desired wash removal factor. The simplicity of a cUTF process reduces the amount of effort required in the development and validation of cUTF processes.

In other embodiments, stopping permeation further includes pressurizing the permeate compartment to rapidly stop permeation, and recovering a retentate aliquot further includes inducing reverse permeation. In yet another embodiment, the process further includes recovering a predetermined constant volume of retentate aliquot on successive cycles. In a still further embodiment, the process further includes repeating the steps of: loading the feed aliquot; stopping permeation and recovering the retentate aliquot.

In a further embodiment, inducing reverse permeation further includes injecting the feed stream during reverse permeation or injecting a wash stream at a feed end of the cUTF module during reverse permeation. In yet another embodiment, the method further includes washing a built up boundary layer between the steps of loading and stopping permeation. In still another embodiment, washing includes washing on the feed end of the cUTF module followed by washing on the retentate end on each cycle of the cUTF module, or vice-versa.

Another embodiment includes controlling a volume of the feed aliquot by controlling one of: an elapsed time of loading a feed aliquot, a volume or mass of the feed stream injected or a permeate stream generated during a loading step; and controlling the volume of the retentate aliquot collected during a recovery step by controlling one of: an elapsed time of recovering a retentate aliquot, a volume or mass of the retentate aliquot collected during the recovery step and a concentration on the retentate stream collected during the recovery step.

In another embodiment, a feed pressure exceeds 276 kPa (40 psi). In a further embodiment, the method includes providing variable air pressure to assist in shutting off the at least one of: a feed valve, the retentate valve and the permeate pressurization valve. In yet another embodiment, the method further includes distributing the feed aliquot substantially equally across each of the array of substantially similar channels by using an isoflow distributor. An in still another embodiment, loading a feed aliquot further includes detecting a volume of the feed aliquot.

Embodiments disclosed herein simplify the design and manufacture of membrane modules, systems and processes suitable for concentration and purification of biomolecules. Embodiments disclosed herein improve the productivity of existing concentration and washing processes. Embodiments disclosed herein reduce the amount of buffer consumed in washing processes. Embodiments disclosed herein make membrane modules linearly scalable, and make it easier to develop and validate concentration and washing processes. It is a further aspect of this invention to develop processes that are widely applicable, thereby making them very versatile. Embodiments disclosed herein facilitate the development of processes that have a very low residence time, enabling these processes to be easily coupled to other processes, to be operated at elevated temperatures without damage to the species of interest, to reduce the amount of product degraded by exposure to long processing times, and to enable continuous processing. The aspects of this invention and the improvements delivered over existing processes will become apparent in the descriptions below.

It is to be understood that the features of the cycle controller can be embodied strictly as a software program, as software and hardware, or as hardware alone such as within a single processor or multiple processors, or within an operating system or within a software application.

BRIEF DESCRIPTION OF THE SEVERAL VIEWS OF THE DRAWINGS

The foregoing and other aspects, embodiments, objects, features and advantages of the present teachings can be more fully understood from the following description in conjunction with the accompanying drawings. In the drawings, like reference characters generally refer to like features and structural elements throughout the various figures. The drawings are not necessarily to scale, emphasis instead being placed upon illustrating the principles of the present teachings. The following drawings are illustrative of embodiments of the invention and are not meant to limit the scope of the invention as encompassed by the claims.

FIGS. 4A and 4B are schematic diagrams of alternative embodiments of single-ended cUTF channels with a single passageway used as both feed and retentate manifolds as disclosed herein;

FIG. 19A is a schematic diagram of a single-ended cUTF module having two ports according to embodiments disclosed herein;

FIG. 19B is a schematic diagram of a single-ended cUTF module having three ports according to embodiments disclosed herein;

FIG. 19C is a schematic diagram of a single-ended cUTF module having four ports according to embodiments disclosed herein;

FIG. 20A is a schematic diagram of a double-ended cUTF module having three ports according to embodiments disclosed herein;

FIG. 20B is a schematic diagram of a double-ended cUTF module having four ports according to embodiments disclosed herein;

FIG. 20C is a schematic diagram of a double-ended cUTF module having five ports according to embodiments disclosed herein;

DETAILED DESCRIPTION OF THE INVENTION

Figure 1A:
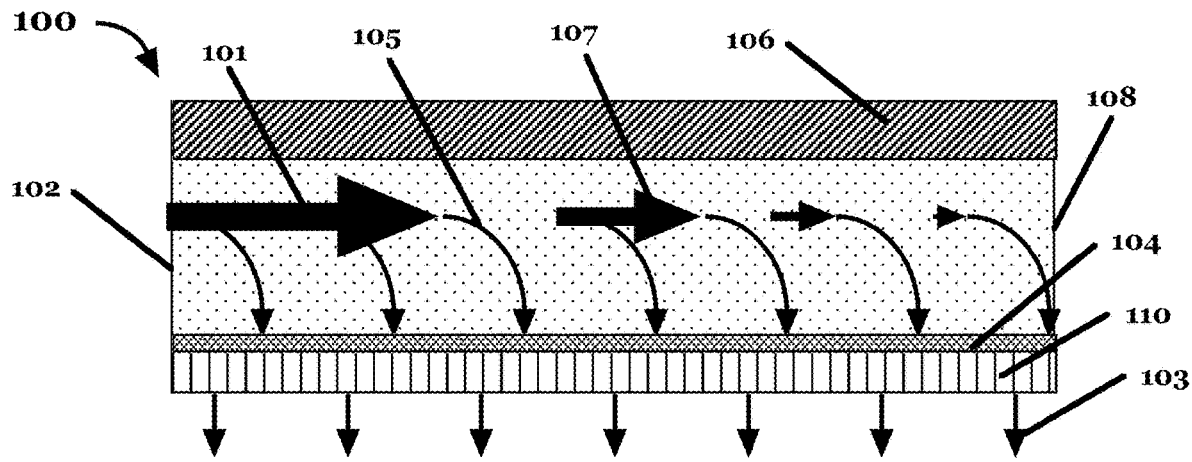
FIG. 1A is a schematic diagram of a cUTF channel used for concentration according to one embodiment as disclosed herein, shown here at the start of a loading step.

The inventor has discovered that effective recovery of the boundary layer (BL) of a desired retained species on the surface of the membrane is optimized using a retentate channel whose thickness is slightly larger than the thickness of the BL, referred to herein as ultra-thin channels. It is practical to recover the BL with minimum dilution if the BL occupies a large fraction of the volume of the retentate channel Another discovery is the use of sufficiently short channels to obtain full or nearly full displacement of the contents of the channel with minimum dilution. The greater channel length is associated with more mixing that occurs when the contents are being displaced. Another discovery is a recovery method that lifts the BL from the surface of the membrane by inducing reverse permeation, followed by effective displacement out of the channel Lifting the BL reduces the tendency of the BL to stick to the membrane and thereby remain within the channel.

Another discovery, arising from the cUTF process in conjunction with a use of a washing process, is that washing the BL directly on the surface of the membrane to remove the existing buffer by displacement with a new buffer permeating through the BL provides better performance than the conventional diafiltration approach requiring mixing followed by permeation. Another aspect of the invention is a multi-step concentration (CONC) process including at least two steps: loading and recovering. In a multi-step washing process, there are at least three steps: loading, washing and recovering. In one embodiment, these steps are performed in rapid succession, hereafter referred to as rapid cycling continuous processing. Some embodiments disclosed herein utilize planar membranes (planar cUTF modules) and hollow fiber membranes (hollow fiber cUTF modules) suitable for cUTF concentration and washing processes.

Reverse permeation is commonly used in conventional TFF processes in the form of back pulsing or back flushing steps to disrupt the boundary layer accumulated on the surface of the membrane and increase the permeation flux. According to this conventional practice, the permeate compartment is temporarily pressurized to a pressure higher than the pressure in the retentate compartment to induce reverse permeation thereby provoking the lifting of the boundary layer built on the surface of the membrane. The feed stream is fed to the module simultaneous to the back pulse as the retentate stream continues to be withdrawn from the module, the net effect results in mixing of the lifted BL with the bulk stream flowing through the retentate channel and sweeping of the mixed stream out of the module on the retentate end of the module. Back pulsing is thus a means of enhancing the sweeping and mixing action characteristic of TFF processes. In contrast, reverse permeation in the cUTF process is effected in a different manner and for a completely different and diametrically opposed purpose compared to back pulsing, namely, the collection of the BL built within the retentate channel with minimum mixing. Reverse permeation as used with embodiments disclosed herein also lifts the BL similar to conventional TFF processes, but it is performed in a manner that displaces the BL with minimum mixing so that the BL can be effectively collected as the retentate aliquot with minimum dilution. Furthermore, in a cUTF process, the BL is lifted with no injection of the feed stream or with a small controlled injection of the feed stream with the objective of displacement with minimum or no mixing in contrast to conventional practice.

The separation elements and separation devices of certain embodiments disclosed herein are based on planar membranes sandwiched by planar sheets suitable for high-performance filtration requiring thin channels (collectively referred to as membrane stacks). The channels are formed by grooves embedded on the inner surface of the planar sheets abutting the planar membrane in tight contact with the ribs on the sidewalls of the grooves. Such channels are characterized by having membrane on only one portion of the channel, and therefore, by having a depth dimension given by the depth of the groove relative to the end of the ribs defining the groove. In certain embodiments, ultra-thin channels are channels having a depth dimension of less than about 500 µm ("microns" or µm), more typically less than about 250 µm, possibly smaller than 150 µm, and in some embodiments less than about 50 µm.

Figure 1B:
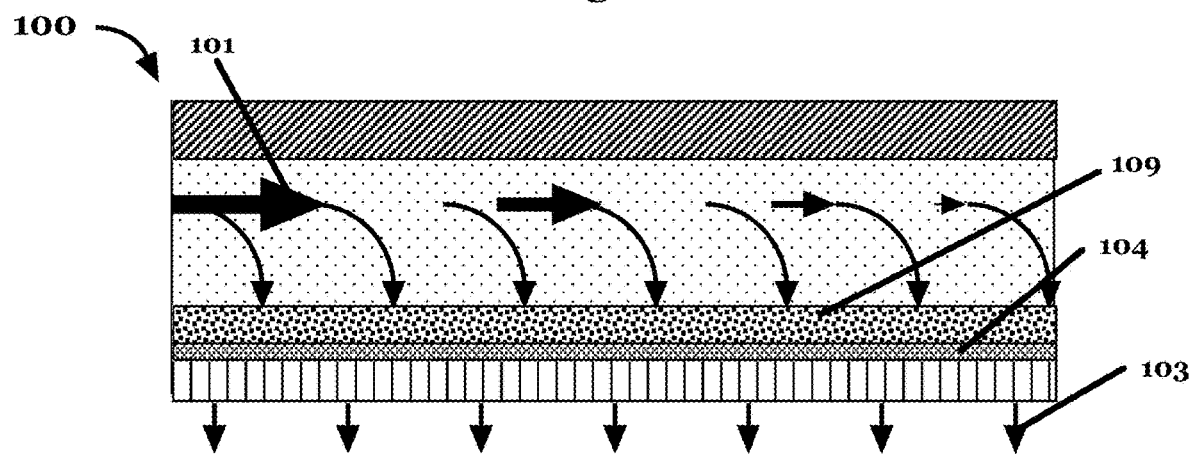
FIG. 1B is a schematic diagram of the cUTF channel of FIG. 1A after the loading step has started.
Figure 1C:
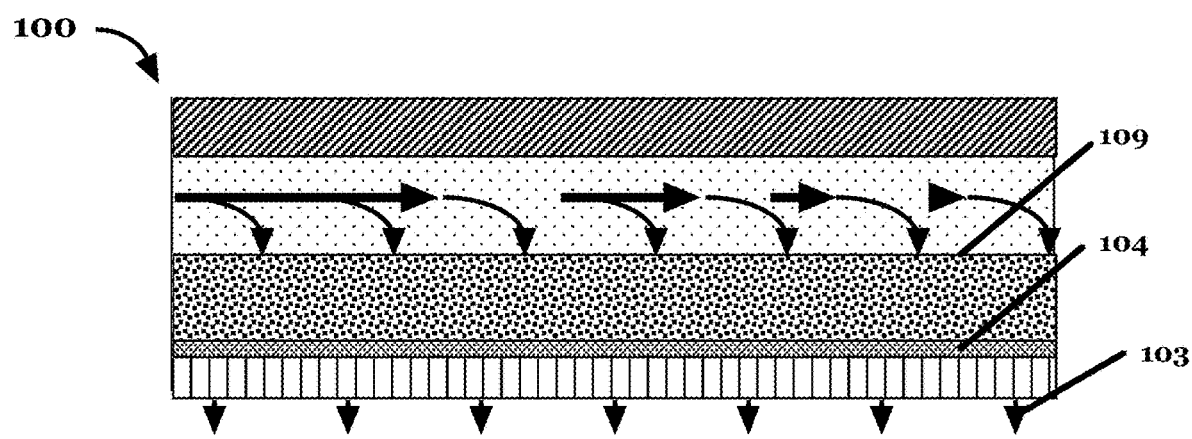
FIG. 1C is a schematic diagram of the cUTF channel of FIG. 1A at the end of the loading step.

FIGS. 1A-1C are schematic diagrams showing a single-sided cUTF channel as it is loaded. FIG. 1A shows cUTF channel 100 at the start of the loading step, when the membrane surface is substantially devoid of a BL. The cUTF channel 100 is bounded by top wall 106 and membrane 104, and has feed end 102 and retentate end 108. Feed stream 101 enters cUTF channel 100 at feed end 102 and immediately starts to permeate through membrane 104 producing permeate stream indicated by vertical arrows 103 below membrane 104. The permeate stream is induced by the trans-membrane-pressure (TMP) between the cUTF channel and the permeate channels 110. The horizontal arrows shown in FIG. 1A, starting with the feed stream 101, represent the flow velocity of the retentate stream within the cUTF channel, which is substantially axial (i.e., along the axis of the cUTF channel 100). Permeation diverts a portion of the feed stream 101 in a direction perpendicular to the membrane 104 as represented by curved arrows 105. Therefore, the feed stream 101 is gradually consumed as it flows towards the retentate end 108 of the cUTF channel 100 as represented by arrows of diminishing size 107, being fully consumed at the retentate end 108. Immediately upon the start of permeation the retained species starts to build up a BL 109 FIG. 1B on the surface of membrane 104. The permeation velocity or flux of permeate stream indicated by arrows 103 is substantially uniform by virtue of the low trans-channel pressure drop (TCP) along the cUTF channel 100 relative to the TMP (i.e., cUTF channels are designed to have a low TCP relative to the TMP), resulting in a relatively uniform TMP from the feed end 102 to the retentate end 108, and therefore, a relatively uniform building up of the BL.

FIG. 1B shows cUTF channel 100 after a substantial amount of permeation has taken place building BL 109 on the surface of membrane 104. The feed stream 101 is now flowing at a lower rate owing to the increased hydraulic resistance of the BL as indicated by the smaller axial arrows. Likewise, permeation flux of the permeate stream indicated by arrows 103 has diminished as represented by the smaller size of perpendicular arrows 103 representing permeate stream.

Figure 2A:
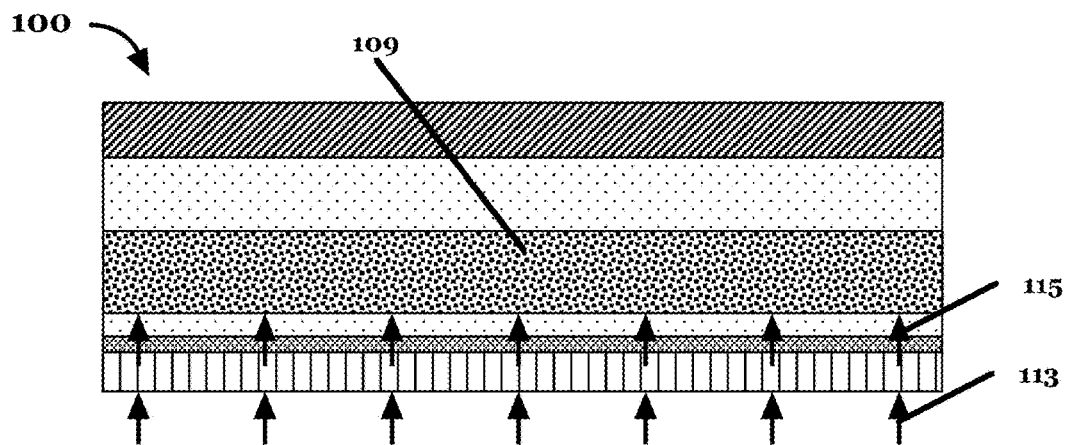
FIG. 2A is a schematic diagram of the cUTF channel of FIG. 1A at a start of a recovery step.
Figure 2B:
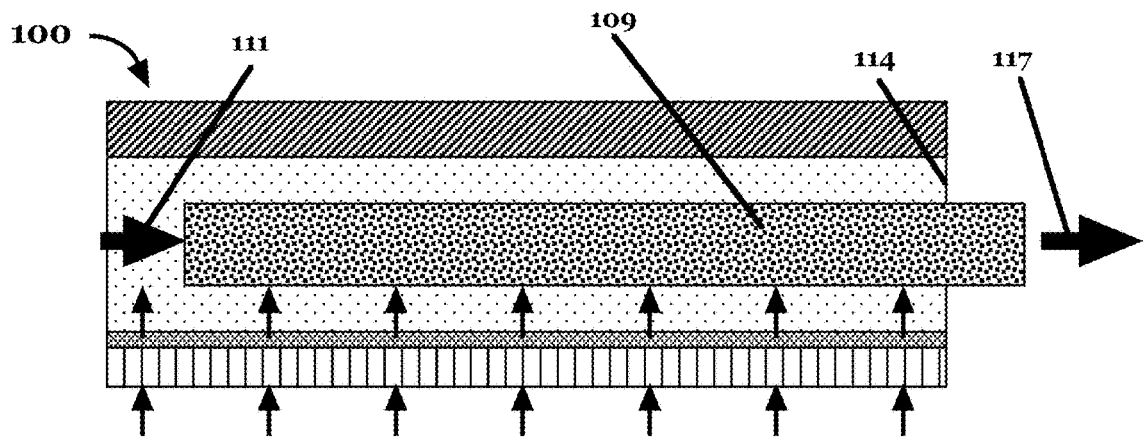
FIG. 2B is a schematic diagram of the cUTF channel of FIG. 1A after the recovery step has started.
Figure 2C:
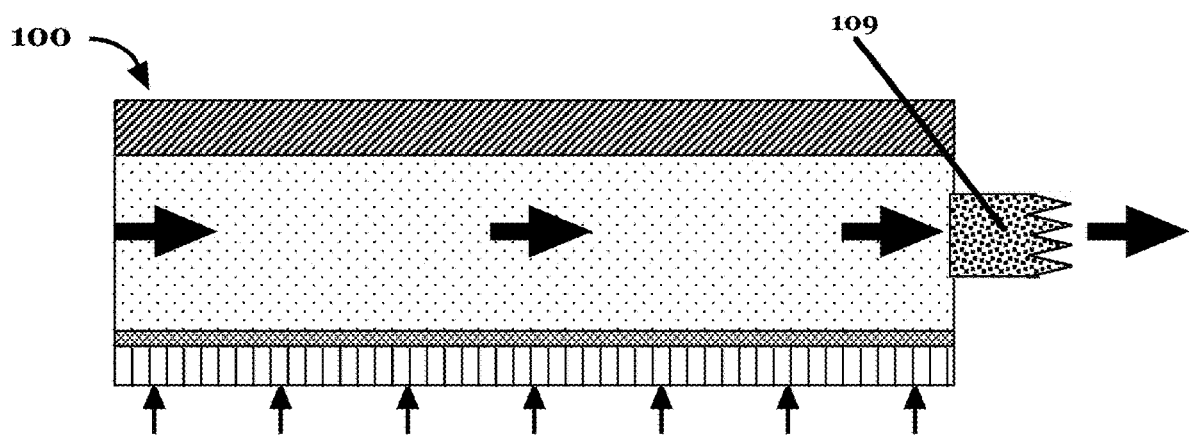
FIG. 2C is a schematic diagram of the cUTF channel of FIG. 1A at end of the recovery step.

FIG. 1C shows cUTF channel 100 near the end in time of the loading step. A substantial amount of permeation has taken place increasing the thickness of BL 109 on the surface of membrane 104, occupying a substantial portion of the cUTF channel 100. The feed stream 101 at this stage is flowing at a very low rate owing to the very high hydraulic resistance of the BL as represented by the smaller axial arrows. Permeation flux indicated by arrows 103 has diminished substantially as represented by the very small size of the perpendicular arrows of the permeate stream indicated by arrows 103. The extent to which the BL is built up depends on the desired concentration factor, as described below in more detail. However, to prevent plugging of the channel 100 the volume of the feed aliquot is adjusted so that the BL 109 does not fill the whole cUTF channel FIGS. 2A through 2C are schematic diagrams showing a cUTF channel after the loading process has built the BL and during the recovery process. To start the recovery process, permeation is stopped immediately followed by opening the retentate valve. In this example, permeation is stopped by pressurizing the permeate compartment. Referring to FIG. 2A, pressurization of the permeate compartment induces reverse permeation indicated by arrows 113. Reverse permeation creates vertical flow indicated by arrows 115 at the surface of membrane 104 that effectively lifts BL 109 from the surface of membrane 104. In this example reverse permeation is supplemented feed stream displacement as shown in FIG. 2B. Feed stream 111 displaces the lifted BL 109 towards the retentate end 114 creating retentate stream 117. The displacement of BL 109 out of cUTF channel 100 gradually progresses until the BL 109 is substantially recovered through the retentate valve, at which point the retentate is shut-off, the permeate is de-pressurized thereby starting the next load-recovery cycle. In some embodiments, it is important to recover a large fraction of the solute loaded during the loading step in order to restore the flux of the membrane before the next loading step thereby maintaining a high productivity. Loaded solute not recovered results in a reduced initial flux, and therefore, results in reduced productivity. Methods for recovering the loaded solute are described below.

Figure 3A:
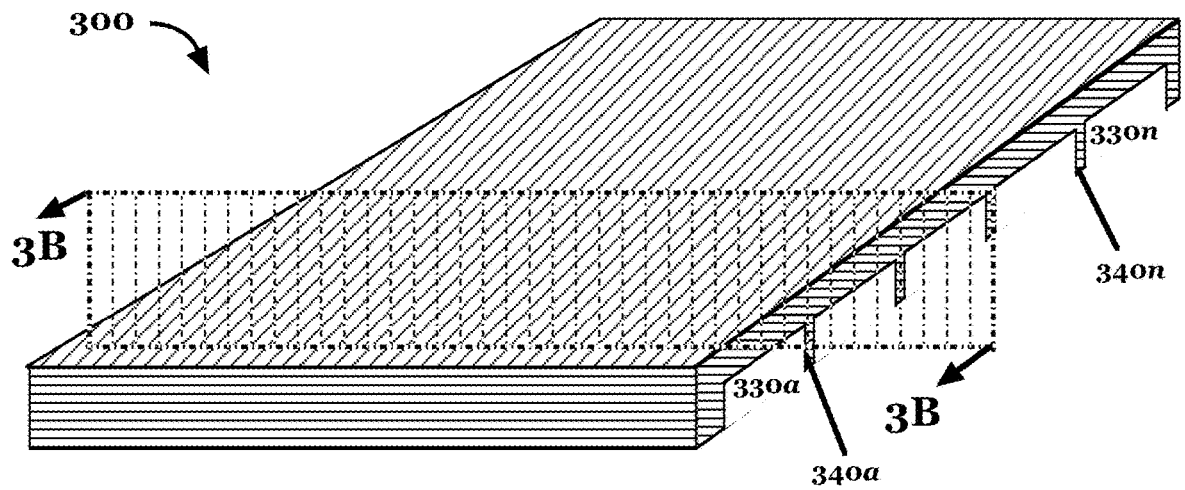
FIG. 3A is a perspective view of an array of cUTF channels according to one embodiment as disclosed herein.
Figure 3B:
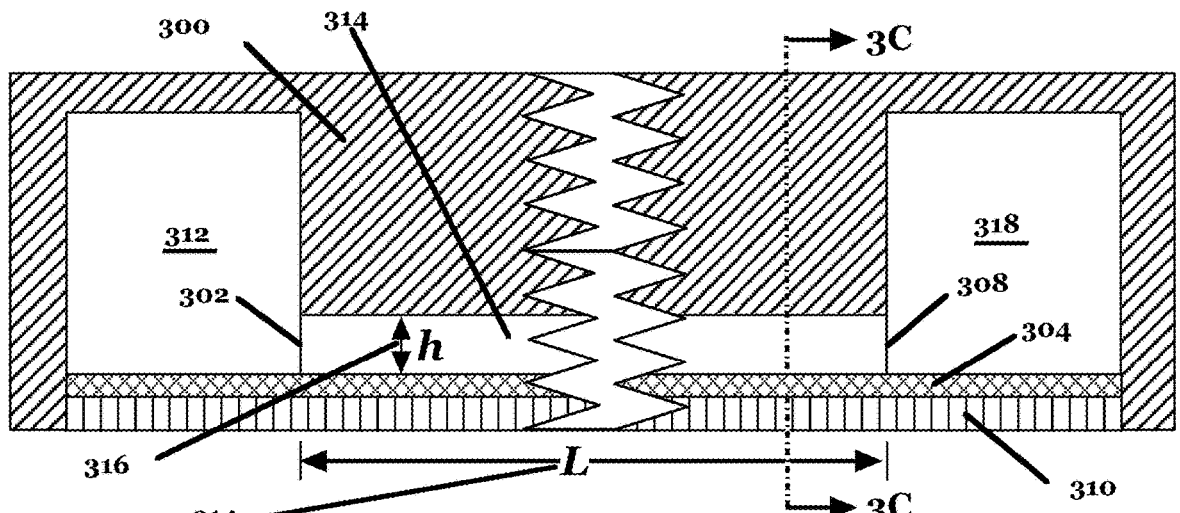
FIG. 3B is a cross-sectional side view of the array of cUTF channels of FIG. 3A through plane 3B.
Figure 3C:
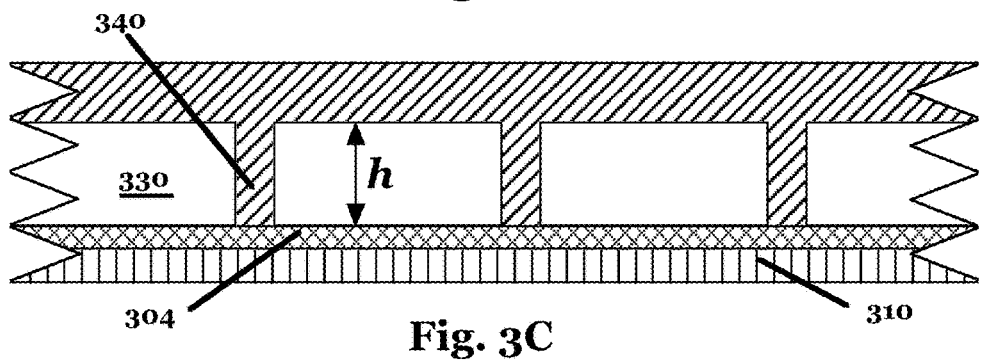
FIG. 3C is a cross-sectional front view of the array of cUTF channels of FIG. 3B through line 3C.

FIG. 3A shows a schematic perspective view of retentate plate 300, which includes a parallel array of cUTF channels 330a-330n (collectively cUTF channels 330) embedded in retentate plate 300. Retentate plate 300 also has two passageways, a feed manifold on the left side, or feed end, to distribute the feed stream into the cUTF channels 330, and a retentate manifold on the right side, or retentate end, to recover the retentate aliquot from cUTF channels 330. In this embodiment cUTF channels 330 are straight and are separated from each other by sidewalls 340a-340n (collectively sidewalls 340). The bottom edges of sidewalls 340 are coplanar enabling them to have intimate contact to a planar membrane when the two are pressed together. FIG. 3B is a cross-sectional view of plate 310 in intimate contact with membrane 304 forming a first passageway serving as feed manifold 312, cUTF channels 330 and forming a second passageway serving as retentate manifold 318. Also shown are feed end 302 and retentate end 308 of cUTF channel 330 in fluid communication with feed manifold 312 and retentate manifold 318, respectively. Membrane 304 is sandwiched between plate 300 and permeate channels 310, which are part of a separate permeate plate. Each cUTF channel 330 has a channel length 330, L. FIG. 3C is a cross-sectional view of retentate plate 300 showing that channel 330 has a rectangular cross-section with channel height, h, of sidewalls 340, and that the bottom of sidewalls 340 are coplanar creating intimate contact between the retentate plate 300 and the membrane 304.

FIG. 4A shows flow velocities when single-ended cUTF channel is in loading step. FIG. 4B shows flow velocities when single-ended cUTF channel is in the recovery step. FIGS. 4A and 4B show a cross-sectional axial view of cUTF separation element 400 in an alternative embodiment. Here, the cUTF channel has a single passageway used as both feed and retentate manifold. FIG. 4A represents cUTF separation element 400 in the loading step. Retentate plate 420 includes passageway 412 and single-sided cUTF channel 430. Passageway 412, serving as a feed manifold, delivers feed stream indicated by arrows 401 into cUTF channel 430 at feed end 402 as represented by arrow 401. Permeation through membrane 404 immediately ensues by virtue of the TMP induced in cUTF channel 430, generating permeate stream 403 represented by vertical arrows 403 below permeate channels. Due to permeation, the axial velocity of retentate stream diminishes along the cUTF channel 430 as represented by the smaller horizontal arrows, becoming zero at the retentate end 408 of cUTF channel 430. The BL gradually builds up on the surface of membrane 404 resulting from permeation, and when the desired amount of feed stream 401 has been loaded, the loading step is stopped by pressurization of the permeate compartment, induced by closing of the permeate pressurization valve and closing of the feed valve. FIG. 4B shows the flow patterns during the recovery step. Retentate valve is opened, which together with the pressurized permeate compartment induces reverse permeation 413 into cUTF channel 430, further inducing a displacement flow 411 that gradually increases from the retentate end 408 to the feed end 402 of the cUTF channel 430. The retentate stream, represented by arrow 417, is collected on the feed end of the cUTF channel 430 and collected by passageway 412 now serving as retentate manifold. After a suitable amount of displacement liquid is injected into the cUTF channel 430, the recovery step is stopped by closing of the retentate valve. The loading step of the next cycle is started by opening the feed valve and depressurizing the permeate compartment by opening the permeate pressurization valve. In these embodiments the recovery method is by means of reverse permeation.

Figure 5A:
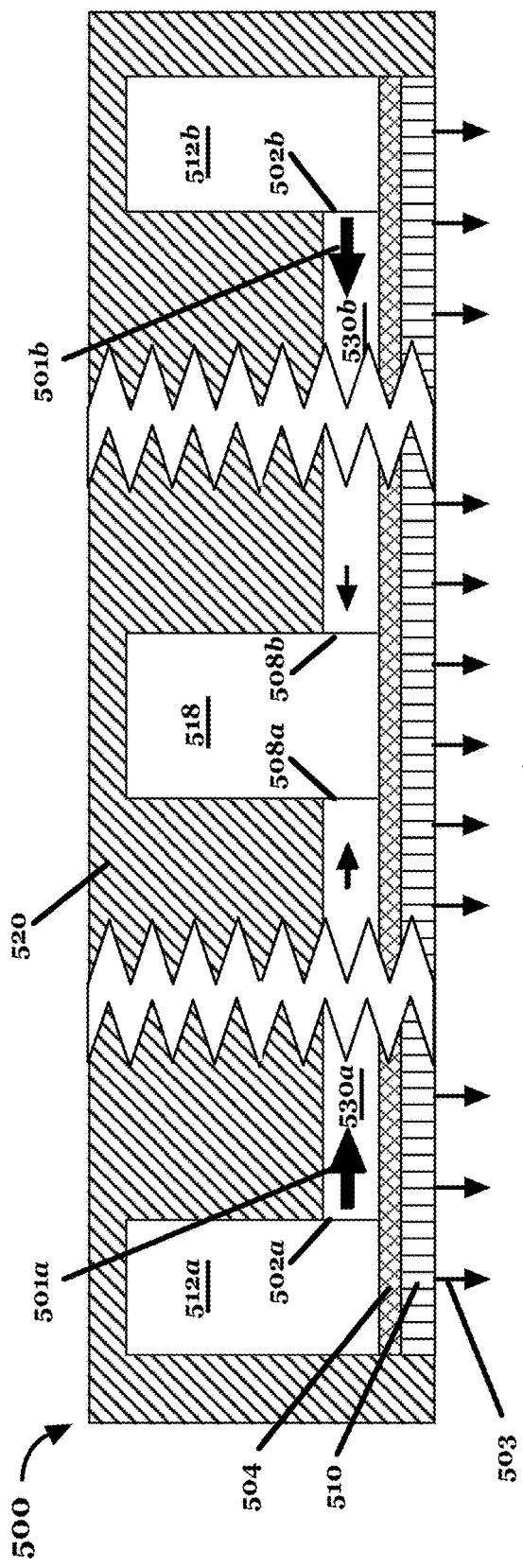
FIGS. 5A and 5B are schematic diagrams of alternative embodiments of cUTF channels with a single passageway used as retentate manifold for two arrays of cUTF channels (each having its own feed manifold) as disclosed herein.
Figure 5B:
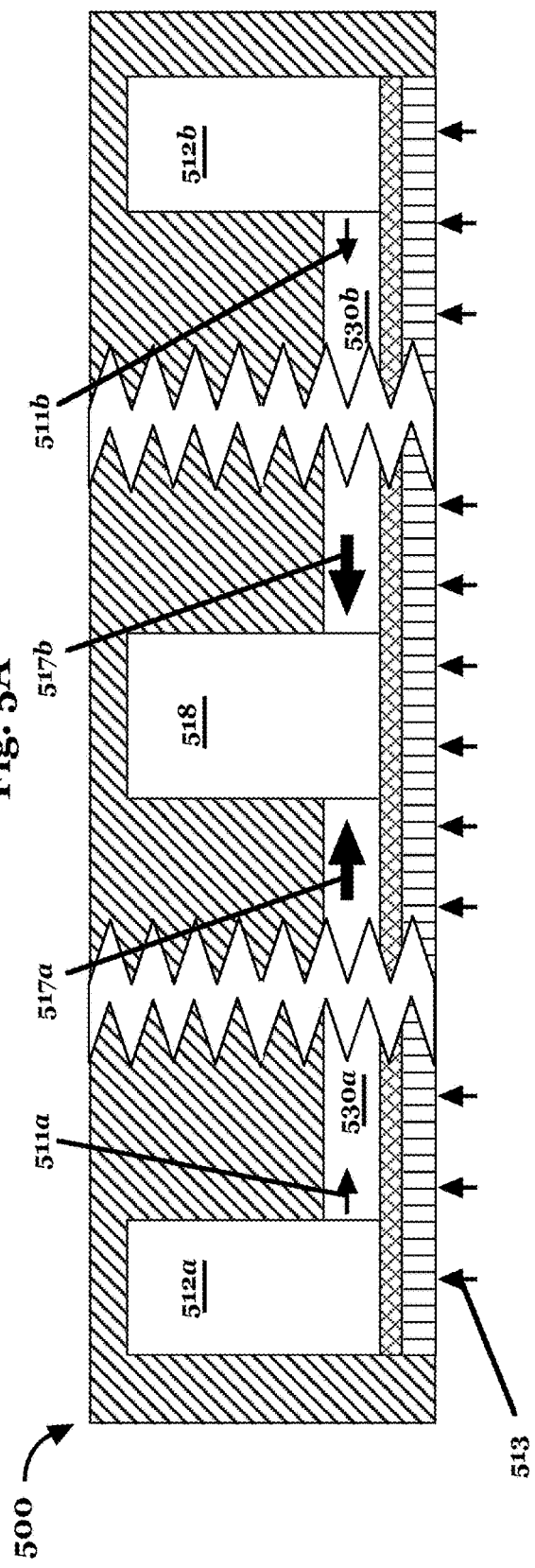

FIGS. 5A and 5B show a cross-sectional axial view of cUTF separation element 500 in an alternative embodiment with two channel arrays and cUTF double-ended channels. FIG. 5A shows arrows representing flow velocities when cUTF channel is in loading step. FIG. 5B shows arrows representing flow velocities when cUTF channel is in the recovery step. FIG. 5A represents cUTF separation element 500 in the loading step. Retentate plate 520 includes passageways 512a and 512b serving as feed manifolds (collectively feed manifolds 512), passageway 518 serving as retentate manifold and double-sided cUTF channels 530a and 530b (collectively cUTF channels 530). Feed manifolds 512 deliver feed streams 501a and 501b (collectively feed streams 501) into cUTF channels 530 at feed end 502a and 502b (collectively feed ends 502) as represented by arrows 501a and 501b. Permeation through membrane 504 immediately ensues by virtue of the TMP induced in cUTF channel 530, closing of the retentate valve and opening of the permeate pressurization valve, generating permeate stream 503 represented by vertical arrows below permeate channels 510. Due to permeation, the axial velocity of retentate streams diminishes along the cUTF channel 530 as represented by the smaller horizontal arrows, becoming zero at the retentate ends 508a and 508b (collectively retentate ends 508) of cUTF channels 530. The BL gradually builds up on the surface of membrane 504 owing to permeation, and when the desired amount of feed streams 501 have been loaded, the loading step is stopped by pressurization of the permeate compartment effected by closing the permeate pressurization valve. FIG. 5B shows the flow patterns during the recovery step. Retentate valve is opened, which together with the pressurized permeate compartment induces reverse permeation 513 into cUTF channels 530, further inducing displacement flows 511a and 511b (collectively displacement flows 511) that gradually increase from the feed ends 502 to the retentate ends 508 of the cUTF channels 530. The retentate streams, represented by arrows 517a and 517b, are collected on retentate ends 508 of the cUTF channels 530 and collected by passageway 518 serving as retentate manifold. After a suitable amount of displacement liquid is injected into the cUTF channels 530, the recovery step is stopped by closing of the retentate valve. The loading step of the next cycle is started by opening the feed valve and depressurizing the permeate compartment effected by opening of the permeate pressurization valve. In this embodiment any one or more multiple recovery methods can be employed utilizing the permeate stream, the feed stream or combinations thereof as will be discussed below.

Figure 6A:
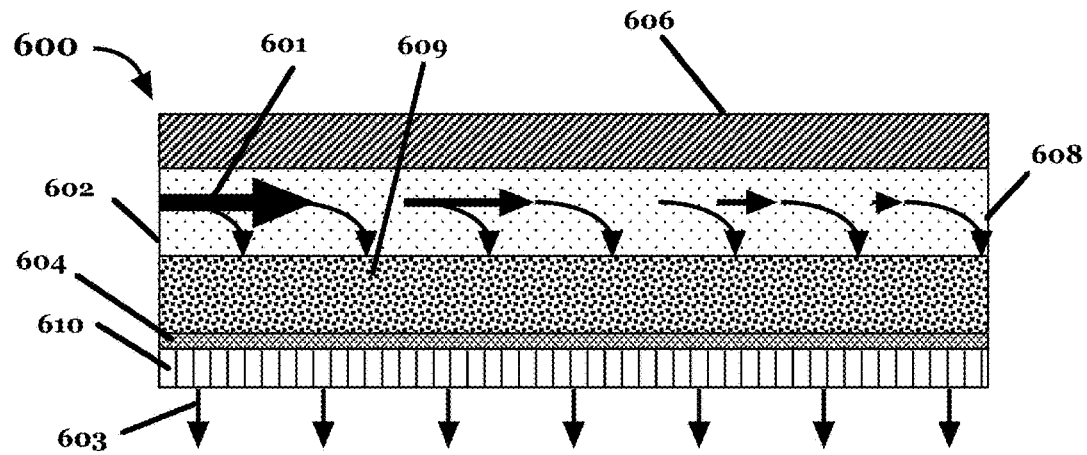
FIGS. 6A-6C are schematic diagrams of alternative embodiments of cUTF channels indicating a sequence of steps for a washing process as disclosed herein.
Figure 6B:
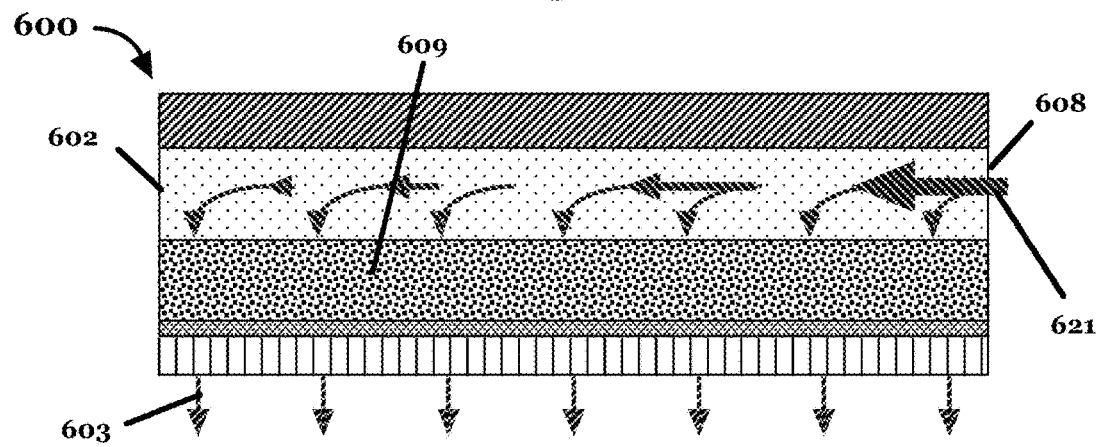
Figure 6C:
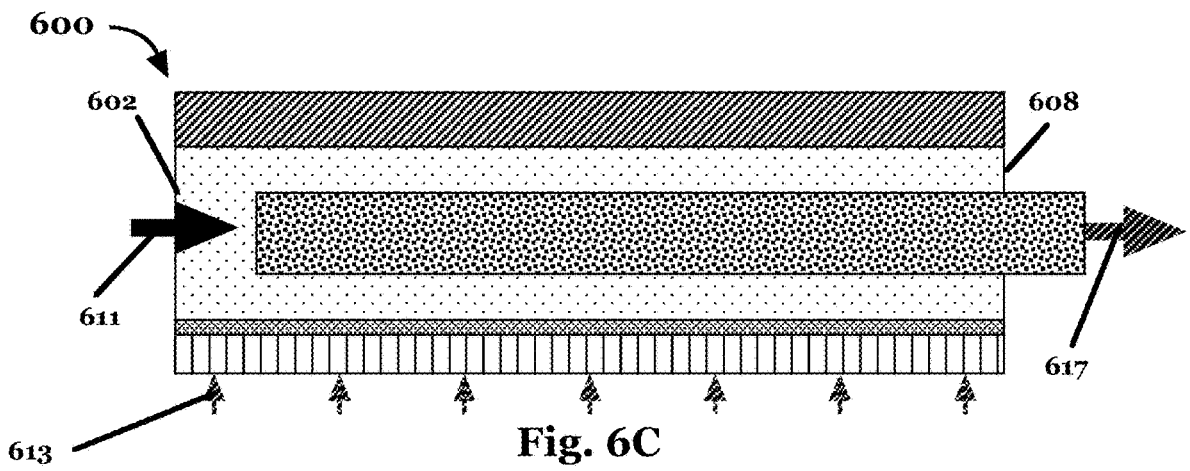

FIGS. 6A-6C are schematic diagrams of cUTF channel 600 showing channel conditions for a sequence of steps for a washing process. FIG. 6A shows a cUTF channel in loading step, FIG. 6B shows the cUTF channel in a wash step and FIG. 6C shows the cUTF channel in a recovery step. FIG. 6A is a cUTF channel 600 at the end of the loading step. The cUTF channel 600 is bounded above by top wall 606 and below by membrane 604, further including feed end 602 and retentate end 608. During the loading step feed stream, represented by arrow 601, enters cUTF channel at feed end 602, which permeates membrane 604 by virtue of the TMP (and having the retentate valve shut and the permeate pressurization valve open). The retentate stream represented by axial arrows diminishes along the cUTF channel owing to permeation, represented by arrows 603, reaching zero flow at the retentate end 608 by virtue of having the retentate valve shut. The retained species have built BL 609 filling a substantial fraction of the cUTF channel. The loading step stops upon closing the feed valve and opening the wash valve, which immediately starts the washing step as shown in FIG. 6B. In this embodiment the wash stream is represented by axial arrow 621, is fed into cUTF channel from the retentate end 608. Since the feed valve is shut, wash stream indicated by arrow 621 is forced to permeate through BL 609 creating permeate stream indicated by arrows 603. Since the BL 609 is stagnant, the wash stream displaces the solvent present within BL 609 as it permeates through BL 609. The removal efficiency of the cUTF wash step is very high (e.g., superior to that obtained by conventional diafiltration processes) since mixing of the feed stream and wash stream is minimized. After a desired amount of wash stream has permeated, at a minimum the volume of the retentate compartment, and more typically one and one half to three times the volume of the retentate compartment, and in some embodiments three to nine times the volume of the retentate compartment the washing step is stopped by pressurizing the permeate (by closing the permeate pressurization valve), closing the wash valve followed by the recovery step. In this embodiment the recovery step utilizes a combination of the feed stream and the permeate stream to displace the contents of the cUTF channel as shown in FIG. 6C. Upon opening of the retentate valve, BL 609 is lifted from membrane 604 by reverse permeation 613, which in combination with feed displacement stream 611 displaces BL 609 towards the retentate end 608 generating retentate stream 617. The displacement continues until a volume approximately equal to the volume of the retentate compartment is collected from the retentate end 608. At this point the recovery step is stopped by closing the retentate valve followed by depressurization of the permeate stream and simultaneously starting a loading step and the next cycle of steps. In other embodiments the wash stream may be fed from the retentate 602 end of the cUTF channel 600.

Figure 7:
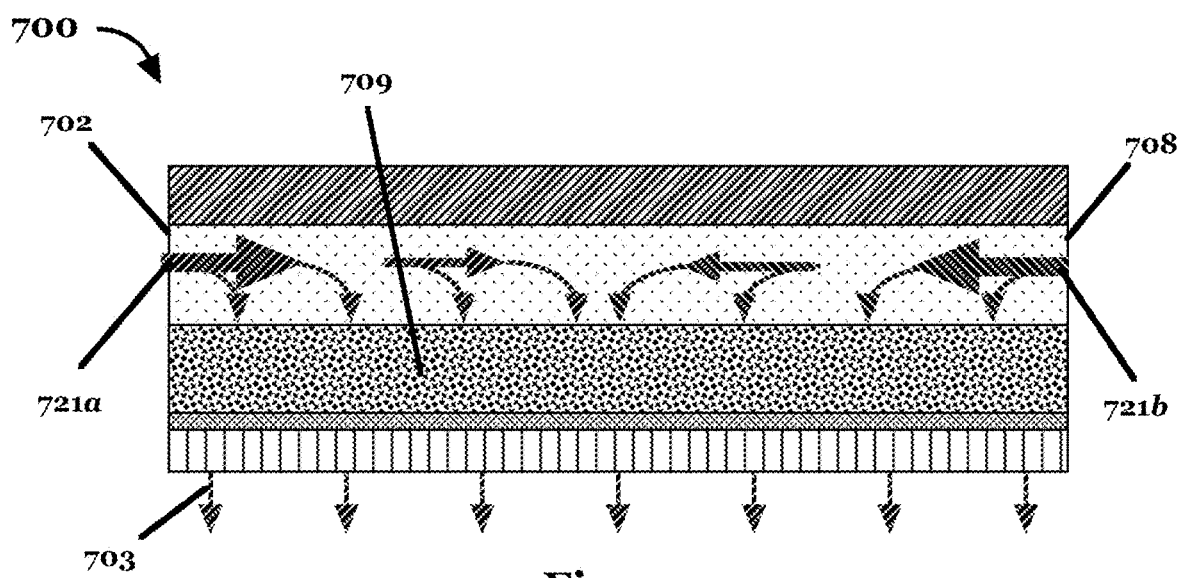
FIG. 7 is an alternative embodiment of a cUTF channel used in a washing process, with wash stream fed from both ends of a cUTF channel as disclosed herein.

FIG. 7 is a schematic diagram of an alternative embodiment of a cUTF channel 700 used in a washing process, in which the wash stream is fed from both ends of the cUTF channel 700. After BL 709 has been fully built in the load process, feed valve is shut and wash valves, one for each wash stream, are open to start the wash step. A first wash stream, represented by arrow 721a is fed to the feed end 702 of cUTF channel 700, whereas a second wash stream, represented by arrow 721b is fed to the retentate end 708 of cUTF channel 700. The wash streams 712a and 712b displace the supernatant solution in the BL with minimal mixing making for a very efficient wash step. In contrast to the embodiment shown in FIG. 6, where a single wash stream is fed from the retentate end of the cUTF channel, in this embodiment the risk of cross contamination of solvent left over in the feed manifold is significantly reduced, making it a more reliable wash step. In still other embodiments more than two wash streams may be used, each one feeding at a different point along the length of the cUTF channel. In these embodiments, each wash stream uses a separate shut off valve. The selection of the number of wash streams will be dictated by the washing efficiency and reliability demanded by the application at the expense of the complexity introduced by each additional wash stream. In most applications one or two wash streams will be sufficient. In still other embodiments two wash streams are fed intermittently and repeatedly; in still other embodiments a combination of injecting two washing streams simultaneously from both ends followed by alternating the injection of the wash stream on each end, once or in repeated fashion, is possible. In other embodiments the feed stream is injected in the middle of the cUTF, with the wash streams injected in the feed end and retentate end of the cUTF channel.

Figure 8:
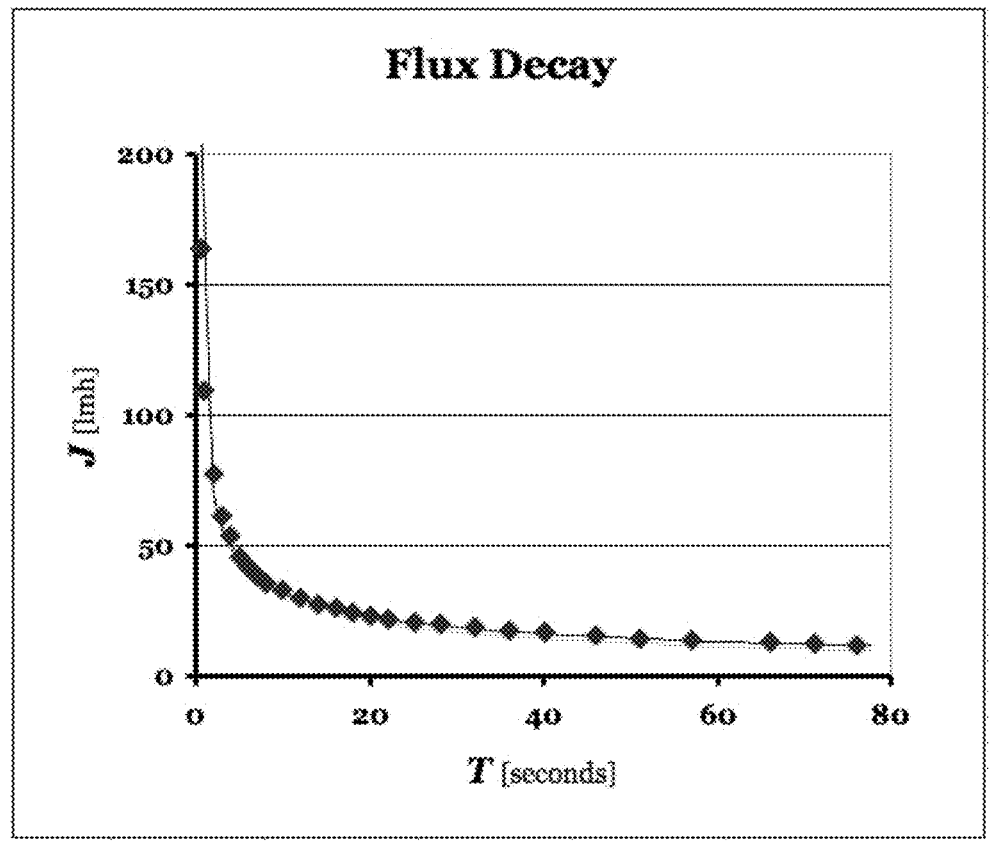
FIG. 8 is a graph of flux decay in cUTF channels of FIG. 1A for twenty-fold concentration of IgG.

FIG. 8 shows the decay of flux during the load cycle in an exemplary cUTF process. The initial flux is very high, approximately equal to the "free water" flux, or the flux of supernatant liquid without retained species. For example, a typical 30K Molecular weight cut-off (MWCO) UF membrane with a hydraulic permeability of 1.45 lmh/kPa (10 lmh/psi) will produce an initial flux of 600 lmh when operated at a feed pressure of 414 kPa (60 psi). In another embodiment, the feed pressure exceeds 276 kPa (40 psi). That flux rapidly decays owing to the BL that is created on the surface of the membrane. As the BL gets thicker, or more pronounced, the flux decreases. The flux of loading step will be given by the average flux, which is equal to the area under the flux decay curve divided by the load time. In some embodiments, it is important to recover as large a fraction as possible of the BL developed on the membrane surface during the loading step, as any residual amount of retained species will not only reduce the initial flux, but will reduce the whole flux decay curve. In essence, any residual retained species means that the membrane starts with a non-zero load, essentially displacing the flux decay curve to the left. Therefore, an aspect of this invention relates to the effectiveness of the recovery step, which will be discussed in detail later.

Figures 9A, 9B:
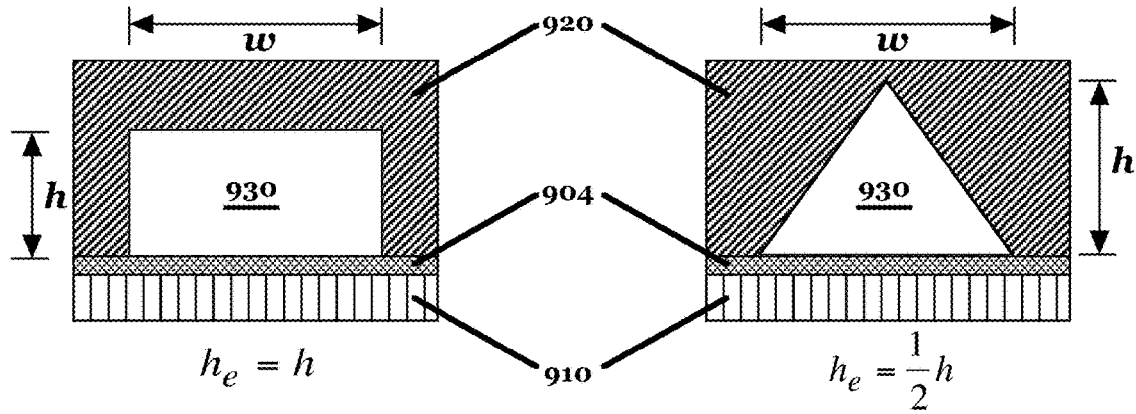
FIGS. 9A-9F are schematic cross-sectional views of exemplary cUTF channels showing a relationship between channel height and effective channel height, $h_e$, according to embodiments disclosed herein.
Figures 9C, 9D:
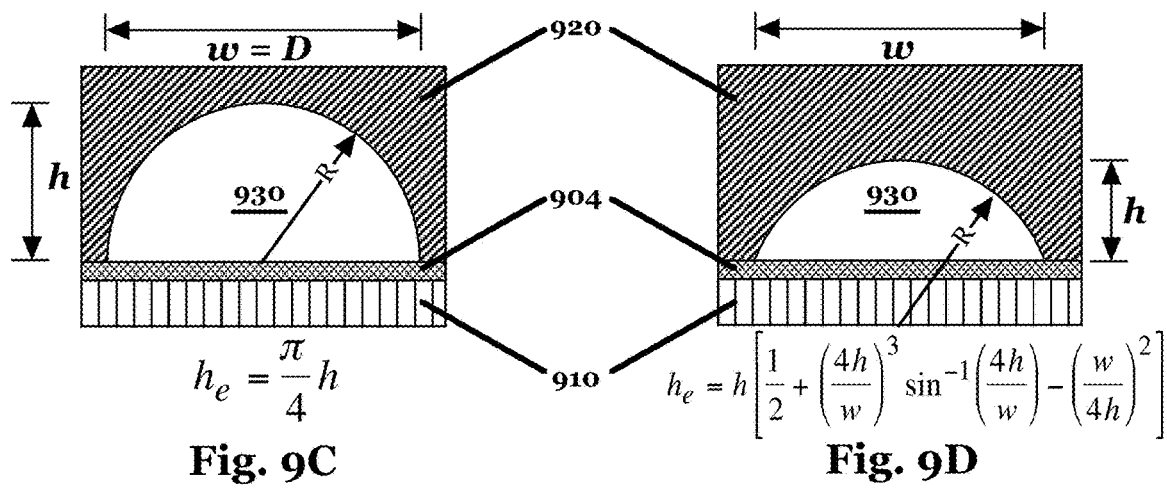
Figures 9E, 9F:
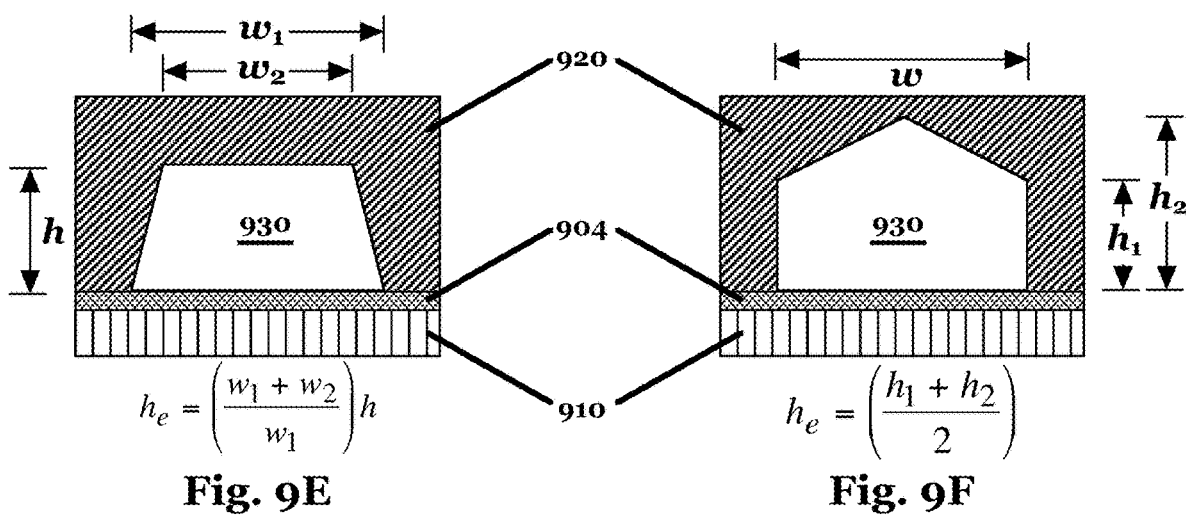

FIGS. 9A-9F show alternative cross-sections of exemplary cUTF channels created with grooves cut, molded or etched in a retentate plate or sheet. In these embodiments cUTF channel 930 is formed by grooves in a retentate plate 920 bounded by planar membrane 904. FIG. 9A shows a cUTF channel 930 with a rectangular cross-section with height, h, and width, w. FIG. 9B shows a cUTF channel 930 with a triangular cross-section with height, h, and width, w. FIG. 9C shows a cUTF channel 930 with a semi-circular cross-section with diameter, h. FIG. 9D shows a cUTF channel 930 with a cross-section formed from a section of a circle of diameter, d, the depth of the section of the circle having a height, h, where the d>h. FIG. 9E shows a cUTF channel 930 with a trapezoidal cross-section with height, h, and widths, $w_2$ and $w_2$. FIG. 9F shows a cUTF channel 930 with a cross-section including a rectangle and a triangle with height dimensions $h_1$ and $h_2$, and width, w. The cUTF channels formed with grooves embedded in retentate plates may be straight and adjacent to each other forming a parallel array of channels. Alternatively, the channels may not be straight, and may include double, triple or multiple loops of straight segments, or may zigzag from beginning to end; or may form spirals, or may have a radial, or hexagonal geometry. Various shapes which provide an ultra-thin channels characterized by thicknesses that are of the same order of magnitude as the thickness of the BL can be used for the channel configurations. The equation that defines the effective channel height is shown underneath each of FIGS. 9A-9F. In one embodiment, the parallel array of channels is an array of substantially similar parallel channels having a feed end and a retentate end and characterized by an effective channel height less than about 150 μm and a dimensionless length less than about 1000. In some embodiments, a set of passageways in fluid communication with a retentate end of the array of substantially similar parallel channels have a volume less than about 50 percent of the volume of the array of substantially similar parallel channels.

Figure 10A:
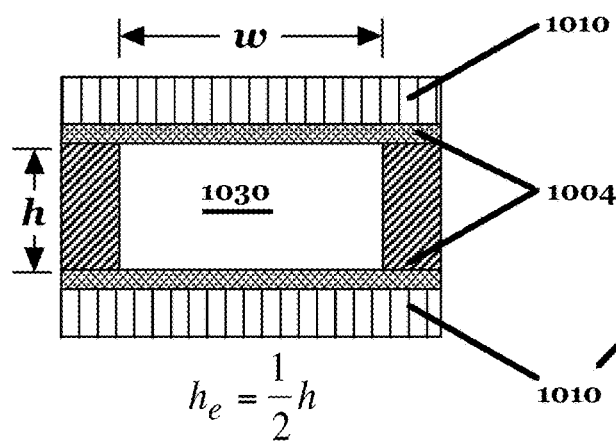
FIG. 10A is a schematic cross-sectional view of a double-sided rectangular cUTF channel showing a relationship between channel height and effective channel height, $h_e$, according to embodiments disclosed herein.
Figure 10B:
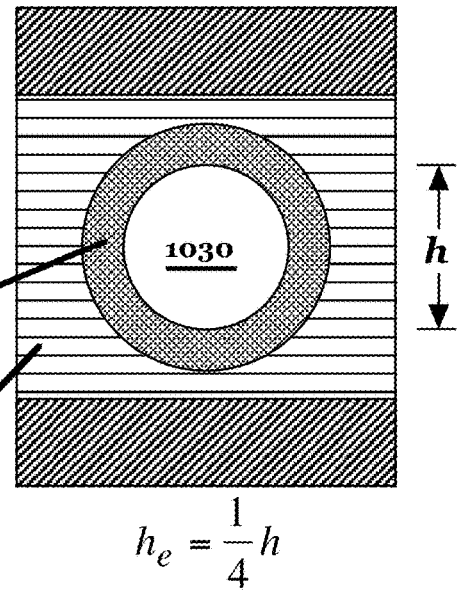
FIG. 10B is a schematic cross-sectional view of a hollow fiber cUTF channel showing a relationship between channel height and effective channel height, $h_e$, according to embodiments disclosed herein.
Figure 10C:
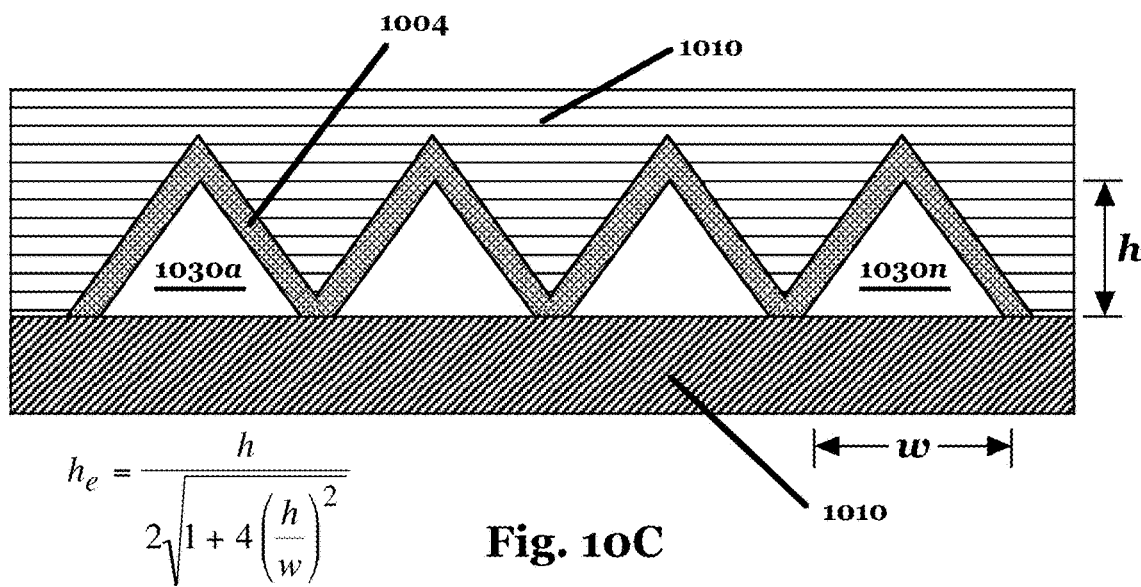
FIG. 10C is a schematic cross-sectional view of an array of triangular cUTF channels showing a relationship between channel height and effective channel height, $h_e$, according to embodiments disclosed herein.

FIGS. 10A-10C show alternative cross-sections of exemplary cUTF channels, formed by methods different from those shown in FIG. 9. FIG. 10A shows double-sided rectangular cUTF channel 1030 bounded above and below by planar membrane 1004 with permeate channels 1010. FIG. 10B shows a hollow fiber cUTF channel with lumen diameter, h. FIG. 10C shows an array of triangular cUTF channels 1030a-1030n formed by corrugated membrane 1004 pressed against retentate plate 1020 and having permeate channels 1010. In some embodiments cUTF channels may be completely open as shown in FIGS. 1-10; in other embodiments, particularly that shown in FIG. 10A cUTF channels may have spacers to maintain the channel dimension.

An effective channel height, $h_e$, is defined as the cUTF channel volume divided by the active membrane area. For embodiments such as those shown in FIGS. 9A-9F, where the channel cross-section is uniform along the length of the cUTF channel, the effective channel height is given by Equation (1), $$h_{e[cm]} = \frac{S_{[cm]}}{w_{[cm]}} \rightarrow h_{e[\mu m]} = 10,000 \frac{S_{[cm]}}{w_{[cm]}} \qquad (1)$$

where S=area of channel cross-section [cm]; and
w=wetted perimeter of the membrane [cm].

Applying Equation (1) to each of the exemplary cross-sections of FIGS. 9A-9F and FIGS. 10A-10C, an equation for the effective channel height as shown underneath each one of FIGS. 9A-9F and FIGS. 10A-10C is derived.

In some embodiments, the effective channel height is less than about 100 μm in order to obtain high flux (high productivity) with a cUTF process. More specifically, the channel height needs to be of the same order of magnitude as the thickness of the BL. In some embodiments it is smaller than 150 μm; in other embodiments it is smaller than 100 μm; in still other embodiments it is smaller than 50 μm; in still other embodiments it is smaller than 25 μm. The effective channel height used in a cUTF module will be dictated by the cost of making retentate plates with grooves of such dimensions and the application. In general, the smaller the effective channel height the higher the productivity of a cUTF module and process, the higher the cost of the retentate plate, and the higher the risk of plugging due to particulate contamination, non-uniformities in the channel dimensions due to variations in the manufacturing processes or by very high viscosity of the retentate stream.

Another aspect of channels in cUTF modules is the cUTF channel length. The shorter the channel is the more uniform is the BL that builds on the surface of the membrane and the easier it is to recover the BL created in the loading step. On the other hand, the shorter the channel the more difficult it becomes to distribute the feed and wash streams and collect the retentate stream (more channels are required) and the greater the amount of resources a filtration element needs to assign to distribution and collection. Furthermore, the smaller the effective channel height the shorter the channels need to be. In general, the parameter that determines this aspect of the invention is the dimensionless length of the channel, λ, hereinafter referred to as dimensionless length, is defined as the ratio of the (hydraulic) length of the channel to the effective channel height, $h_e$. For channels having uniform cross-sections, the dimensionless length is given by Equation (2), $$\lambda = \frac{L_{[cm]}}{h_{e[cm]}} = 10,000 \frac{L_{[cm]}}{h_{e[\mu m]}} \qquad (2)$$

where L=hydraulic length of the cUTF channel [cm]; and
$h_e$=effective channel height [cm or µm].

In some embodiments the dimensionless length is smaller than 1000; in other embodiments it is smaller than 500; in still other embodiments it is smaller than 250; in still other embodiments it is smaller than 100. The dimensionless length used in a cUTF module will be dictated by the cost of making retentate plates with grooves of such dimensions and the application. In some embodiments cUTF channels have lengths less than about 4 cm, in others less than about two cm, and in still others less than about one cm.

Figure 11A:
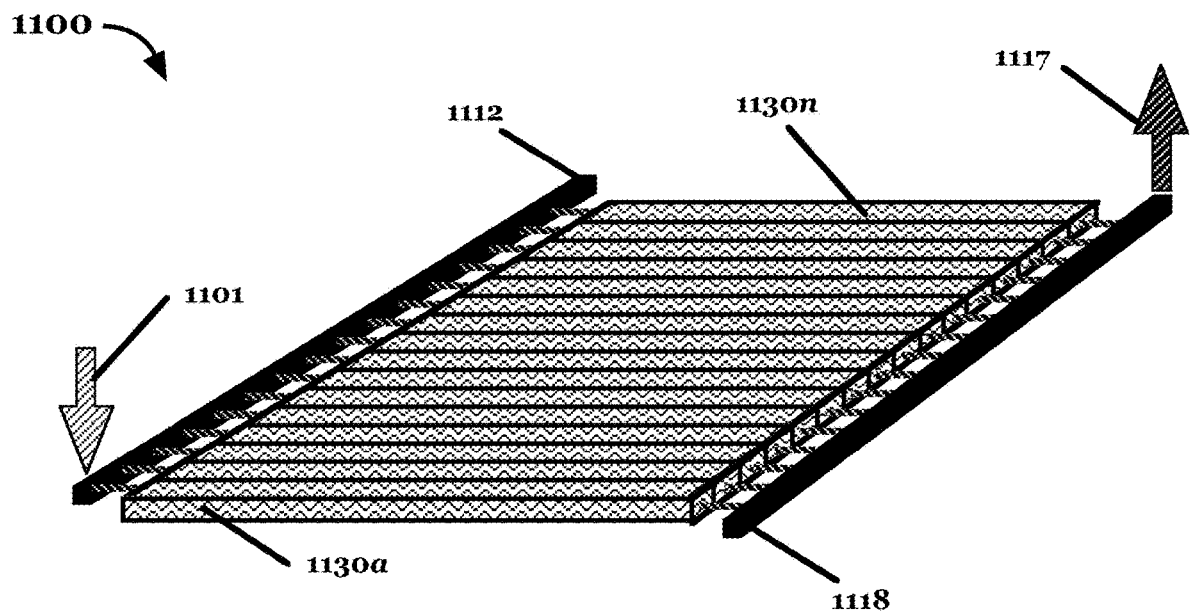
FIGS. 11A and 11B are schematic perspective views of a parallel array of cUTF channels including manifolds according to embodiments disclosed herein.
Figure 11B:
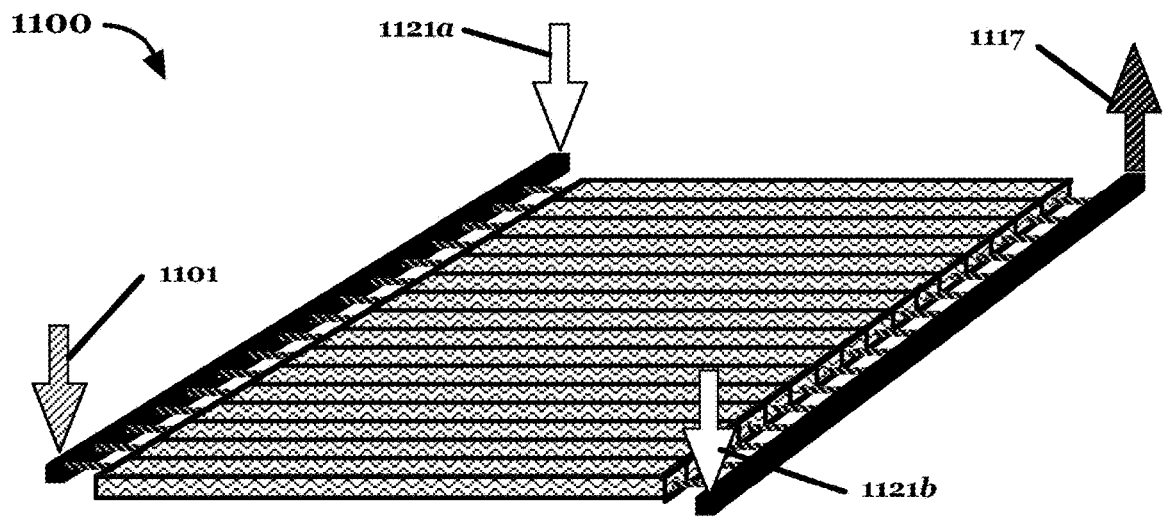

FIG. 11A is a perspective schematic view of feed and retentate streams and their interconnections in a cUTF concentration process. FIG. 11B is a perspective schematic view of feed, retentate and wash streams and their interconnections in a cUTF concentration and washing process with the wash stream fed on both the feed and retentate manifolds. Channel array 1100 includes a plurality of parallel cUTF channels 1130a-1130n (collectively cUTF channels 1130), feed manifold 1112 and retentate manifold 1118. Feed stream 1101 is fed to feed manifold 1112, which distributes feed stream 1101 to channels 1130 during loading step. Likewise, retentate stream 1117 is collected by retentate manifold 1118, which collects retentate stream 1117 from channels 1130 during the recovery step. FIG. 11B shows the same channel array 1100 for a washing process. In this embodiment a first wash stream 1121a is connected to the feed manifold 1112 at opposite ends of where the feed stream connects to that same manifold, whereas a second wash stream 1121b is connected to the retentate manifold 1118 at opposite ends of where the retentate stream connects to that same manifold. Wash streams 1121a and 1121b are fed to the feed and retentate manifolds 1112 and 1118, respectively, during the wash step. In the embodiments shown in FIGS. 11A-11B, manifolds 1112 and 1118 are simple "straight" manifolds, in effect "troughs" or grooves cut into the retentate plate that carries out the distribution/collection function. Large parallel channel arrays may benefit from an isoflow distributor, a distributor that provides a more uniform fluid distribution compared to the simple straight distributors shown in FIG. 11A.

Figure 12A:
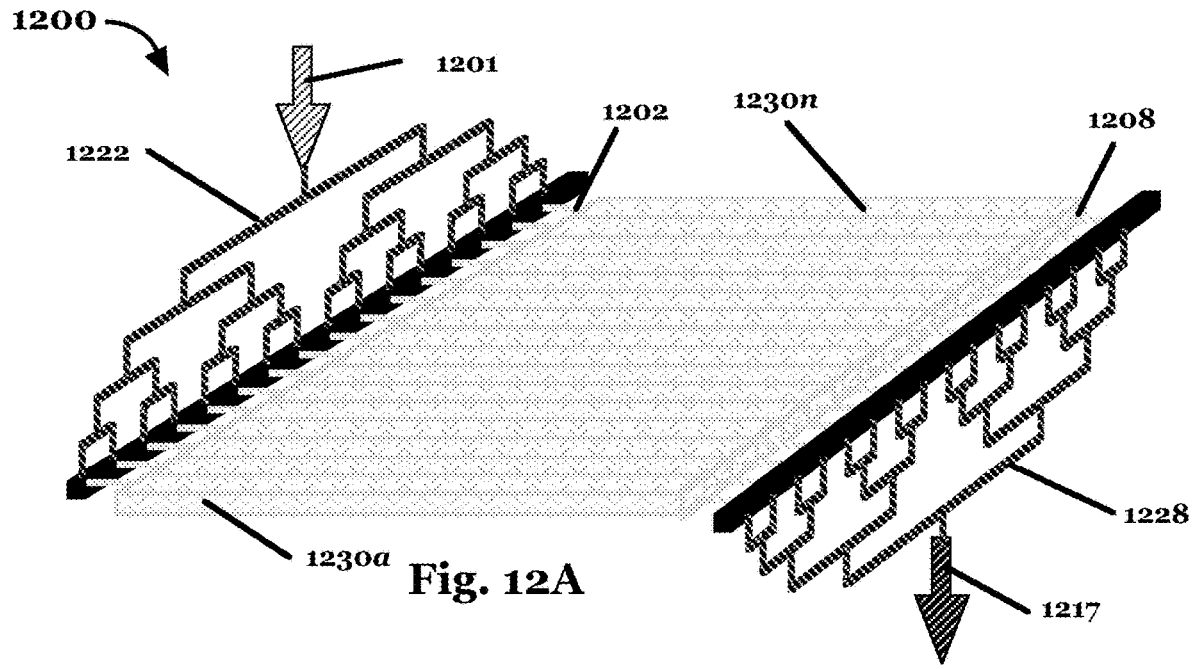
FIGS. 12A and 12B are schematic perspective views of a parallel array of cUTF channels showing isoflow distributors and manifolds according to embodiments disclosed herein.
Figure 12B:
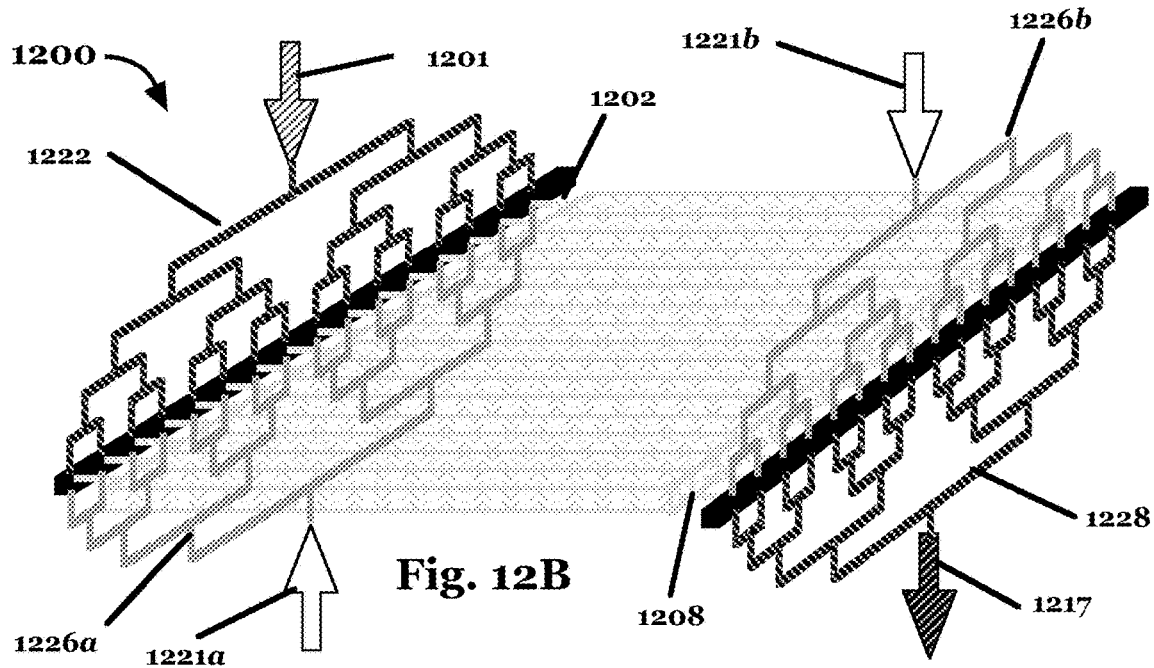

FIG. 12A is a perspective view of a parallel array of cUTF channels utilizing isoflow distributors and manifolds showing feed and retentate streams with their respective isoflow distributors and interconnections used in a cUTF concentration module. FIG. 12B is a perspective view of feed, retentate and wash streams with their respective isoflow distributors and their interconnections in a cUTF concentration & washing module with wash stream fed on both the feed and retentate manifolds. Referring now to FIG. 12A, retentate compartment 1200 includes an array of substantially similar channels 1230a-1230n (collectively, substantially similar channels 1230) having a feed end 1202 fluidly coupled to the feed port of the cUTF module and a retentate end 1208 fluidly coupled to the retentate port of the cUTF module, a plurality of feed distribution passageways 1222 in fluid communication with the feed end 1202 of the array of substantially similar channels 1230 and a plurality of retentate distribution passageways 1228 in fluid communication with the retentate end 1208 of the array of substantially similar channels 1230.

Here, FIG. 12A shows a parallel array of cUTF channels 1200 showing isoflow distributors, feed and retentate streams and their interconnections in a cUTF concentration module. Channel array 1200 includes a plurality of parallel cUTF channels 1230a-1230n (collectively cUTF channels 1230), feed manifold with feed distribution passage ways 1222 in the form of an isoflow distributor, and retentate manifold with retentate distribution passageways 1228 also in the form of an isoflow distributor. An isoflow distributor is a branched network of passageways that induces uniform distribution by the very nature of the branched network, wherein each stream is split into two identical streams. Feed stream 1201 is fed to feed distribution passage ways 1222, which distributes feed stream 1201 to feed end 1202 of cUTF channels 1230 during loading step. Likewise, retentate stream 1217 is collected by retentate distribution passageways 1228, which collects retentate stream 1217 from retentate end 1208 of cUTF channels 1230 during the recovery step. Feed distribution passage ways 1222 and retentate distribution passageways 1228 are in the form of isoflow distributors having a network of passageways where each passageway is successively split into two subsequent passageways creating a "Christmas tree" branched configuration. This configuration makes every flow path identical regardless of how far or near the cUTF channels 1230 are located relatively to the point at which a stream is fed or collected.

FIG. 12B is an alternative embodiment of a channel array having isoflow distributors suitable for washing. In this embodiment two additional isoflow distributors are disposed in the retentate plate, one for each wash stream. First wash stream 1221a is connected to isoflow distributor 1226a delivering fluid at the feed end 1202 of cUTF channels 1230. It will be appreciated that wash distribution passageways 1226a discharges first wash stream 1221a at the same discharge point as feed distribution passageways 1222 discharge feed stream 1201. Likewise, second wash stream 1221b is connected to isoflow distributor 1226b injecting fluid at the retentate end 1208 of cUTF channels 1230. It will be appreciated that wash distribution passageways 1226b discharge second wash stream 1221b at the same point at which retentate distribution passageways 1228 collect retentate stream 1217. It will also be understood that the location and orientation of the isoflow distributors shown in FIGS. 12A-12B are schematic; for the case of a planar cUTF device the feed, retentate and wash distribution passageways (in the form of isoflow distributors or not) may be on the backside of the retentate plate, or the second surface of the retentate plate/sheet, which means that they are "on top" of the channel, rather than one above and one below.

It is desirable that the volume of the internal passageways and manifolds of a cUTF module be as small as possible without generating an excessive pressure drop. An aspect of embodiments of this invention is that the volume of the internal passageways and manifold used to collect the retentate aliquot be lower than the combined volume of the cUTF channels to reduce mixing, and therefore, minimize dilution of the retentate aliquot during the recovery step. Additionally, the configuration of the internal passageways and distributors should reduce bias in distributing or collecting preferentially from some channels in the parallel array of channels. In embodiments in which the distances separating channels in the array are large, isoflow distributors can be used advantageously to reduce inefficient distribution in the collection of the retentate aliquot. In some embodiments the volume of the internal passageways for collecting the retentate aliquot is less than about 50 percent of the combined volume of the cUTF channel, in other embodiments it is less than about 25 percent of the combined volume of the cUTF channel, and in still other embodiments it is less than about 10 percent of the combined volume of the cUTF channel.

It will be understood that the array of cUTF channels 1200 is not required to be rectangular and for the channels to be parallel. Although the embodiments shown here possess a rectangular geometry having parallel channels, it is possible to design cUTF channels having other geometries, including radial and hexagonal. The important aspect of a cUTF channel array is that the channels be of uniform hydraulic permeability to ensure uniform flow throughout the array.

An aspect of embodiment disclosed herein, is the recovery of the BL within the cUTF channel. In general, the more complete the recovery of the BL the higher the permeation flux of the subsequent loading step and therefore, the higher the productivity of the cUTF process. The recovery step uses the displacement of the retentate aliquot (or retentate fraction): the material contained within the cUTF channel at the end of the loading step. A goal is displacement of about 100 percent of the retentate compartment (i.e., the volume of liquid within the cUTF channel) with zero dilution. Furthermore, the displacement of the retentate compartment needs to be accomplished by introducing a fluid into the cUTF channel, the displacement fluid. Therefore, the "zero dilution" criterion means that the volume of the displacement fluid should be almost equal to the retentate volume. This idealization is, of course, impossible to achieve in practice. However, it is possible to displace a large fraction of the retentate fraction (e.g., about 70 percent to about 95 percent of the retentate fraction included in the cUTF channels) with a small amount of dilution (e.g., less than about 50 percent, and preferably less than about 20 percent dilution).

There are multiple methods for displacement of the retentate and the recovery of the BL at the BL at the end of the loading step. In general, the displacement fluid can be introduced in at least one the following ways:

(1) through the membrane using the permeate fraction generated during the loading step and accumulated within the permeate compartment, whereby the permeate is forced back into the cUTF channel by virtue of a negative TMP (permeate has a higher pressure than the cUTF channel). This method is referred to as "reverse permeation."

(2) through the feed manifold using either the feed stream or the wash stream or some other displacement fluid, including gas. This method is referred to as "feed displacement."

It is noted that it is also possible to displace the retentate fraction from the retentate end (and out the feed end) of the cUTF channel but this is less desirable. In one embodiment, the retentate is recovered from the feed end of the cUTF channel (as described in FIG. 4) and that a displacement fluid be introduced on the retentate end of the cUTF channel. In single-ended cUTF channels (as shown in FIGS. 4A and 4B), the retentate fraction can only be collected in the same end used to inject the feed stream.

Any of these displacement methods can be used alone, sequentially, simultaneously, or any combination thereof. Which method is selected is determined by which method yields the highest recovery of the BL with minimum dilution.

Figure 13A:
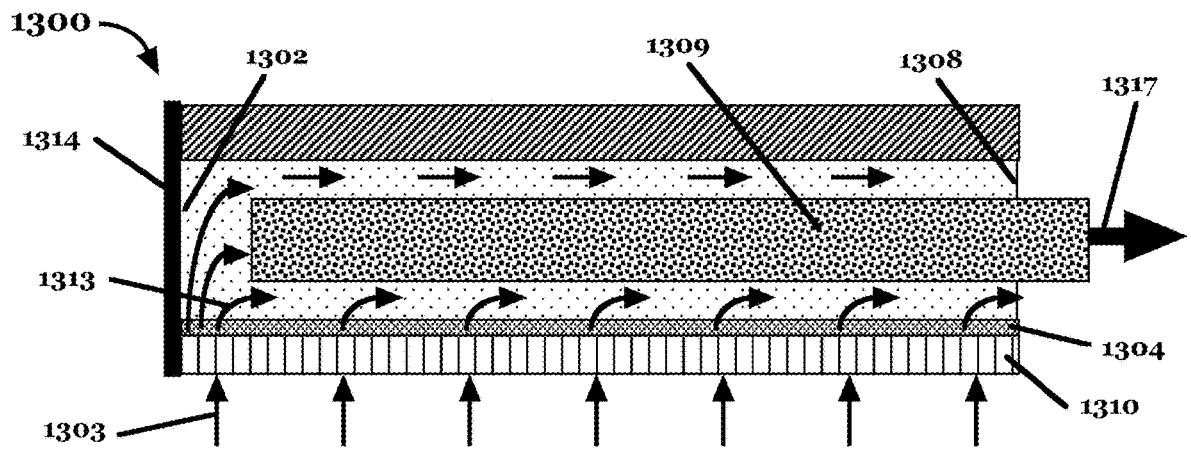
FIGS. 13A-13C are schematic diagrams of methods for the recovery of a retentate aliquot according to embodiments disclosed herein.
Figure 13B:
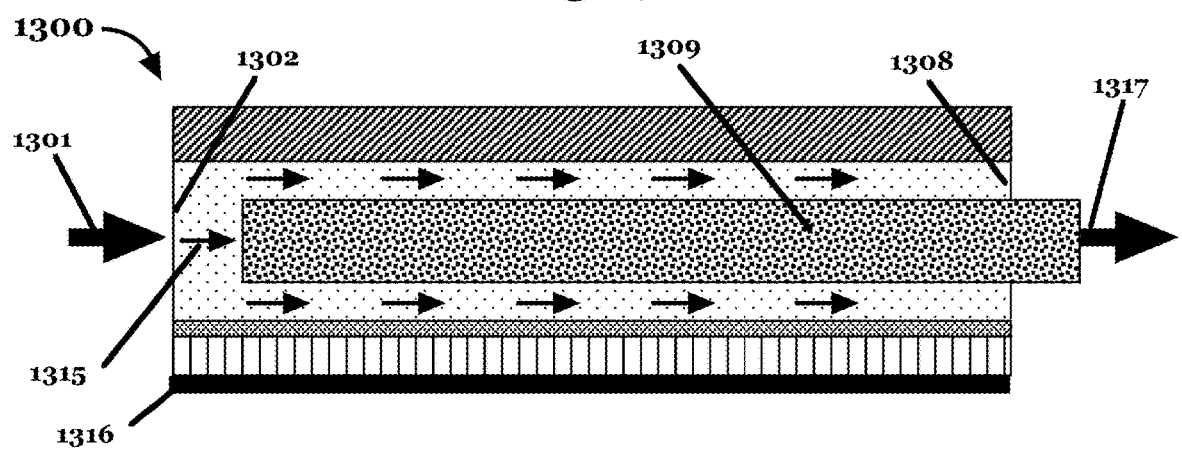
Figure 13C:
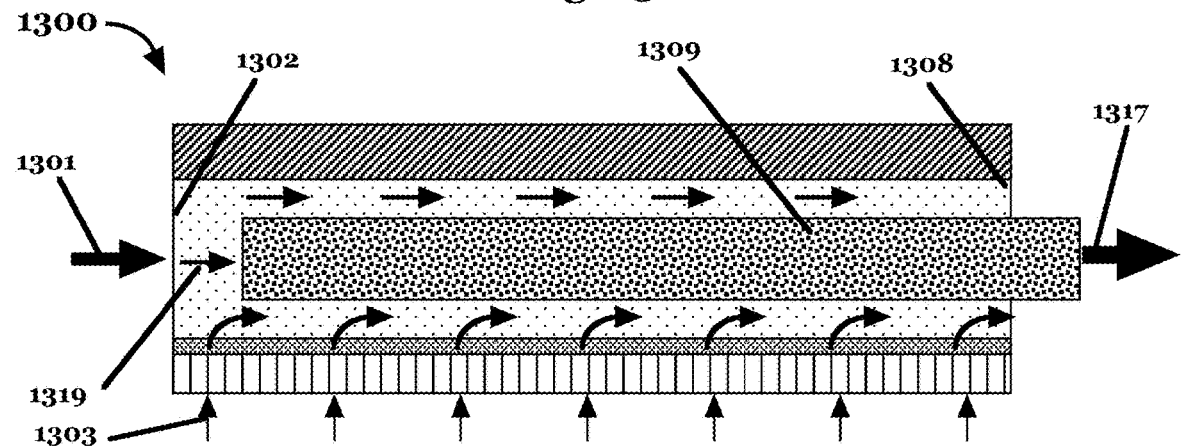

FIGS. 13A-13C show schematic diagrams of a cUTF channel 1300 during the recovery step under various methods for the displacement of the retentate aliquot. FIG. 13A is a schematic diagram of retentate recovery by Reverse Permeation. FIG. 13B is a schematic diagram of retentate recovery by feed injection. FIG. 13C is a schematic diagram of retentate recovery by combined Reverse Permeation and feed injection. The black solid line in FIG. 13A denotes that the feed stream is shut-off during the recovery cycle, whereas the black solid line in FIG. 13B denotes that the permeate stream is shut-off during the recovery cycle.

FIG. 13A is a schematic diagram showing displacement by reverse permeation only. After BL 1309 has been built up at the end of the loading step the following sequence of actions occurs simultaneously or in quick succession (recovery sequence): feed valve is shut as represented by the solid vertical line 1314 at the feed end 1302 of cUTF channel 1300; permeate compartment 1310 is actively pressurized by closing permeate pressurization valve and pressurizing permeate pressurizer (if active permeate pressurization is used); and retentate valve is opened. This recovery sequence induces reverse permeation 1303, further generating displacement flow indicated by arrows 1313 within cUTF channel 1300. Displacement flow indicated by arrows 1313 first lifts BL 1309 from the surface of membrane 1304, and then starts to displace it towards the retentate end 1308 of cUTF channel 1300 as shown by arrows 1313 generating the retentate flow indicated by arrow 1317, and the retentate aliquot is collected by the retentate manifold on the retentate end 1308 of cUTF channel 1300. The displacement flow indicated by arrows 1313 is maintained until a desired amount of retentate is collected, at which point the recovery sequence is reversed: retentate valve is shut, and permeate compartment 1310 is de-pressurized by venting the permeate pressurizer (if active permeate pressurization is used) and opening permeate pressurization valve, feed valve is opened. These steps almost immediately stop the retentate flow indicated by arrow 1317 and almost immediately start the loading step in the next cycle.

FIG. 13B is a schematic diagram showing displacement by feed displacement only. After BL 1309 has been built up at the end of the loading step the following sequence of actions occurs simultaneously or in quick succession: the permeate pressurization valve is shut as represented by solid horizontal line 131; and after a preset dwell time retentate valve is opened. This recovery sequence injects feed stream 1301 into feed end 1302 of cUTF channel 1300 inducing a displacement flow as represented by arrows 1315, generating retentate flow indicated by arrow 1317 which is collected by the retentate manifold on the retentate end 1308 of cUTF channel 1300. The displacement flow indicated by arrows 1315 is maintained until a desired amount of retentate is collected, at which point the recovery sequence is reversed: retentate valve is shut; and the permeate pressurization valve is opened. These steps almost immediately stop retentate flow indicated by arrow 1317 and restart the loading step in the next cycle. The dwell time in the recovery sequence may be necessary to enable the pressure in the permeate compartment 1310 to equilibrate with the feed pressure. It will be appreciated that even when the permeate pressurization valve is shut, there will be some forward permeation in the upstream end of the cUTF channel and an identical amount of reverse permeation in the downstream end of the cUTF channel. This occurs due to the TCP within the cUTF channel, generating what those skilled in the art know as Starling flow.

FIG. 13C is a schematic diagram showing displacement by a combination of reverse permeation and feed displacement. After BL 1309 has been developed at the end of the loading step the following sequence of actions occurs simultaneously or in quick succession: permeate compartment 1310 is actively pressurized by pressurizing the permeate pressurizer (if active permeate pressurization is used) and closing the permeate pressurization valve; and after a preset dwell time retentate valve is opened. This recovery sequence simultaneously induces reverse permeation 1303 and injects feed stream 1301 into feed end 1302 of cUTF channel 1300, inducing a displacement flow as represented by arrows 1319, generating retentate flow indicated by arrow 1317 which is collected by the retentate manifold on the retentate end 1308 of cUTF channel 1300. The displacement flow indicated by arrows 1319 is maintained until a desired amount of retentate is collected, at which point the recovery sequence is reversed: retentate valve is shut, and permeate compartment is de-pressurized by venting permeate pressurizer (if active permeate pressurization is used) and opening the permeate pressurization valve immediately stopping retentate flow indicated by arrow 1317 and restarts the loading step in the next cycle. The dwell time in this recovery sequence may be necessary to have the pressure in the permeate compartment 1310 equilibrate before opening the retentate valve.

The combination of reverse permeation and feed injection may be advantageous with the BL 1309 being first lifted by reverse permeation flow 1303 followed by efficient displacement of the retentate aliquot within cUTF channel 1300. There appears to be an optimal combination of the two displacement flows, which leads to the definition of the displacement ratio, p, as the ratio of displacement volume produced by feed injection to displacement volume produced by reverse permeation, $$\rho = \frac{V_{fi[ml]}}{V_{rp[ml]}} \quad (3)$$

Where
  $V_{fi}$=displacement fluid volume produced by feed injection [ml]
  $V_{rp}$=displacement fluid volume produced by reverse permeation [ml]

In some embodiments the displacement ratio is between about one and about twenty, in other embodiments the displacement ratio is between about three and about nine.

Since the desired concentration factor is simply the volume of feed stream loaded divided by the volume of the retentate collected in a single cycle, it will be appreciated that the decision to collect more or less retentate during the recovery step dictates the amount of feed stream loaded in one cycle.

Another aspect of the recovery step is the total volume of displacement fluid produced, which is equal to the retentate volume collected during the recovery step. In some embodiments the volume of retentate collected in one recovery cycle is approximately equal to the volume of the retentate compartment; in other embodiments it may be less, as low as about 50 percent of the volume of the retentate compartment; in still other embodiments it may be more, as much as 1.5 times the volume of the retentate compartment. In cUTF concentration processes the (volumetric) concentration factor, $\chi$, is determined by the ratio of the volume of feed stream loaded (i.e., the volume of the feed aliquot) to the volume of the retentate collected in a single cycle (i.e., the volume of the retentate aliquot):

$$\chi = \frac{V_{L[ml]}}{V_{R[ml]}} \quad (4)$$

Where
  $V_L$="load volume"=volume of feed aliquot [ml]=the volume of feed stream permeated during the loading step [ml]; and
  $V_R$="retentate volume"=volume of retentate aliquot [ml] =the volume of retentate stream collected during the recovery step [ml].

It will be appreciated that the decision to collect more or less retentate during the recovery step dictates the amount of feed stream loaded in one cycle. In some embodiments, recovering more or less than the volume of the retentate compartment in a cUTF module in a cycle may deliver better overall productivity. This is due to a tradeoff between the amount of residual solute leftover within the cUTF channel. A larger retentate volume results in a lower the residual leftover amount, and regarding the load volume, a larger the load volume results in a lower average flux of the loading step. The optimal point dictated by this tradeoff is best determined experimentally for a given process, starting with collecting a retentate volume equal to the volume of the retentate compartment and then varying that amount up and down.

It will also be appreciated that the thickness of the BL may vary along the length of the cUTF channel due to several factors. There is a TCP within the cUTF channel during the loading step, which means that the TMP in the feed end of the channel is higher than that on the retentate end of the channel, resulting in a slightly higher permeation flux at the feed end of cUTF channel, making the BL thicker there. Further, due to the tangential velocity within the cUTF channel during the loading step, there is a migration of the concentrated solute towards the retentate end of the cUTF channel, making the BL thicker there. Furthermore, because the permeation flux is diminished with increasing BL thickness, the thicker the BL the lower the permeation, mitigating the second factor. For cUTF channels of this invention, whereby the dimensionless length is less than about 1000, the TCP is small compared to the TMP, and the second factor tends to be more pronounced. This means that there is a concentration profile (i.e., a BL thickness profile) such that the thickness of the BL at the retentate end of the channel is higher than that at the feed end of the channel. Therefore from these factors it may be advantageous to collect a retentate volume smaller than the volume of the retentate compartment.

Figure 14B:
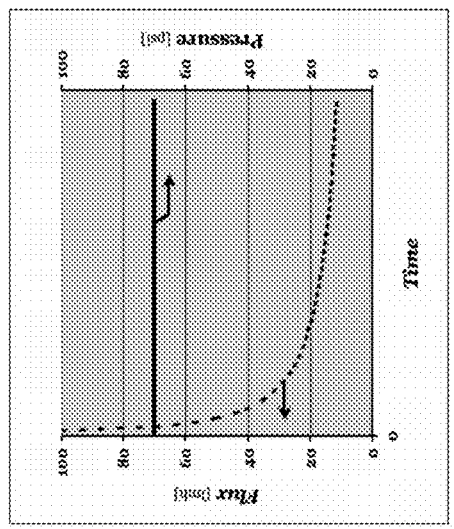
FIG. 14B is a Flux and Pressure profile of a Constant Pressure cUTF CONC process of FIG. 14A.
Figure 14D:
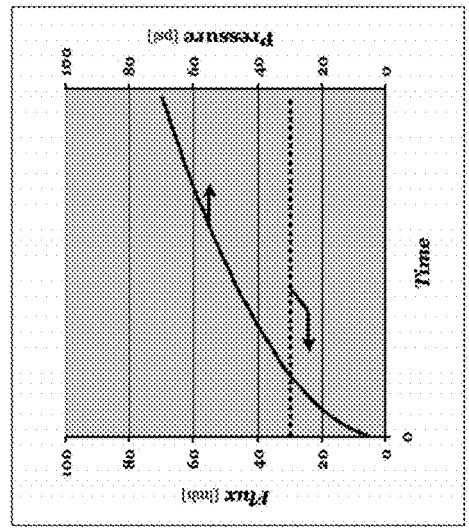
FIG. 14D is a Flux and Pressure profile of a Constant Flux cUTF CONC process of FIG. 14C.
Figure 14A:
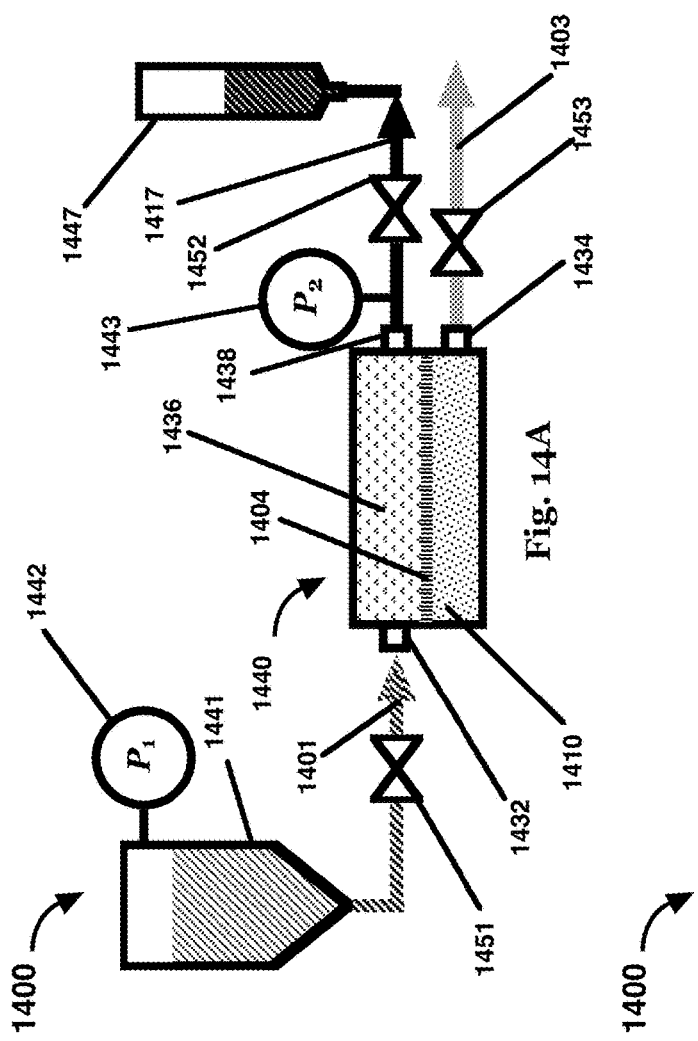
FIG. 14A is a process and instrumentation (P&I) diagram of exemplary Constant Pressure cUTF concentration (CONC) system according to embodiments disclosed herein.
Figure 14C:
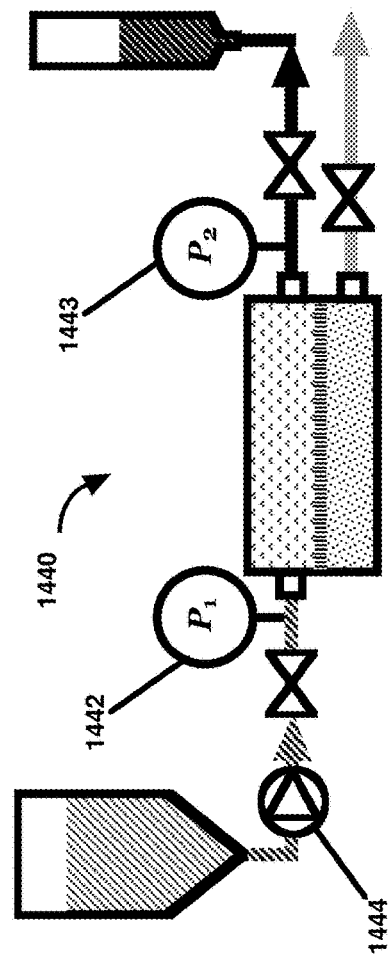
FIG. 14C is a P&I diagram of exemplary Constant Flux cUTF CONC system according to embodiments disclosed herein.

FIGS. 14A and 14C are schematic diagrams of exemplary cUTF concentration systems and FIGS. 14B and 14D are graphs of corresponding flux and pressure profiles. Now referring to FIG. 14A an exemplary cUTF system 1400 includes a cUTF module 1440 connected to feed reservoir 1441 and a retentate reservoir 1447 through feed valve 1451 and retentate valve 1452, respectively. The cUTF module 1440 further includes a membrane 1404 separating an interior of said cUTF module into a retentate compartment 1436 and a permeate compartment 1410. The cUTF module 1440 further includes a feed port 1432 fluidly coupled to a first end of the retentate compartment 1436, a retentate port 1438 fluidly coupled to a second end of the retentate compartment 1436 and a permeate port 1434 fluidly coupled to the permeate compartment 1410. The feed port 1432, retentate port 1438 and permeate port 1434 are connected to feed stream 1401, retentate stream indicated by arrow 1417 and permeate stream 1403, respectively. The cUTF system 1400 further includes a retentate valve 1452 coupled to the retentate port 1438; a permeate pressurization valve 1453 coupled to the permeate port 1434; a cycle controller includes at least one of a timing circuit to control the retentate valve 1452 and the permeate pressurization valve 1453, a load detector to control the retentate valve 1452 and the permeate pressurization valve 1453 and a recovery detector to control the retentate valve 1452 and the permeate pressurization valve 1453.

In operation feed valve 1451, retentate valve 1452 and permeate pressurization valve 1453 are used by cycle controller to control the load and recovery steps, including the recovery sequence described above, depending on the state of the respective valve (e.g., closed or open position and vented or pressurized). In this exemplary cUTF system 1400, feed reservoir 1441 is pressurized by compressed air to the desired feed pressure $P_1$, (e.g., 483 kPa or 70 psi), as represented by pressure sensor 1442, whereas retentate reservoir 1447 is at atmospheric pressure. To initiate the loading step feed valve 1351 is opened with retentate valve 1452 closed and permeate pressurization valve 1543 open. In one embodiment, after a predetermined and preset load time, experimentally determined to ensure that the desired aliquot volume of feed stream is loaded (e.g., injected) the loading step is stopped by closing permeate pressurization valve 1453. In this embodiment, this action pressurizes the permeate compartment, and after a predetermined and preset dwell time, experimentally determined to ensure that the permeate pressure is sufficiently close to the feed pressure, retentate valve 1452 is opened to initiate the recovery step. In this embodiment, the recovery step is continued for a predetermined and preset recovery time, experimentally determined to ensure that the desired aliquot volume of retentate aliquot is collected. The recovery step is stopped and the loading step of the next cycle is initiated by reversing the recovery sequence: retentate valve 1452 is closed; and permeate pressurization valve 1453 is opened. The recovery time determines the volume of retentate collected in retentate reservoir 1447 in each cycle; the longer the recovery time the larger the retentate volume collected. In some embodiments load times are less than about 10 minutes; in other embodiments load times are less than about five minutes; in other embodiments load times are less than about three minutes. In some embodiments recovery times are less than about one minute; in other embodiments recovery times are less than about ten seconds; in still other embodiments recovery times are less than about three seconds. Due to the internal compressibility of cUTF module 1430 it takes some time for the pressure in permeate compartment 1410 to equilibrate to feed pressure 1442. If the recovery process relies on reverse permeation, then a certain time (e.g., the dwell time) needs to be given for the permeate to reach sufficient pressure to induce reverse permeation when the retentate valve 1452 is opened. In some embodiments the dwell time is less than about two minutes; in other embodiments the dwell time is less than about one minute. The dwell time depends on the physical properties of cUTF module 1440, and therefore, which is best determined experimentally. In this embodiment the recovery cycle utilizes a combination of feed injection and reverse permeation to displace the retentate aliquot within the retentate compartment 1436; as such, feed valve 1451 remains open all the time, and with the closing of permeate pressurization valve 1453 the permeate compartment is gradually pressurized. As described above, due to the internal compressibility of cUTF module 1440 relatively long dwell times of more than one minute may be necessary. The cUTF system 1400 may be operated with alternative recovery sequences, some of which may reduce the dwell time. Exemplary embodiments of alternative recovery sequences are: the feed valve 1451 is first closed, the permeate pressurization valve 1453 is left open and the retentate reservoir 1447 is under vacuum followed by opening of retentate valve 1452; permeate pressurization valve 1453 is first closed and after a short dwell time feed valve 1451 is then closed allowing permeate compartment 1410 to become pressurized followed by opening retentate valve 1452 (with retentate reservoir 1447 at atmospheric pressure). It will be appreciated that cUTF system 1400 supports many alternative recovery sequences; which one is used will be dictated by the application and other considerations. FIG. 14B is a graph of the flux and pressure profiles of the loading step in exemplary constant pressure cUTF concentration process. The feed pressure, in this embodiment, 483 kPa (70 psi), remains constant throughout the load cycle. In contrast, the flux decays with time as already explained in FIG. 8A. One advantage of the constant pressure cUTF process is that it delivers the highest productivity by using the highest possible feed pressure throughout the load cycle; another advantage is that no pumps are required (of course, feed reservoir 1441 must be capable of withstanding the feed pressures).

FIG. 14C is a process and instrumentation diagram (P&ID) of an alternative embodiment of a cUTF concentration process. In contrast to the constant pressure cUTF process shown in FIG. 14A, this cUTF process utilizes a feed pump 1444 instead of a pressurized feed reservoir 1441. In one embodiment feed pump 1444 is a positive displacement pump, making the process a constant flux cUTF process. The recovery sequences just described in connection with FIG. 14A are also possible with a constant flux cUTF process, except that whenever feed valve 1451 is closed, positive displacement feed pump 1444 must also be shut-off. FIG. 14D is a graph of the flux and pressure profiles of the loading step in exemplary constant flux cUTF concentration process. The feed pressure starts very low and gradually increases until the maximum desirable feed pressure is reached, in this embodiment 483 kPa (70 psi). In contrast, the flux remains constant throughout the load cycle. The pump-driven cUTF process may be advantageous in applications where the feed reservoir is not capable of withstanding the (high) desired feed pressures. However, in constant flux embodiments (where a positive displacement feed pump is utilized) the productivity will be lower than that possible with a constant pressure cUTF process because the average feed pressure is lower than the maximum possible pressure. In other embodiments feed pump 1444 may be able to deliver a constant pressure, for example by utilizing a positive displacement pump with feedback control loop that modulates the speed of the pump in order to maintain a constant pressure, or alternatively, by utilizing of a pneumatically-driven diaphragm pump.

Figure 15A:
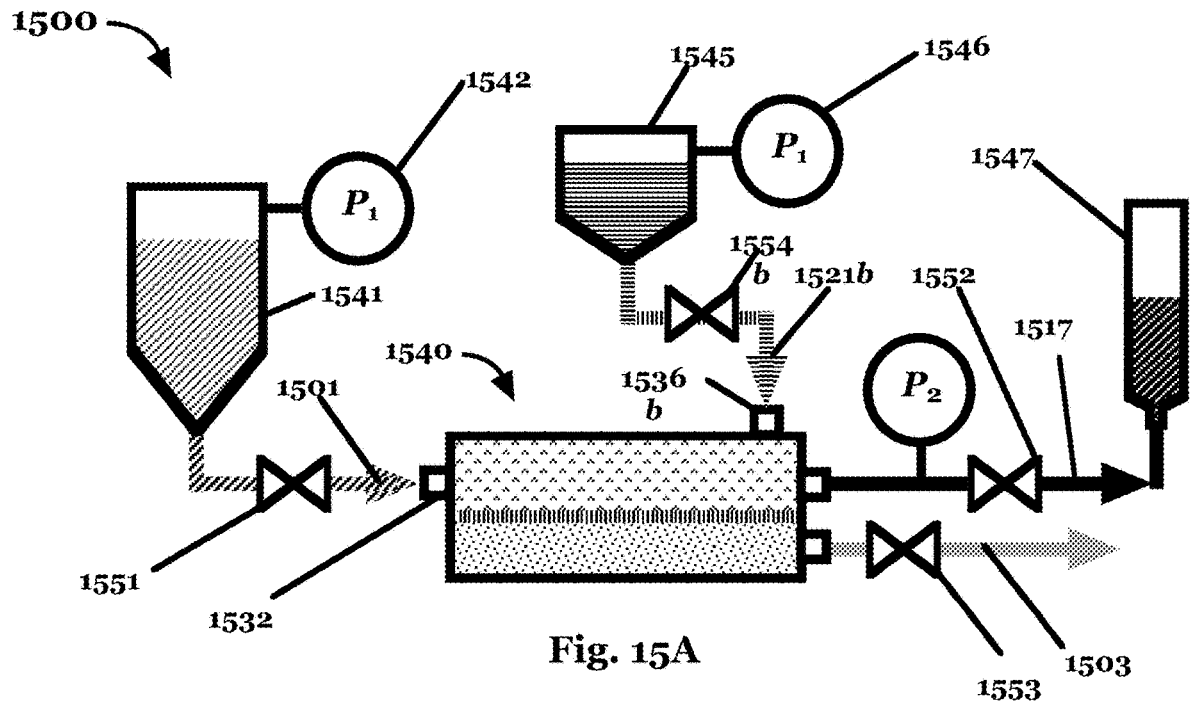
FIGS. 15A and 15B are P&I diagrams of exemplary cUTF washing processes according to embodiments disclosed herein.
Figure 15B:
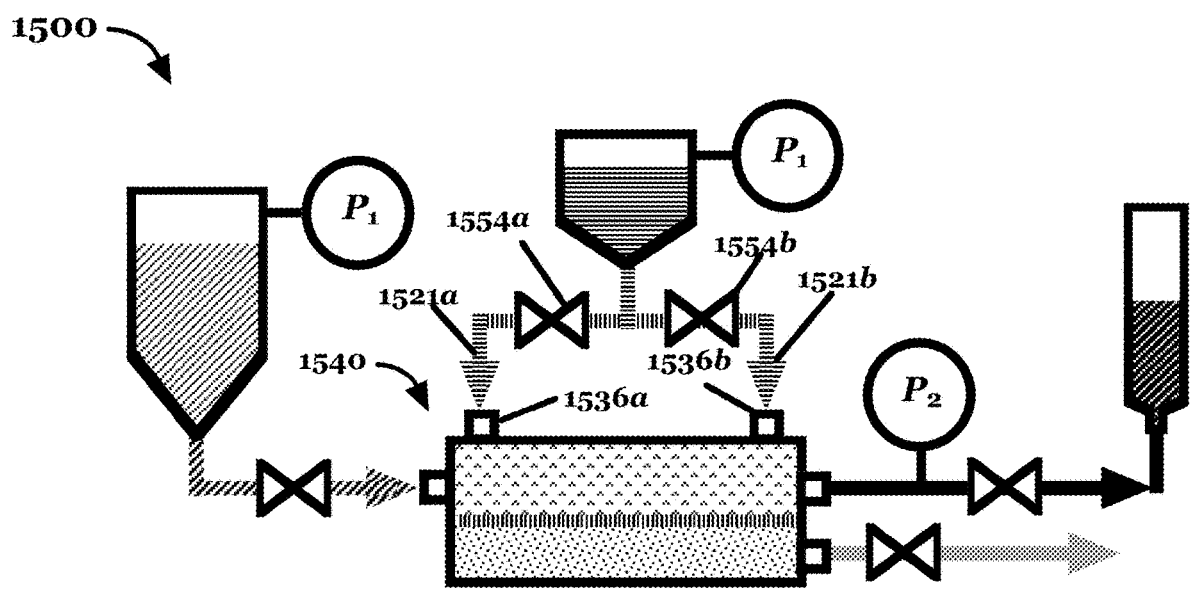

FIGS. 15A-15B are P&I diagrams of exemplary constant pressure cUTF washing processes. The cUTF module includes at least one wash port and a corresponding wash shut-off valve connected to the cycle controller controllably coupling a wash source 1545 through a plurality of wash distribution passageways to at least one of the feed end of the array of substantially similar channels, and the retentate end of the array of substantially similar channels. FIG. 15A is a P&ID of one embodiment of a constant pressure cUTF washing process with a single wash stream injection on the retentate end of the cUTF module. The cUTF system 1500 includes cUTF washing module 1540 connected to feed reservoir 1541, retentate reservoir 1547 and wash source reservoir 1545, through feed valve 1551, retentate valve 1552 and wash valve 1554b, respectively. The cUTF washing module 1540 includes additional wash port 1536b connected to wash stream 1521b on retentate end of cUTF washing module 1540. Valve 1551, 1552, 1553 and 1554*b* are used by cycle controller to control the loading, washing and recovery steps, including the recovery sequence described earlier, according to the valves being in the close or open position. In this embodiment feed reservoir 1541 and wash reservoir 1545 have been pressurized by compressed air to the desired feed pressure $P_1$, (e.g., 689 kPa or 100 psi), as represented by pressure sensors 1542 and 1546, whereas retentate reservoir 1547 is at atmospheric pressure. To initiate the loading step feed valve 1551 is opened, retentate valve 1552 closed, permeate pressurization valve 1553 opened and wash valve 1554*b* closed. After a preset load time the loading step is stopped and the wash step initiated by simultaneously closing feed valve 1551 and opening wash valve 1554*b* for a preset wash time. After the preset wash time is completed the wash step is stopped and the recovery step initiated by means of this recovery sequence: and permeate pressurization valve 1553 is closed; and after a preset dwell time retentate valve 1552 is opened for a preset recovery time or recovery volume. The recovery step is stopped and the loading step of the next cycle is initiated by performing the load sequence: retentate valve 1552 is closed; and wash valve 1554*b* is closed and feed valve 1551 and permeate pressurization valve 1553 are simultaneously opened. The wash time is selected according to the amount of wash volume required, which is ultimately determined experimentally, the larger the desired removal factor the larger the wash volume and the longer the wash time. Load, dwell and recovery times are selected according to the criteria described earlier.

FIG. 15B is a P&ID of an alternative embodiment of a constant pressure cUTF washing process having two wash streams, with wash injection on both the feed and retentate ends of the cUTF module. Hereafter, in embodiments having two wash streams the wash stream on the feed end of the module will be referred to as the "first wash" or "wash-1" stream, whereas that on the retentate end of the module will be referred to as the "second wash" or "wash-2" stream. Likewise, the valves and ports associated with these two wash streams will be designated similarly, with the wash-1 stream connecting to the wash-1 port through the wash-1 valve, and the wash-2 stream connecting to the wash-2 port through the wash-2 valve.

Referring to FIG. 15B, in contrast to the cUTF washing process shown in FIG. 15A, cUTF system 1500 includes two wash streams: wash-1 stream 1521*a* and wash-2 stream 1521*b*; two wash valves: wash-1 valve 1554*a* and wash-2 valve 1554*b*; and a cUTF washing module 1540 having two wash ports, wash-1 port 1536*a* and wash-2 port 1536*b*. Wash-1 port 1536*a* injects wash-1 stream 1521*a* to the feed end of cUTF module 1540, whereas wash-2 port 1536*b* injects wash stream 1521*b* to retentate end of cUTF module 1540. To initiate the loading step, feed valve 1351 is opened with retentate valve 1552 closed, permeate pressurization valve 1553 open and wash valves 1554*a* and 1554*b* closed. After a preset load time the loading step is stopped and the wash step initiated by closing feed valve 1551 and simultaneously opening wash valves 1554*a* and 1554*b* for a preset wash time. After the preset wash time is completed the wash step is stopped and the recovery step initiated by means of this recovery sequence: permeate pressurization valve 1553 and wash valve 1554*b* are closed; and after a preset dwell time retentate valve 1552 is opened for a preset recovery time. The recovery step is stopped and the loading step of the next cycle is initiated by performing the load sequence: retentate valve 1552 is closed; and wash valve 1554*a* is closed while feed valve 1551 and permeate pressurization valve 1553 are simultaneously opened. Load, wash, dwell and recovery times are selected according to the criteria described earlier. The cUTF washing process having two wash streams may deliver improved washing for several reasons: wash streams are injected into both feed and retentate ends of cUTF retentate compartments, washing the BL from both ends of the retentate channels; and the wash stream on the feed end of the module is used as the displacement fluid rather than the feed stream. It will be appreciated that other embodiments of cUTF washing processes may have a single wash stream connected to a port on the feed end of the cUTF module. In general, more than two wash streams may be used, understanding that each wash stream uses a separate washing loop having its own wash stream shut-off valve.

In another embodiment the wash streams may be opened in alternate and intermittent fashion creating a series of partial washing steps. For example, the wash-2 stream may be injected first with no injection of the wash-1 stream. After a certain volume of the wash-2 stream has been injected, the controller shuts off the wash-1 valve and opens the wash-2, switching from one wash stream to the other. The time to switch from one stream to the other may be the same or may be different; furthermore, switching form one wash stream to the other may occur in rapid fashion. In still other embodiments partial washing steps may occur sequentially as described in combination with washing from both streams simultaneously. The combined set of partial washing steps, whether sequential or simultaneous, includes a single washing step in the cUTF washing process. These intermittent washing strategies may be advantageous in washing solutes that migrate from one end of the channel to the other end as a result of the sweeping action of the washing fluid flowing within the channel, which may change the thickness of the BL along the length of the channel.

Other embodiments may use load, wash and retentate aliquot detectors that allow the control of the volume or mass of the respective feed, wash-1, wash-2 and retentate aliquots instead of using timers. In those embodiments the cycle controller switches the appropriate valves to step the cUTF system through each step according to the volume or mass of the aliquot detected at every step, rather than according to the time of each step. In some of the embodiments discussed earlier the recovery process calls for closing the permeate pressurization valve, inducing the permeate compartment to be pressurized. In those embodiments the pressurization of the permeate compartment occurs by virtue of permeation of the feed stream into the permeate compartment, which is a gradual process requiring relatively long dwell times of about one to about two minutes. It was discovered that if the permeate is actively pressurized (e.g., by pumping a portion of the permeate stream back into the permeate compartment) the dwell times can be made very short, on the order of a few seconds and possibly as low as fractions of a second. Embodiments utilizing active pressurization of the permeate compartment are referred to as "pressurized permeate" embodiments, the act of pressurizing the permeate as "permeate pressurization," and the apparatus that effects the pressurization of the permeate as the "permeate pressurizer."

Figure 16A:
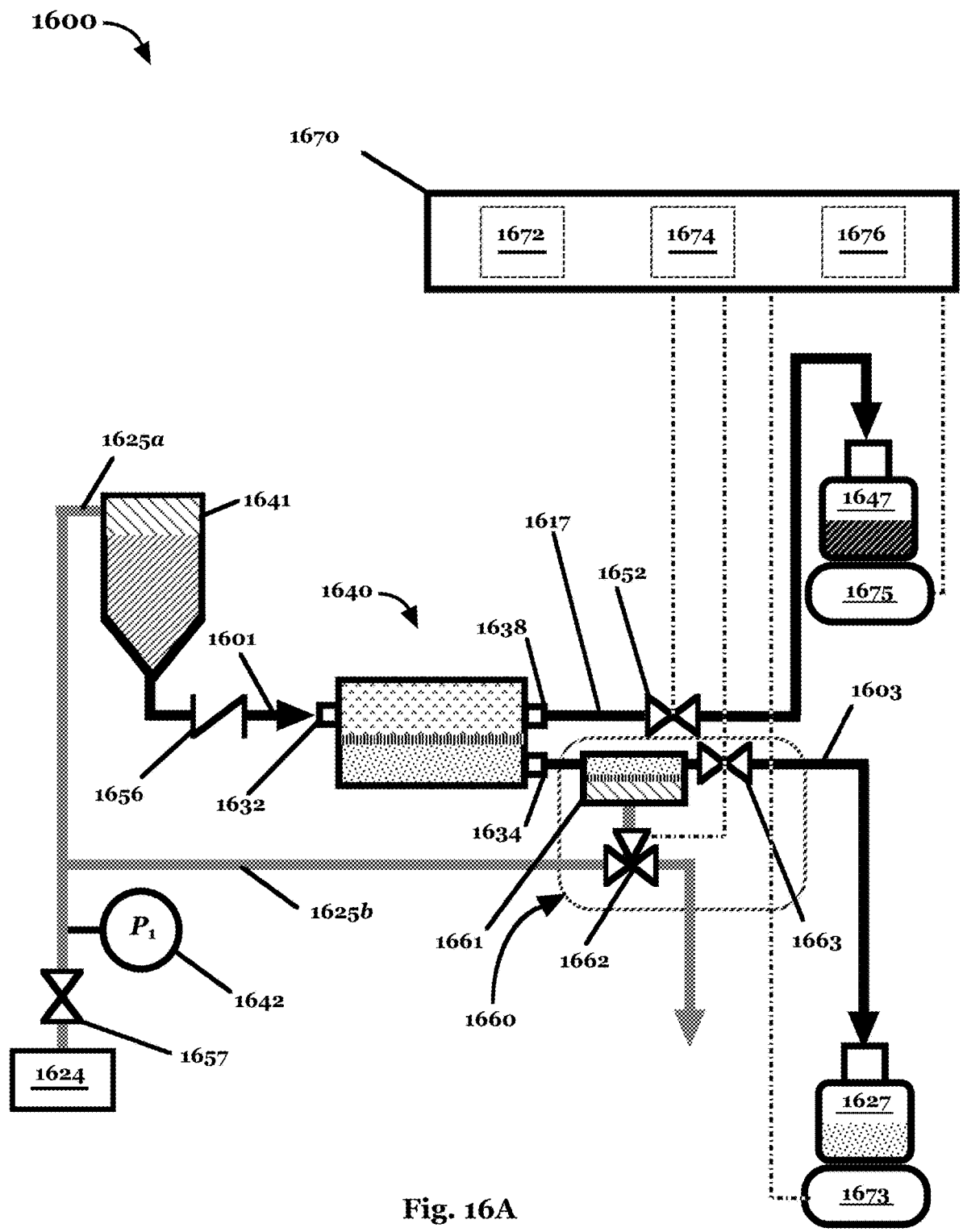
FIG. 16A is a P&I diagram of an exemplary cUTF CONC process with the retentate aliquot displaced by pressurizing the permeate compartment according to embodiments disclosed herein.

FIG. 16A is a P&I diagram of an exemplary cUTF concentration process with a recovery step utilizing permeate pressurization. The cUTF concentration system 1600 includes cUTF concentration module 1640, pressurized feed reservoir 1641, retentate reservoir 1647 (at atmospheric pressure), permeate pressurizer 1660, permeate reservoir 1627 (at atmospheric pressure), compressed air supply 1624 including compressed air lines 1625a and 1625b and system controller 1670.

The permeate pressurizer 1660 further includes a permeate accumulator 1661, a pressurizing/venting valve 1662 (e.g., a three-way valve) and permeate pressurization valve 1663. In some embodiments, permeate accumulator is a hydraulic component similar to a diaphragm pump, including two cavities, a first cavity that accumulates a portion of the permeate stream, and a second cavity, separated from the first cavity by an impervious diaphragm, that accepts compressed air. The combination of the venting valve 1662 and a pressure source is referred to herein as a ventable pressure source and is coupled to the permeate accumulator via the venting valve 1662. In other embodiments permeate accumulator 1661 is a piston and cylinder assembly, pneumatically or electrically driven, to inject a portion of the permeate fraction accumulated within the permeate accumulator into the permeate compartment.

In operation, compressed air line 1625a pressurizes feed reservoir 1641, whereas compressed air line 1625b pressurizes permeate pressurizer 1660; both lines are fed by compressed air supply 1624 through compressed air valve 1657. The process is started by placing valve 1657 controlling air supply 1624 in the open position, said action pressurizing feed reservoir 1641. System controller 1670 drives the process steps automatically by actuating the elements necessary to place the process in one of four sequential steps. In use, feed reservoir injects feed stream 1601 into feed port 1632 of cUTF module 1640 through check valve 1656; retentate stream 1617 is withdrawn from retentate port 1638 of cUTF module 1640 and collected into retentate reservoir 1647 through retentate valve 1652; permeate stream 1603 is withdrawn from permeate port 1634 of cUTF module 1640 through permeate pressurizer 1660 and directed to permeate reservoir 1627. These streams are fed, withdrawn/collected in sequence according to the rapid cycled cUTF process.

By actuating in unison pressurizing/venting valve 1662 and permeate pressurization valve 1663, the permeate pressurizer 1660 effectively pressurizes the permeate compartment of module 1640 to the same pressure as the feed stream, $P_1$, as represented by pressure sensor 1642. Therefore, the permeate pressurizer has two states as follows: the "pressurized" state in which 3-way valve 1662 selects the compressed air side and permeate pressurization valve 1663 is shut, and the "vented" state in which 3-way valve 1662 selects the vent side and permeate pressurization valve 1663 is open. It will be appreciated that there are many different ways of designing a permeate pressurizer. One embodiment includes a hydraulic element capable of placing the permeate line connected to the permeate port 1634 of cUTF module 1640 into one of the two states: pressurized and vented.

After pressurizing the feed reservoir 1641 by opening compressed air valve 1657, the loading step is initiated by placing the permeate pressurizer 1660 in the vented state, thereby inducing a TMP between the retentate compartment and the permeate compartment of SF module 1640. After the load time has elapsed the loading step is stopped and the recovery step initiated by the following recovery sequence: the permeate pressurizer 1660 is placed in the pressurized state; and after a dwell time has elapsed retentate valve 1652 is opened. Check-valve 1656 prevents the retentate fraction in the retentate compartment from flowing back into the feed reservoir, which in this embodiment would be undesirable since the retentate aliquot is being collected from retentate port 1634. After the recovery time has elapsed the retentate valve 1652 is closed simultaneously to placing the permeate pressurizer 1660 in the vented state. The load and recovery steps are automatically repeated by controller 1670 as many times as required to process the feed stream in full. It will be appreciated that although the same pressure is used to pressurize the necessary streams, that in some embodiments it may be advantageous to use different pressures. Likewise, pumps can be used instead of compressed air to pressurize the different streams as discussed earlier, including pneumatically-driven diaphragm pumps.

Figure 16B:
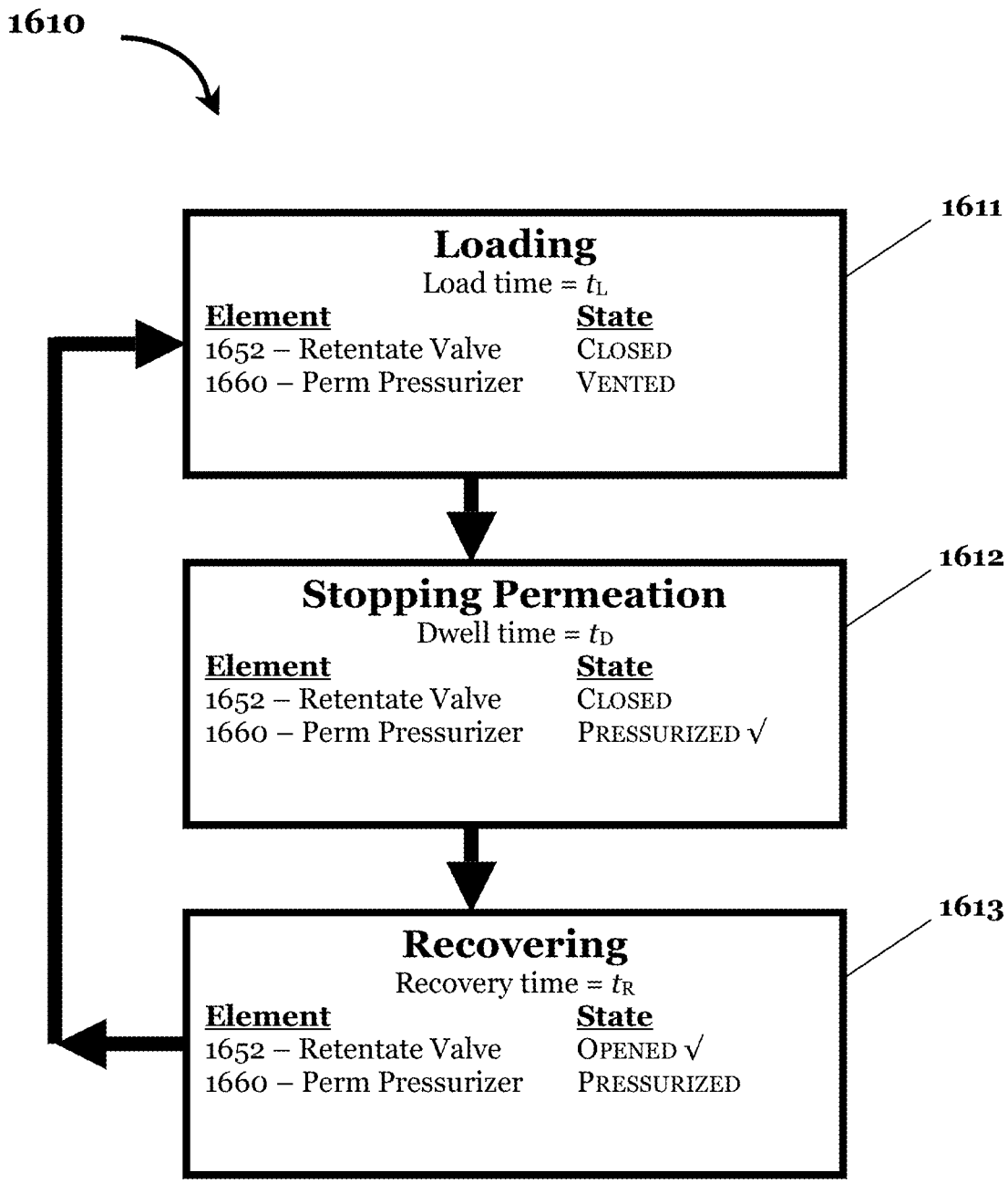
FIG. 16B is a Flow Diagram of cUTF CONC Process of FIG. 16A.

FIG. 16B is a flow diagram 1690 of the cUTF concentration process with permeate pressurization. Referring to FIGS. 16A and 16B, the states of the retentate valve 1652 and the permeate pressurizer 1660 are controlled either by the load detector 1672 including a sensor 1673 to detect the volume or mass of a feed aliquot, the recovery detector 1674 including a sensor 1675 to detect the volume or mass of a retentate aliquot, or timer circuit 1676 using three predetermined timer delays load time, $t_L$, dwell time, $t_D$, and recovery time, $t_R$. Venting valve 1662 is part of the permeate pressurizer 1660 including at least two valves. The control elements, the load detector 1672, the recovery detector 1674, or timer circuit 1676, can be used alone or in combination. These steps are automatically and repetitively executed by system controller 1670, resulting in a cycle repeated continuously until the feed stream has been fully processed. The load detector 1672 can operate in conjunction with a volume or mass sensor 1673 of the feed stream injected or the permeate stream generated during loading the feed aliquot (in this embodiment, a mass sensor on the permeate stream). The recovery detector 1674 can operate in conjunction with a volume or mass sensor 1675 of the retentate stream collected during recovery or a concentration sensor on the retentate stream collected during recovery.

In summary, the cUTF process is a process characterized by rapid cycling. In some embodiments load time, dwell time and recovery time are less than about 10 minutes, five seconds and 20 seconds, respectively; in other embodiments load time, dwell time and recovery time are less than about five minutes, one second and 10 seconds, respectively. The basic process includes loading a feed aliquot of the feed stream into the cUTF module through the feed port and inducing permeation of the feed stream to build a boundary layer by pressurizing the feed stream, closing the retentate valve and venting the permeate compartment in step 1611, stopping permeation in step 1612; and recovering a retentate aliquot in step 1613. The cUTF washing processes can also be operated utilizing active permeate pressurization by using a permeate pressurizer.

Figure 17A:
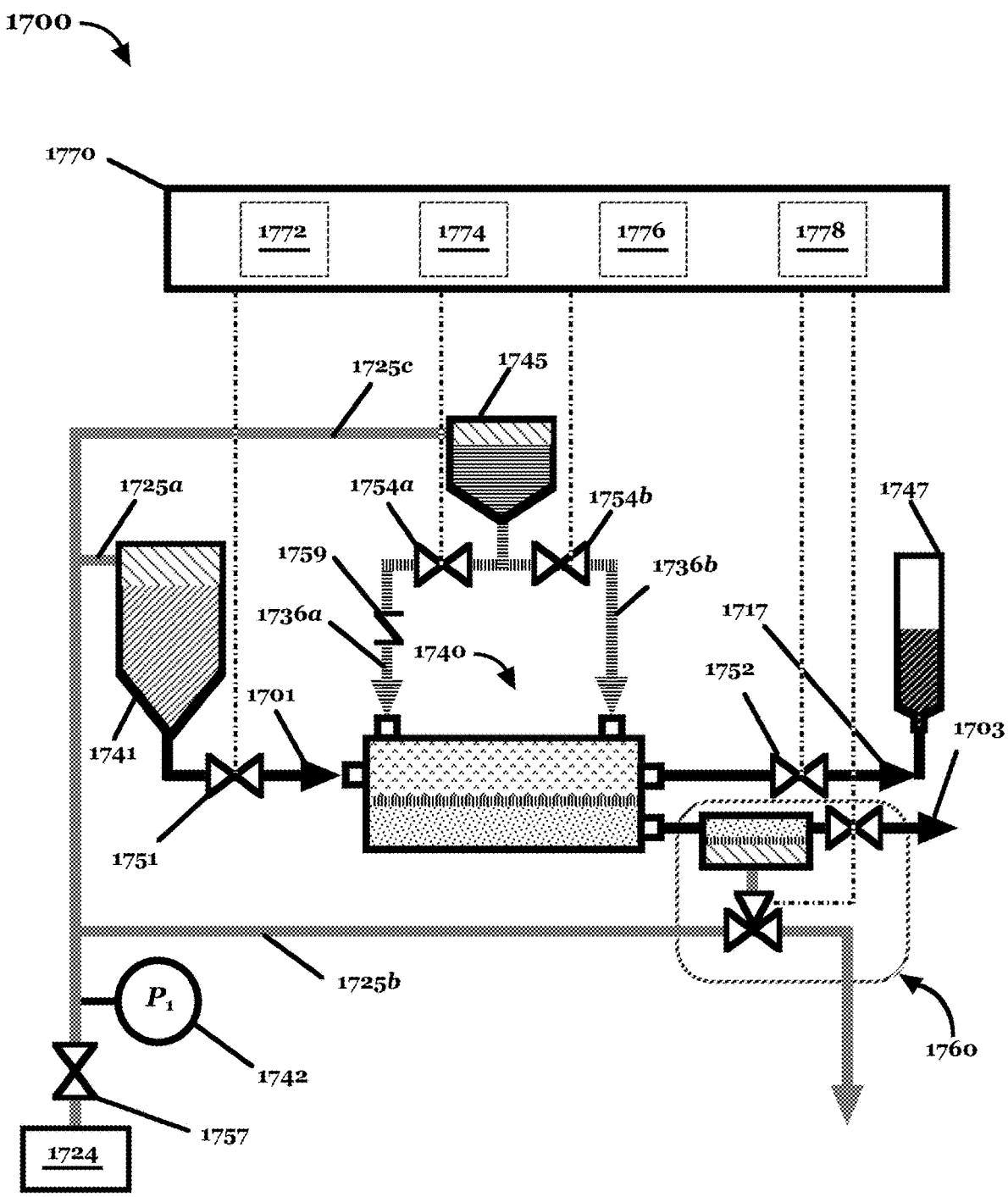
FIG. 17A is a P&I diagram of exemplary cUTF CONC/WASH process according to embodiments disclosed herein.

FIG. 17A is a P&I diagram of an exemplary cUTF washing process with a recovery step utilizing permeate pressurization. cUTF washing system 1700 includes cUTF concentration module 1740, pressurized feed reservoir 1741, pressurized wash reservoir 1745, retentate reservoir 1747 (at atmospheric pressure), the permeate pressurizer 1760 similar to permeate pressurizer 1660 of FIG. 16A, compressed air supply 1724 including compressed air lines 1725a, 1725b and 1725c, and system controller 1770. Compressed air lines 1725a, 1725b and 1725c pressurize feed reservoir 1741, the permeate pressurizer 1760 and wash reservoir 1745, respectively. The process is started by placing valve 1757 in the open position, the action pressurizing feed reservoir 1741 and wash reservoir 1745. System controller 1770 drives the process steps automatically by actuating the elements necessary to place the process in one of five sequential steps. In use, feed stream 1701 is fed to cUTF module 1740 through feed valve 1751; wash streams 1736a and 1736b are fed to cUTF module 1740 through wash valves 1754a and 1754b; retentate stream 1717 is withdrawn from cUTF module 1740 and collected into retentate reservoir 1747 through retentate valve 1752; permeate stream 1703 is withdrawn from cUTF module 1740 through the permeate pressurizer 1760 and directed to the next process step; of course, these streams are fed, withdrawn/collected in rapid succession according to a rapid-cycled four step cUTF process.

After pressurizing the feed reservoir 1741 reservoir by opening compressed air valve 1757, the loading step is initiated by placing the permeate pressurizer 1760 in the vented state, thereby inducing a TMP between the retentate compartment and the permeate compartment of cUTF module 1740. After the load time has elapsed the loading step is stopped and the recovery step initiated by closing feed valve 1751 and simultaneously opening wash valves 1754a and 1754b. After the wash time has elapsed the wash step is stopped and the recovery step initiated by the following recovery sequence: the permeate pressurizer 1760 is placed in the pressurized state and wash valve 1754b is simultaneously closed; and after a dwell time has elapsed retentate valve 1752 is opened. Check-valve 1756 prevents the liquid in the retentate compartment from flowing back into the wash reservoir 1745, which would be undesirable. After the recovery time has elapsed the retentate valve 1752 is closed and the permeate pressurizer 1760 is simultaneously placed in the vented state. The load, wash and recovery steps are automatically repeated by cycle controller 1770 as many times as required to process the feed stream in full. In this embodiment cycle controller 1770 comprises wash detector 1778 in addition to load detector 1772, recovery detector 1774 and timer circuit 1776. Load, wash and recovery detection may be based on timers, or on volume/mass sensors, or on a combination of timers and volume/mass sensors. It will be appreciated that although the same pressure is used to pressurize the necessary streams, that in some embodiments it may be advantageous to use different pressures for the different streams. Likewise, pumps can be used instead of compressed air to pressurize the different streams as discussed earlier, including pneumatically-driven diaphragm pumps.

Figure 17B:
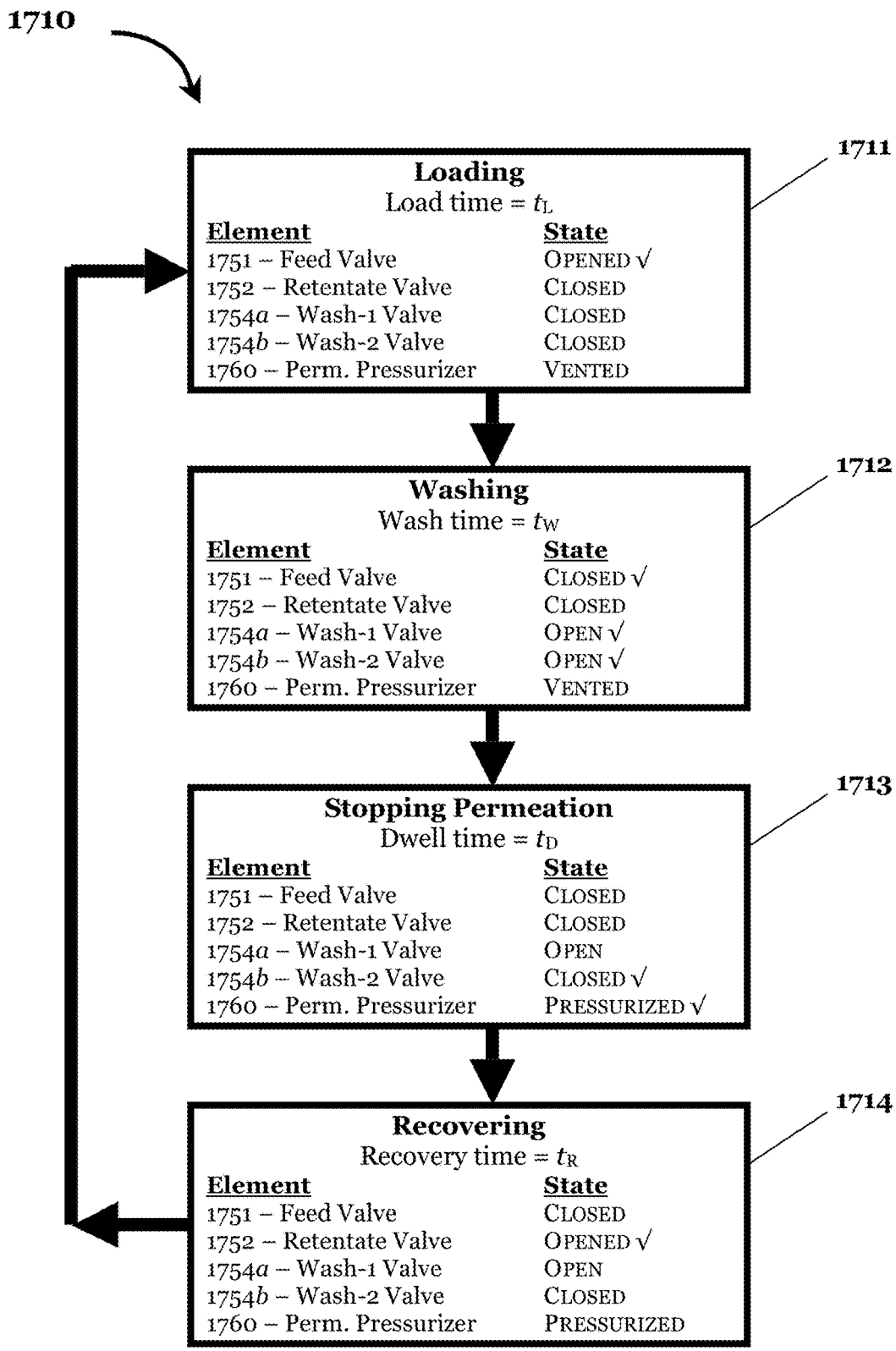
FIG. 17B is a Flow Diagram of cUTF CONC/WASH Process of FIG. 17A.

FIG. 17B is a flow chart of a cUTF washing process with permeate pressurization, showing that each cycle of this process has at least four distinct steps characterized by the state of five elements: feed valve 1751, retentate valve 1752, wash valves 1754a and 1754b, and the permeate pressurizer 1760 and four timer values: load time, $t_L$, wash time, $t_w$, dwell time, $t_D$, and recovery time, $t_R$. These steps are automatically repeated by the system cycle controller 1770, resulting in a continuous cycling process in which the cycles are repeated continuously until the feed stream has been fully processed or the process is terminated due to user action or a process event. In summary, the cUTF process is a semi-continuous process characterized by rapid cycling, each cycle identical to every other cycle. In some embodiments load time, wash time, dwell time and recovery time are less than about 10 minutes, about five minutes, about five seconds and about five seconds, respectively; in other embodiments load time, wash time, dwell time and recovery time are less than about five minutes, about three minutes, about one second and about two seconds, respectively.

Table 1 shows one embodiment of the cycle controller using elapsed time for controlling the various steps and sub-steps in a cUTF process. The embodiment depicted in Table 1 uses two wash streams where simultaneously injected through the wash-1 valve ("W1 Valve" on the feed end of the cUTF module) and through the wash-2 valve ("W2 Valve" on the retentate end of the cUTF module). In this embodiment the cUTF module does not have wash ports, so both wash streams are injected into the cUTF module through the feed and the retentate ports, respectively. The double wash washing step is executed between the Load step and the Permeate Pressurization step. However, only a single wash stream, the wash-1 stream (W1 valve), is used in the Recovery step. It is understood that sensors to detect the volume or mass of a feed aliquot and to detect the volume or mass of a retentate aliquot can be used instead of timers to control cUTF cycles.

In this embodiment, the main steps are: Load, Wash, Permeate Pressurization and Recovery. Table 1 shows the main steps, sub-steps, the state of each of the six valves used in the cUTF system for each sub-step, and the timer for each sub-step. A state of "0" means that the valve is de-energized, whereas a step of "1" means it is energized. Valves in this cUTF system are normally-closed valves except for the permeate pressurization valve, which is normally-open. Therefore a state of "0" indicates that a valve is CLOSED, except for the permeate pressurization valve, for which it indicates the valve is OPEN, and vice-versa for a state of "1." Table 2 shows a time range for each timer along with a predetermined default value.

The process begins with the cycle controller in a Stand-by State with the valves energized (i.e., valves are closed except for the permeate valve, which is open). The LOAD cycle begins in sub-step 1a to depressurize the permeate. Sub-step 1a provides time to allow complete venting of permeate pressurizer before opening the permeate (permeate) valve. This is a redundant step when starting a run. Permeation is started in sub-step 1b by opening (de-energizing) the permeate valve.

The wash step, Step 2, is started in sub-step 2a switching the cUTF system from loading to washing by closing the feed valve and opening both wash valves, W1 and W2, which are opened at the same time. During the wash step a built up boundary layer (BL) is washed between the steps of loading and stopping permeation. In another embodiment, washing includes washing first on the retentate end of the cUTF module followed by washing on the feed end of the cUTF module during every wash step of the cUTF process. Sub-step 2b winds down the feed pressure before the permeate pressurization step, Step 3, by closing both wash valves simultaneously.

In the permeate pressurization steps, permeation is first stopped in step 3a by the closing of the permeate pressurization valve. Next the permeate compartment is pressurized in sub-step 3b by activating the permeate pressurizer valve (PP), which rapidly pressurizes the permeate compartment to the same pressure at which the feed and wash streams were being injected. The timing of sub step 3b is important to prevent backflow. After the permeate compartment is pressurized, Recovery begins in step 4a by opening the retentate valve. Since the feed and wash valves are closed, displacement of the BL starts with a short burst of pure Reverse Permeation (RP) to induce lifting of the BL away from the membrane surface in sub-step 4a. In this embodiment the displacement of the retentate aliquot is supplemented by opening the wash-2 valve in step 4b, resulting in combined RP and injection of the wash-1 stream from the feed end of the channel ("FI"). Sub-step 4c stops the Recovery step by shutting off the retentate valve and after a short dwell time (to ensure that the retentate valve is fully shut), and Pre-load is initiated in sub-step 4d by opening the feed valve and simultaneously closing the wash-2 valve. In some embodiments the switching from the wash-2 to the feed stream may be done sequentially in two sub-steps rather than one sub-step with a short dwell between these two sub-steps. The process cycle is repeated by cycling back to sub-step 1a, and the cycling is repeated continuously until a predetermined number of cycles have been completed or when another event occurs (e.g., a measured volume or mass of the retentate fraction is collected during the process or the feed reservoir is consumed). In one embodiment, one complete cycle of repeating the main steps occurs faster than every five minutes; in other embodiments faster than about three minutes. In another embodiment, the feed aliquot is at least about four times greater than the retentate aliquot.

After the process is determined to be completed, the cycle controller ends the run in step 9. In sub-step 9a the feed stream is closed followed by depressurization of the permeate compartment in sub-step 9b. Finally the permeate pressurization valve is opened in sub-step 9c.

optimal recovery of retentate aliquot. The ratio of the two flow rates is referred to herein as a displacement ratio. In one embodiment, permeate pressurization enables control of the displacement ratio to prevent excessive dilution.

Figure 18:
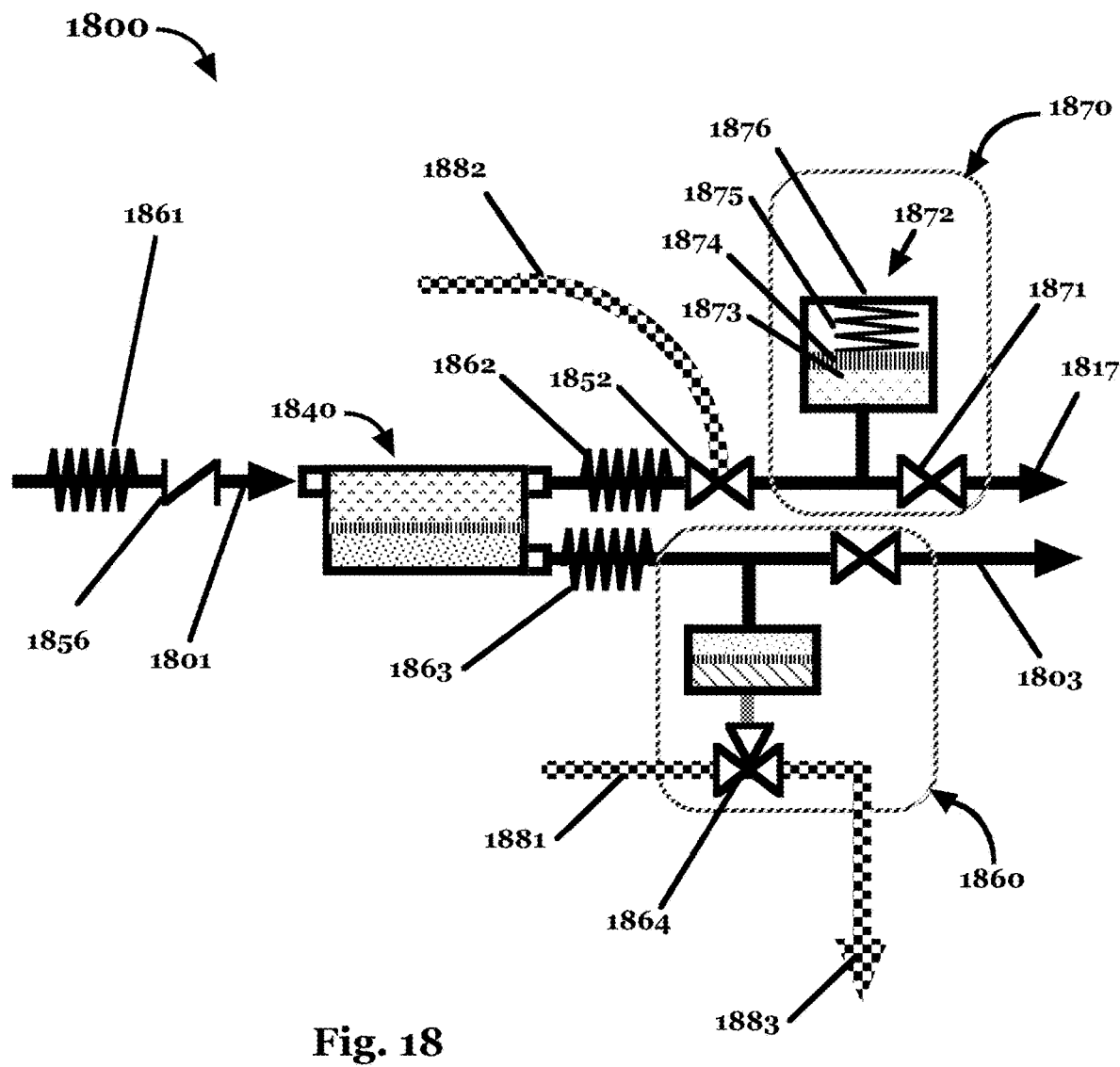
FIG. 18 is a schematic diagram of a cUTF system including additional control components according to embodiments disclosed herein.

FIG. 18 shows additional components of a cUTF system 1800 that enable the control and fine tuning of the displacement ratio, as well as other improvements. The cUTF system 1800 includes cUTF concentration module 1840, the permeate pressurizer 1860 coupled to permeate port through permeate hydraulic resistor 1863, feed hydraulic resistor 1861 and check-valve 1856 upstream of cUTF module 1840, and retentate hydraulic resistor 1862 and retentate valve 1852 downstream of cUTF module 1840. The cUTF system 1800 further includes a retentate aliquot collector 1870 and a retentate aliquot cavity 1873 having an adjustable constant cycle volume and fluidly coupled to the retentate port. The permeate pressurizer 1860 includes a permeate accumulator

TABLE 1

| Step | Sub-Step | FEED Valve | PERM Valve | PP Valve | RET Valve | W-1 Valve | W-2 Valve | Timer ID |
|---|---|---|---|---|---|---|---|---|
| 0 - SYSTEM IN STAND-BY STATE | | 0 | 0 | 0 | 0 | 0 | 0 | |
| 1 - LOAD | 1a - De-pressurize Permeate | 1 | 1 | 0 | 0 | 0 | 0 | 5 |
| | 1b - Start Permeation | 1 | 0 | 0 | 0 | 0 | 0 | 1 |
| 2 - WASH | 2a - Wash | 0 | 0 | 0 | 0 | 1 | 1 | 8 |
| | 2b - Wind-down Feed Pressure | 0 | 0 | 0 | 0 | 0 | 0 | 9 |
| 3 - PERMEATE PRESSURIZATION | 3a - Stop Permeation | 0 | 1 | 0 | 0 | 0 | 0 | 4 |
| | 3b - Pressurize Permeate | 0 | 1 | 1 | 0 | 0 | 0 | 2 |
| 4 - RECOVER | 4a - Pure Reverse Permeation | 0 | 1 | 1 | 1 | 0 | 0 | 7 |
| | 4b - Combined RP & FI | 0 | 1 | 1 | 1 | 1 | 0 | 3 |
| | 4c - Stop Recovery | 0 | 1 | 1 | 0 | 1 | 0 | 4 |
| | 4d - Pre-load | 1 | 1 | 1 | 0 | 0 | 0 | 4 |
| 9 - END RUN | 9a- Shut-off Feed | 0 | 1 | 1 | 0 | 0 | 0 | 4 |
| | 9b - De-pressurize Permeate | 0 | 1 | 0 | 0 | 0 | 0 | 5 |
| | 9c - Open Permeate | 0 | 0 | 0 | 0 | 0 | 0 | |

TABLE 2

| Timer ID | Time Range, Default Time [sec] |
|---|---|
| 5 | 0.2~4, 2 |
| 1 | 30~300, 60 |
| 8 | 30~300, 60 |
| 9 | 1~5, 2 |
| 4 | 0.1~1, 0.1 |
| 2 | 0.2~2, 2 |
| 7 | 0~10, 1 |
| 3 | 0~10, 4 |
| 4 | 0.1~1, 0.1 |
| 4 | 0.1~1, 0.1 |
| 4 | 0.1~1, 0.1 |
| 5 | 0.2~4, 2 |

It has been discovered that the recovery method operates efficiently by making the recovery cycle as short as possible and making the recovery cycle as effective as possible in terms of how much of the retentate is recovered in one cycle compared to how much dilution occurs. The wash-1 stream may be used instead of the feed stream to displace the retentate aliquot. Reverse permeation can be used alone to recover the retentate aliquot (referred to as pure reverse permeation). The feed or wash-1 stream can be used alone with no reverse permeation (referred to as pure feed injection). However, it will be appreciated that even zero net reverse permeation allows for some reverse permeation due to Starling flow. As described earlier, the combination of feed injection and reverse permeation may produce the coupled to a venting valve 1864 and a pressure source 1881 (ventable pressure source) which can be vented to atmosphere 1883.

During the recovery step, feed injection and reverse permeation are simultaneously induced when the permeate pressurizer 1860 is in the pressurized state and retentate valve 1852 is opened. Feed hydraulic resistor 1861, in conjunction with check-valve 1856, reduces the pressure of the retentate compartment at the feed end of the cUTF module 1840; the lower that pressure the larger the reverse permeation flow, and the lower the displacement ratio, and vice-versa. Furthermore, the speed at which the retentate stream is collected is controlled by the hydraulic resistance of the hydraulic resistor 1862 on the retentate stream. The displacement ratio and the recovery time can thus be controlled by selecting the hydraulic resistance of hydraulic resistor 1861, the crack pressure of check-valve 1856 and hydraulic resistance of hydraulic resistor 1862. The same elements or similar elements would be used in a cUTF washing process, except that the hydraulic resistor and the check-valve upstream of the cUTF module 1840 would be in one of the wash streams rather than on the feed stream. Having feed hydraulic resistor 1861 in the cUTF system coupled to the feed port of the cUTF module provides a means of adjusting the displacement ratio and thereby optimizing the BL recovery step.

In operation, the retentate aliquot collector 1870 enables recovering a predetermined but adjustable constant volume of retentate aliquot on successive cycles independently of the viscosity of the retentate fraction. In contrast, retentate recovery methods that rely on a timer will recover more or less retentate aliquot volume depending on the viscosity of the retentate fraction. In one embodiment, retentate aliquot collector 1870 includes housing 1876 further including retentate aliquot cavity 1873 bounded by piston 1874 (inside a cylinder) under continuous compression of spring 1875. Retentate aliquot collector also includes retentate release valve 1871, which empties retentate aliquot cavity 1873. Having emptied retentate aliquot cavity 1873, retentate release valve 1871 shuts off getting the retentate aliquot collector 1870 ready for the next retentate collection cycle according to the following steps:

Retentate valve 1852 opens for a specified period of time that exceeds the amount of time required to collect the predetermined volume of retentate aliquot.

Piston 1874 retracts under the pressure of the retentate compartment, which exceeds the compressive force created by spring 1875.

Retraction of piston 1874 is stopped by an adjustable mechanism (not shown), filling the retentate aliquot cavity to a predetermined volume. The filling of the retentate aliquot cavity occurs faster than the amount of time the retentate valve 1852 is open.

Retentate valve 1852 closes; the retentate collection cycle is finished.

Retentate release valve 1871 opens, which under the action of spring 1875 empties retentate aliquot cavity in full.

Retentate release valve 1871 closes; the retentate aliquot collector 1870 is now ready for the next retentate aliquot collection cycle.

The force of spring 1875 is selected to create a compression pressure intermediate between the pressure in the retentate compartment and that in the retentate reservoir (into which the retentate aliquot collector 1870 empties its contents), typically atmospheric pressure. It is understood that there are many ways of designing and constructing and adjustable volume retentate aliquot collector 1870. In this embodiment the adjustable constant volume is facilitated by the piston 1874 under compression by a spring 1875. In other embodiments pneumatic pressure may be used instead of a spring. In still other embodiments flexible diaphragms are used instead of a piston. In still other embodiments two constant volume cavities having flexible diaphragms and connected to each other by means of a hydraulic liquid whose volume is adjustable enable the creation of a simple and sanitary adjustable volume retentate collection cavity. These devices enable the reliable collection of a constant volume of retentate in each cycle, but having an adjustable constant volume.

In one embodiment, variable air pressure 1882 is provided to assist in shutting off one or more of the feed valve, the retentate valve and the permeate pressurization valve.

The amount of time required for retentate aliquot collection depends on the operating pressure, the hydraulic resistance of the retentate hydraulic resistor 1862, the force of spring 1875 and the viscosity of the retentate fraction. The method of restricting the flow rate of retentate fraction collected results in the effective lifting and displacement of the BL during the recovery step. This can readily be done by using a retentate hydraulic resistor 1862 coupled to the retentate port the hydraulic resistance of which has been appropriately selected (depending on the hydraulic resistance of the distribution passageways in the cUTF module, additional hydraulic resistance can be provided by hydraulic resistor 1862).

As described above, cUTF modules have at least two internal compartments: retentate and permeate compartments separated by the MF or UF membrane. In general, however, there are several types of membrane modules suitable for cUTF process, each type of module having several different configurations resulting in multiple configurations.

FIGS. 19A, 19B and 19C show schematic diagrams of cUTF modules having a single end, a feed end with internal distribution passageways and manifolds for two streams, feed/retentate distribution passageways and permeate distribution passageways, and at least two ports (a port being the external connection to each stream being fed to the cUTF module). These cUTF modules are referred to herein as Type-1 modules. Type-1 modules are similar to conventional dead-ended or "normal flow" modules used for conventional filtration used for processing a single feed stream and collecting a single permeate stream, and may be used in cUTF processes as described in FIGS. 4A and 4B. Type-1 modules share at least a portion of the feed passageways and manifolds for injecting the feed stream and collecting the retentate stream. FIG. 19A represents a Type-1 module 1910 having permeate port 1901 and feed port 1902, each port being in fluid communication with internal distribution passageways and manifolds for feed and permeate streams, respectively. In embodiments in which Type-1 module 1910 is used in a cUTF concentration process, feed port 1902 and its corresponding internal passageways and manifolds are also shared with the retentate stream; the same internal passageways used to inject a feed stream to Type-1 module 1910 are also used to collect a retentate stream. In other embodiments Type-1 module 1910 may be used in a cUTF washing process by sharing feed port 1902 and its corresponding internal passageways with the retentate stream and the wash stream; the same internal passageways used to inject a feed stream to Type-1 module 1910 are also used to inject a wash stream and to collect a retentate stream. In such cUTF concentration and washing processes the segregation of feed, wash and retentate streams is done externally to the Type-1 module 1910 at the level of the cUTF system. FIG. 19B shows another embodiment of a Type-1 module 1920 having three ports: permeate port 1901, and two ports on the feed end, a first feed-end port 1902 and a second feed-end port 1903. In use port 1902 may be used as the feed port to inject the feed stream and port 1903 may be used as a retentate port to collect the retentate stream; or vice-versa. The internal passageways connected to port 1902 may be fully shared with those connecting to port 1903, or may only be partially shared, with each port having some passageways exclusively dedicated to the stream connected to that port. In some embodiments Type-1 module 1920 may be used in a cUTF wash process, in which case the one of the two ports 1902 and 1903 are used with two of the three streams, feed, retentate and wash stream; in these embodiments the streams sharing the single are segregated externally to Type-1 module 1920 at the cUTF system level. FIG. 19C shows another embodiment of a Type-1 module 1930 having four ports: permeate port 1901, and three ports on the feed end, a first feed-end port 1902, a second feed-end port 1903 and a third feed-end port 1904. In use each of the ports 1902, 1903 and 1904 may be used for the feed, retentate or wash streams. The internal passageways connected to each port 1902, 1903 and 1904 may be fully shared by the other ports or may only be partially shared, with each port having some passageways exclusively dedicated to the stream connected to that port.

FIGS. 20A, 20B and 20C show schematic diagrams of cUTF modules having two ends, a feed end and a retentate end, with internal passageways and manifolds for three streams: feed, retentate and permeate passageways and at least three ports, one per stream. These cUTF modules are referred to herein as Type-2 modules. Type-2 modules are similar to conventional TFF modules used for concentration and washing processes and may be used in cUTF processes as described in FIGS. 5A and 5B. Type-2 modules have separate internal passageways for injecting the feed stream and collecting the retentate stream. FIG. 20A represents a Type-2 module 2010 having permeate port 2001, feed port 2002 and retentate port 2003, each port being in fluid communication with internal passageways and manifolds for permeate, feed and retentate streams, respectively; as such Type-2 module 2010 is particularly suited for cUTF CONC processes. In other embodiments Type-2 module 2010 may be used in a cUTF wash process by sharing feed port 2002 or retentate port 2003 and its corresponding internal passageways with the wash stream; which port is shared with the retentate stream will be dictated by the application. In cUTF wash processes utilizing Type-2 module 2010 the segregation of feed and wash streams, or retentate and wash streams, is done externally to Type-2 module 2010 at the level of the cUTF system. FIG. 20B shows another embodiment of a Type-2 module 2020 having four ports: permeate port 2001, two ports on the feed end, a first feed-end port 2002 and a second feed-end port 2004, and retentate port 2013 on the retentate end. In use port 2002 may function as the feed port to inject the feed stream and port 2004 may function to inject the wash stream, or vice-versa. The internal passageways connected to port 2002 may be fully shared with those connecting to port 2004a, or may only be partially shared, with each port having some passageways exclusively dedicated to the stream connected to that port (feed or wash stream). Type-2 module 2020 is well suited to be used in a cUTF washing process, each of the four streams having its own separate port. FIG. 20C shows another embodiment of a Type-2 module 2030 having five ports: permeate port 2001, two ports on the feed end, a first feed-end port 2002 and a second feed-end port 2004a, and two ports on the retentate end, a first retentate end port 2003 and a second retentate end port 2004b. In use ports 2002 and 2003 are used for the feed and retentate streams, respectively, whereas ports 2004a and 2004b are used for the wash streams. Type-2 module 2030 may be advantageous in some applications by delivering more efficient washing of the BL during the wash step. In some embodiments the wash stream connected to port 2004a may be used to displace the BL during the recovery step. The internal passageways connected to feed port 2002 may be fully shared with those connecting to wash port 2004a on the feed end of Type-2 module 2030 or may only be partially shared, with each port having some passageways exclusively dedicated to the stream connected to that port (feed or wash stream); likewise for the internal passageways connected to retentate port 2003 and wash port 2004b on the retentate end of Type-2 module 2030.

Figures 21A, 21B:
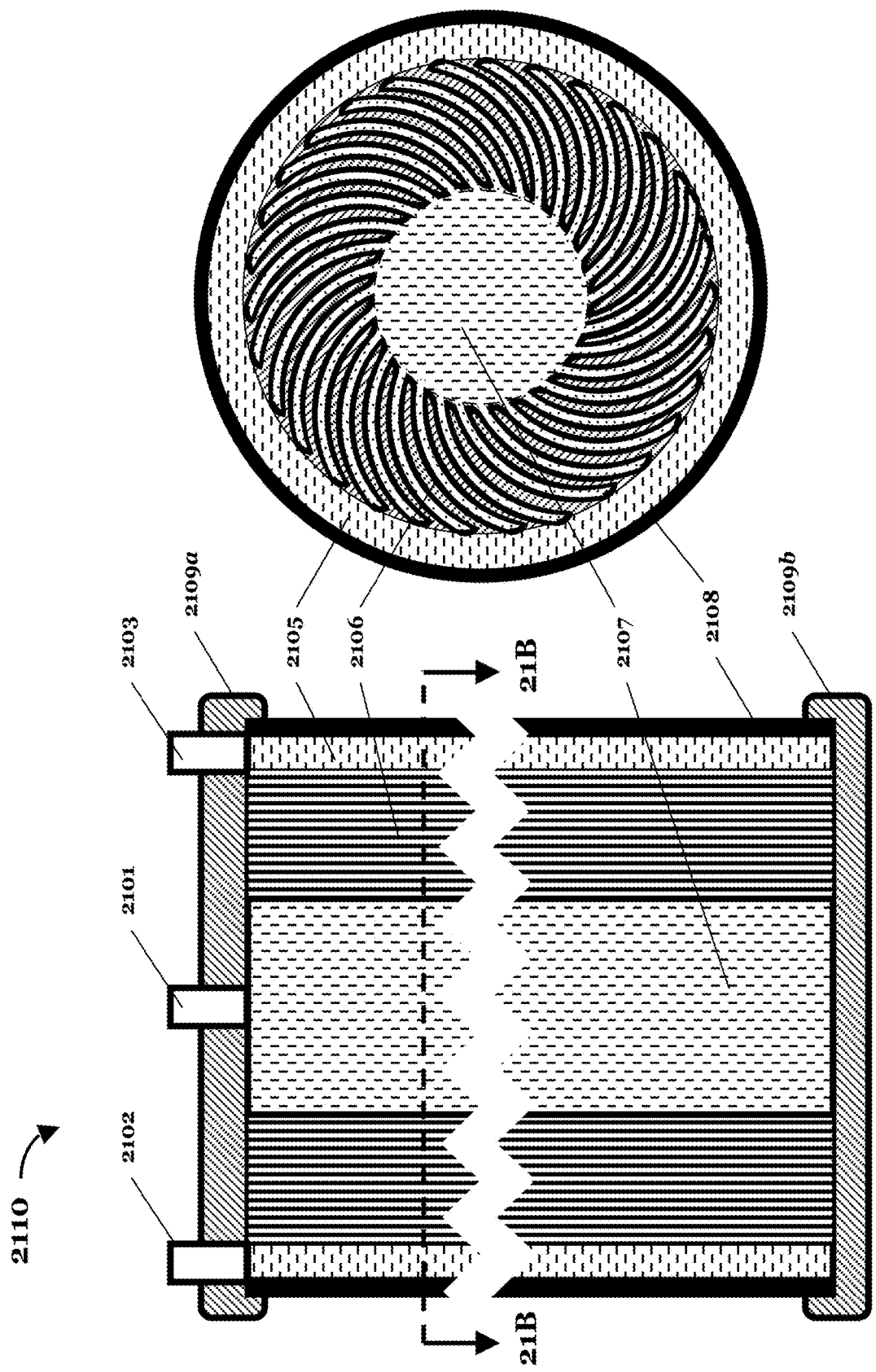
FIG. 21A is a schematic longitudinal cross-sectional view of an embodiment of a single-ended module using on pleated cartridge configuration according to embodiments disclosed herein.
FIG. 21B is a schematic radial cross-sectional view of an embodiment of the module of FIG. 21A showing tightly wound pleats curved over an inner core according to embodiments disclosed herein.

Type-1 modules are the simplest cUTF modules having single-ended cUTF channels and a fewer number of ports, as few as 2 ports. FIGS. 21A and 21B are schematic diagrams of an embodiment of a Type-1 module using on pleated cartridge configuration having tightly wound pleats curved over the inner core similar to the embodiments disclosed in U.S. Pat. No. 5,543,047 by Stoyell (and marketed by Pall Corporation under the Ultipleat™ trademark). FIG. 21A shows a cross-sectional longitudinal view of a pleated Type-1 module, and FIG. 21B shows a cross-sectional radial view along line 21B. Referring to FIGS. 21A and 21B, Type-1 module 2110 includes pleated separation element 2106 wound around core forming permeate compartment 2107. As shown in FIG. 21B pleated separation element 2106 further includes an array of cUTF channels created by pleating a membrane with a suitable spacer above and below using processes well-known to those skilled in the art. Each pleat of pleated element 2106 forms a single-ended cUTF channel with a single inlet and outlet on the outer diameter of the pleated element 2106, where the feed stream is distributed and the retentate stream collected from the array of cUTF channels by manifold 2105. Isoflow distributors may be built into manifold 2105 to improve the distribution of feed stream and collection of retentate stream to reduce the amount of mixing that occurs between the two streams. The length of the cUTF channel is about equal to the depth of the pleat, whereas the height of the cUTF channel is about equal to twice the thickness of the retentate spacer. Type-1 module 2110 also includes end caps 2109a and 2109b, permeate port 2103 in fluid communication with the permeate compartment 2107, feed port 2102 and retentate port 2103, the latter two in fluid communication with manifold 2105. Ports are located on the same "top" end cap 2109a. Type-1 module 2110 highlights some of the advantageous features of Type-1 modules. The fact that the ports are located on the same end of the module may make them easier to adapt to an application. Additionally, Type-1 module 2110 may be easier to fabricate, and therefore, less expensive that Type-2 cUTF modules.

Figure 22A:
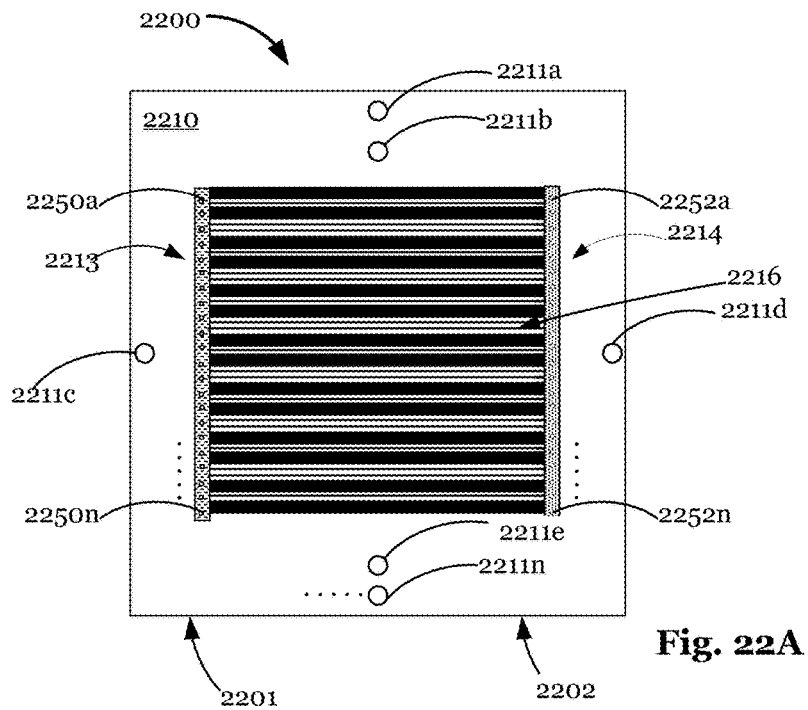
FIG. 22A is a schematic view of a first surface of a first planar sheet according to embodiments disclosed herein.
Figure 22B:
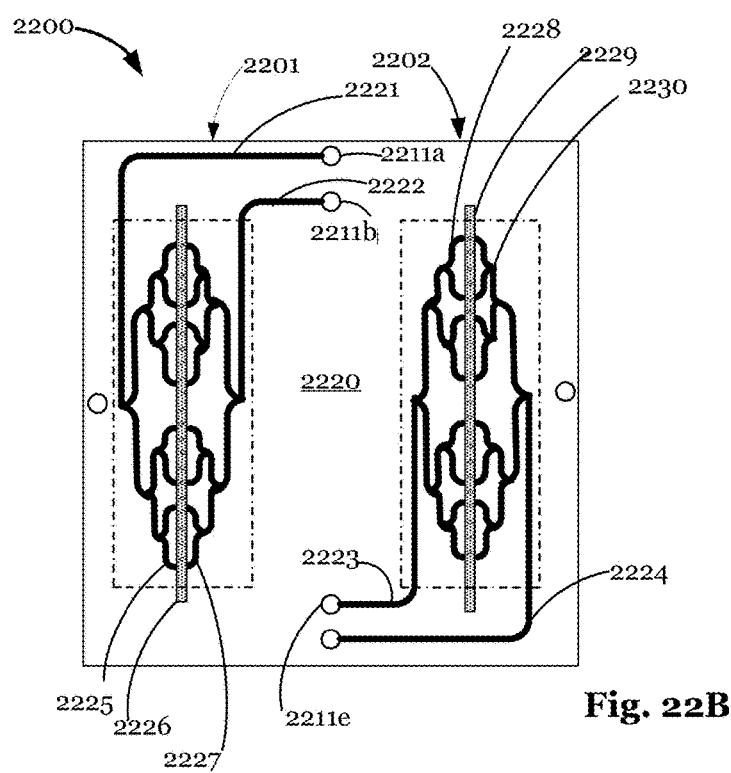
FIG. 22B is a schematic view of a second surface of a first planar sheet according to embodiments disclosed herein.
Figure 22C:
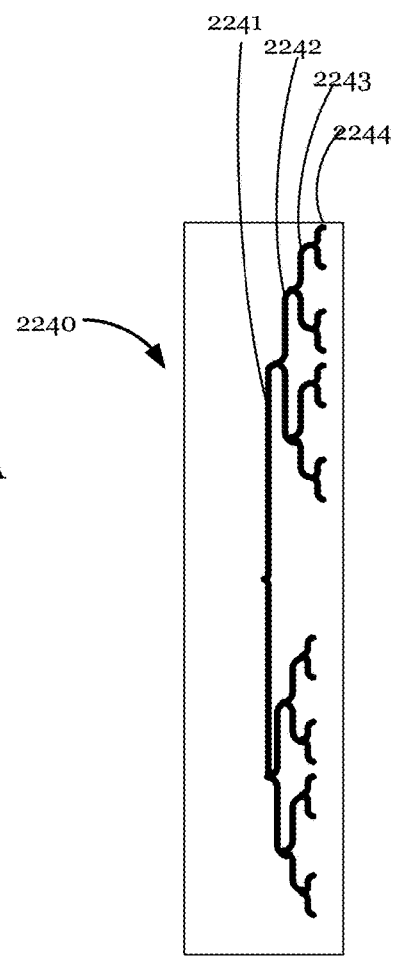
FIG. 22C is a schematic view of feed distribution passageways in a second surface of a first planar sheet according to embodiments disclosed herein.

FIGS. 22A, 22B and 22C describe the retentate plate fabricated by etching a glass plate or sheet suitable for a planar cUTF module. FIG. 22A is a plan view of the first surface (or "front" surface) of a first sheet that forms a retentate plate of a cUTF module having grooves embedded into the first surface of the first sheet. FIG. 22B is a plan view of the second surface (or "back" surface) of the first sheet of a cUTF module having grooves embedded into the second surface of the first sheet.

Now referring to FIG. 22A, an embodiment of a cUTF module similar to cUTF module includes a first planar sheet 2200 includes a first surface 2210 and a second surface 2220 (FIG. 22B). Here the first planar sheet is an etched glass plate. The first surface 2210 includes an array of substantially similar grooves 2216 (here parallel grooves) having a feed end 2201 and a retentate end 2202 (in this embodiment about 200 grooves in a 3.6 cm×3.6 cm array). The grooves in groove array 2216 are cUTF proto-channels, which when pressed against a membrane filter form the separation channels characteristic of cUTF modules. In this embodiment the grooves in groove array 2216 have a rectangular cross-section (as shown in FIG. 9A) with approximate dimensions as follows: depth of about 50 μm, width of about 150 μm, length of about 3.6 cm and ribs about 25 μm wide. When in use with a membrane filter in intimate contact with the groove array 2216, the grooves form channels having an effective channel height of about 50 μm and a dimensionless length of about 720.

Groove array 2216 abuts a proximal manifold groove 2213 on the feed end 2201 having an array of through holes 2250a-2250n (commonly referred to as through holes 2250) equally distributed along the length of manifold groove 2213. The through holes 2250 connect the first surface 2210 and second surface 2220 (FIG. 22B) of first sheet. Similarly, groove array 2216 abuts proximal manifold groove 2214 in retentate end 2202 having an array of through holes 2252a-22520n (commonly referred to as through holes 2252) equally distributed along the length of groove 2214 that connect the first surface 2210 and second surface 2220 (FIG.

22B) of first sheet. In one embodiment manifold grooves 2213 and 2214 have 64 through holes each and a rectangular cross-section (as shown in FIG. 9A) with the following dimensions: depth of about 50 µm, width of about 300 µm and length of about 3.6 cm. When in use with a membrane filter in intimate contact with the groove array 2216, manifold grooves 2213 and 2214 form proximal manifolds to the cUTF channel array on the feed end 2201 and retentate end 2202 of the cUTF channel array, respectively.

In operation, manifold groove 2213 serves to distribute the feed stream and the wash-1 stream, and manifold groove 2214 serves to collect the retentate stream and distribute the wash-2 stream. First surface 2210 also has passageways 2211a, 2211b, 2211c, 2211d, 2211e and 2211n, (collectively, passageways 2211) to feed and collect the streams being fed and collected from a cUTF stack. In general, a cUTF module may include more than one stack, a stack generally defined as a single membrane filter disposed between a retentate plate and a permeate plate to form a retentate and a permeate compartment, and including any other components required to seal the plates and feed and collect the various streams to and from the retentate and permeate compartments. Each stack is in general coupled fluidly in parallel to other stacks. Passageways 2211 of one stack are aligned with passageways 2211 of adjacent stacks, thus forming distribution passageways that run perpendicularly to the plane of the stack. Passageways 2211 are part of the network of distribution passageways used to feed and collect the streams being fed to and collected from each stack of a cUTF module. Passageways 2211 are located outside the region occupied by the groove array 2216. In some embodiments each passageway 2211 is dedicated to one stream, in other embodiments the same stream may use two or more passageways. In the embodiment shown in FIG. 22A and FIG. 22B passageways 2211 are used for a different stream except passageways 2211c and 2211d, which are used to collect or inject the permeate stream (i.e., they are both in fluid communication with the permeate compartment and the permeate ports). In this embodiment one of the permeate passageways 2211c or 2211d is used exclusively to collect the permeate stream and the other one is used exclusively to inject permeate stream during the recovery step to induce reverse permeation; in other embodiments they may be used interchangeably. The minimum number of passageways 2211 is equal to the minimum number of streams: three streams in a cUTF module suitable for a concentration process (feed, retentate and permeate), and four streams in a cUTF module suitable for a washing process (feed, wash, retentate and permeate). The total number of passageways 2211 will be dictated by the need to distribute and collect the different streams uniformly from the cUTF channel arrays included in the cUTF module, whether or not they are in different stacks or in the same stack of the cUTF module.

Referring now to FIG. 22B, second surface 2220 of first sheet includes a network of distribution grooves embedded into second surface 2220 that form distribution passageways when placed in intimate contact with an adjacent sheet having a solid surface without grooves (not shown). Hereafter the term "passageway" will generally be used to describe the function of the different grooves present in second surface 2220 with the understanding that the grooves are proto-passageways to be converted into a finished passageway only after pressed against a solid surface. Second surface 2220 include passageways 2221, 2222, 2223 and 2224 to feed/collect the various streams being fed and/or collected into a cUTF stack through passageways 2211. Second surface 2220 further includes passageways 2225, 2227, 2228 and 2230 to distribute each stream into the cUTF channel array on the first surface (array 2216 in FIG. 22A). In this embodiment, passageways 2225, 2227, 2228 and 2230 form flow distributors to obtain uniform distribution across the width of the cUTF channel array. The feed stream emanates from passageway 2211e on the second surface 2220 and is directed by passageway 2223 to isoflow distributor 2228 which delivers sub-streams into manifold passageway 2229, and further directs it to the first surface 2210 by the through holes in manifold passageway 2229. The same distribution pattern is used with each of the other 3 streams injected/collected in second surface 2220, as follows:

for the wash-1 stream: the wash-1 stream emanates from passageway 2211n on second surface 2220 and is directed by passageway 2224 to isoflow distributor 2230 which delivers sub-streams into manifold passageway 2229, and further directs it to the first surface 2210 by the through holes 2252 in manifold passageway 2229;

for the wash-2 stream: the wash-2 stream emanates from passageway 2211a on second surface 2220 and is directed by passageway 2221 to isoflow distributor 2225 which delivers the sub-streams into manifold passageway 2226, and further directs it to the first surface 2210 by the through holes 2250 in manifold passageway 2226; and for the retentate stream (collected from surface 2210 rather than distributed into surface 2210) the retentate stream emanates from the through holes 2250 in manifold passageway 2226, which are then directed into the entry-points of isoflow distributor 2227, and then onto passageway 2222, and out of surface 2220 through passageway 2211b.

Referring to FIG. 22C, an isoflow distributor 2240 includes a branched network of distribution passageways 2241-2244. Each branch effectively splits one stream into two sub-streams such that each of the two sub-streams has an almost identical flow rate. Isoflow distributor 2240 has four branches; first branch 2241 splits the single incoming stream into two sub-streams; second branch 2242 splits the two sub-streams emanating from branch 2241 into four sub-streams; third branch 2243 splits the four sub-streams emanating from branch 2242 into eight sub-streams; fourth branch 2244 splits the eight sub-streams emanating from branch 2243 into 16 sub-streams. In general, an isoflow distributor splits the incoming stream into $2^N$ sub-streams, the virtue of an isoflow distributor being that the hydraulic resistance through every flow path is identical to that of every other flow path, resulting in a nearly identical flow for every sub-stream independently of the dimensions of the passageways in each branch. This topological arrangement makes the flow distribution very uniform and reliable. In the case of the feed stream, wash-1 stream and wash-2 stream the isoflow distributors distribute the stream (i.e., splits the streams from one to many) and in the case of the retentate stream, the isoflow distributor collects the stream (i.e., consolidates many streams into a single stream).

It is appreciated that distribution and collection of the different streams use multiple levels of distribution/collection. In one embodiment, having five distribution levels the levels are arranged as follows:

1. $1^{st}$ level . . . from the feed/collection port to each stack of the cUTF module in passageways 2211.
2. $2^{nd}$ level . . . from passageways 2211 to passageways 2221, 2222, 2223 and 2224 on the second surface. In this embodiment there is only a single cUTF channel array

2216, which is why there is a single passageway connected to each one of the passageways 2211. However, in general, there are multiple cUTF channel arrays in a single stack, in which case there would be multiple passageways 2221, 2222, 2223 and 2224, each one splitting the main stream emanating from passageways 2211 into several 2221 (2222, 2223, 2224) passageways.

3. $3^{rd}$ level . . . from passageways 2221, 2222, 2223 and 2224 to isoflow distributors 2225, 2227, 2228 and 2229.
4. $4^{th}$ level . . . from each sub-stream generated by the isoflow distributors (in this embodiment, 16 sub-streams) to proximal manifolds 2226 and 2229, onto each one of the 64 through holes 2250 and 2252.
5. $5^{th}$ level . . . from each of the 64 through holes connecting proximal manifolds 2226 and 2229 to its corresponding proximal manifold on the first surface and on to the cUTF channels in the array of substantially similar channels.

It is understood that different designs will require more or less distribution levels, and more or less complexity in the distribution network, the number of levels being determined by the hydraulic resistance of the cUTF channels in comparison with the hydraulic resistance of the distribution passageways. In general, the shorter the channels and the larger the number of channel arrays in a single stack the more sophisticated the distribution network needs to be.

The sheet represented in FIG. 22A and FIG. 22B is fabricated by etching the front and back surfaces of a single glass wafer. The etching process carves out the grooves forming a glass sheet or plate having grooves on both surfaces. With etching methods the width of the channels can be easily varied, but the channel depth is not easy to vary, so with such methods grooves on a given surface have the same depth. In those embodiments the cUTF channels are formed by pressing the front surface of the etched glass plate against the membrane to obtain intimate contact between the first surface of the sheet or plate and the membrane, and the distribution channels are formed by bonding a solid or blank glass sheet/plate (i.e., a sheet/plate having n grooves) onto the second surface of the glass sheet/plate. In other embodiments the blank sheet may only be sealed against the second surface rather than bonded.

In other embodiments two different glass plates are used to form the first surface (the surface including the grooves forming the cUTF channel array) and the second surface (the surface including the grooves forming the distribution passageways), with grooves embedded on only one of the two surfaces of each sheet/plate. In these embodiments the distribution passageways are formed by bonding the two glass sheets/plates as follows: the front surface of the sheet having the grooves that form the distribution passageways is bonded onto the back surface of the sheet having the grooves that form the cUTF channel array (a blank surface). The virtue of these embodiments is that no other sheets are required to create the finished retentate plate.

It will be appreciated that other materials can be used to fabricate the plates/sheets, for example, metal plates and silicon plates. Also, plastics may be used, in which case they would be fabricated by molding methods. Plastic fabrication is more attractive due to its lower cost. To enable the reliable reproduction of the fine features required by cUTF channels (channels with depths smaller than about 150 μm, and possibly as small as about 10 to about 50 μm) plastic molding may require a fabrication method called coining. Coining is the method used to fabricate CD and DVD discs, requiring a combination of molding and embossing. It is capable of reproducing fine features as small as about 0.1 μm and is low cost, enabling the fabrication of plates for an economical cost per plate.

When planar membranes are used in conjunction with some embodiments disclosed herein, it is important to ensure that the channel height of the cUTF channel is reliably maintained especially during the recovery step, which requires that the membranes be in almost intimate contact with the retentate plate notwithstanding the typical variations in the thickness of the plates, variations that are of the same scale as the scale of the channels (about five to about 100 μm). To ensure such intimate contact with the retentate plate the planar cUTF module in certain embodiments uses internal compression chambers that compress the stacks. In these embodiments, cUTF channels are open without spacers that interfere with the build up and displacement of the BL.

The cUTF modules can also be fabricated with hollow fiber membranes having small lumens, with a diameter less than about 500 μm, and preferably less than about 150 μm. New configurations of hollow fiber modules having short channels (with dimensionless lengths less than about 1000 and preferably less than about 300) are required. Monolithic membranes can also be used, having short channel lengths and small effective channel height.

Figure 23:
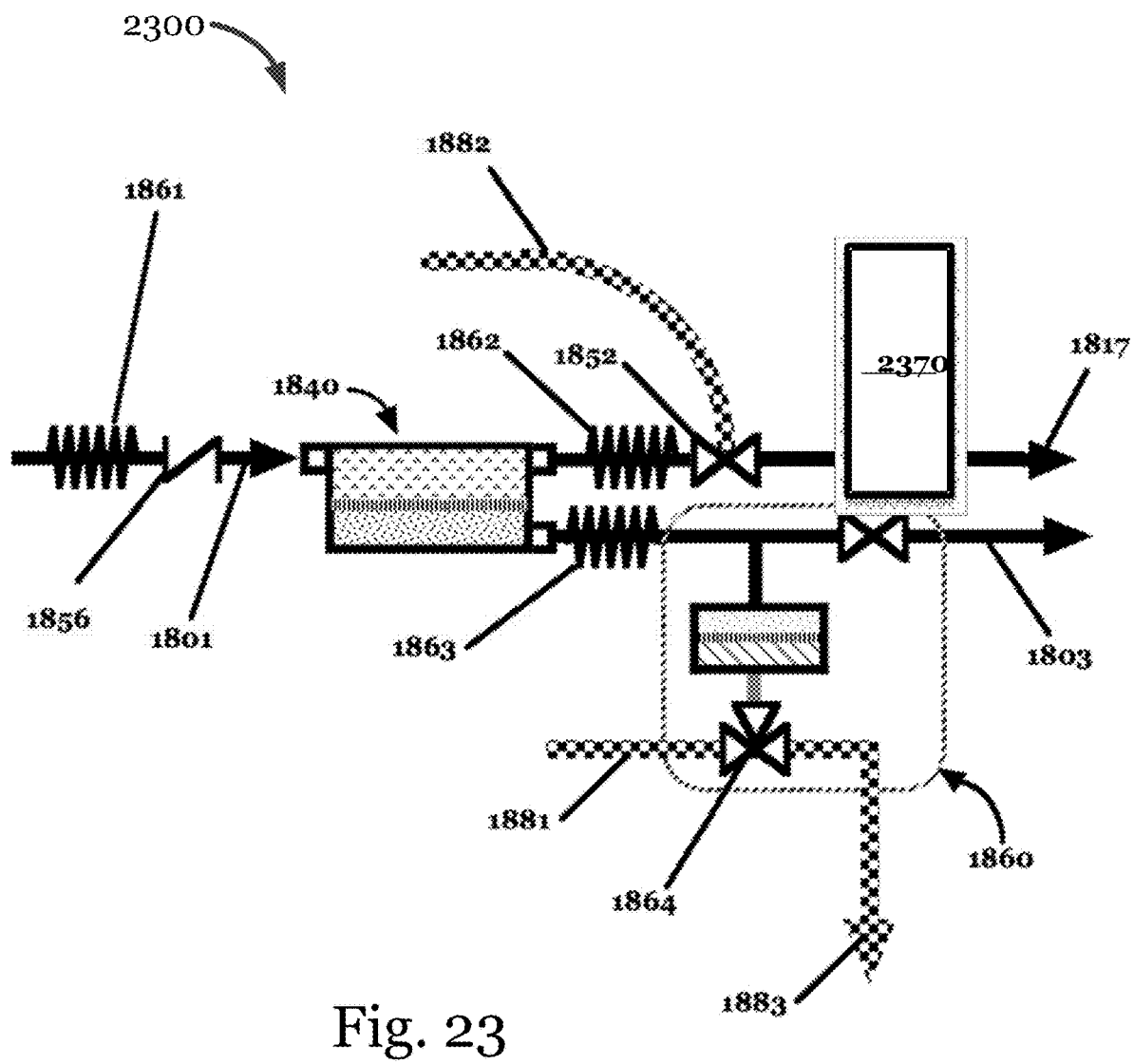
FIG. 23 is a P&I diagram of an exemplary cUTF CONC process with a retentate aliquot recovered by a retentate extractor according to embodiments disclosed herein.

FIG. 23 shows a P&I diagram 2300 of an exemplary cUTF concentration process with a recovery step similar to the process and instrumentation of FIG. 18. Here the retentate aliquot collector 1870 of FIG. 18 is replaced with a retentate extractor 2370. In some embodiments, retentate valve 1852, the hydraulic resistor 1862 and the retentate release valve 1871 are optional. In operation, the retentate extractor 2370 enables recovering a predetermined but adjustable constant volume of retentate aliquot on successive cycles independently of the viscosity of the retentate fraction. In one embodiment, the retentate extractor 2370 is a positive displacement pump. In this embodiment, the retentate extractor 2370 includes but is not limited to a precision stepper motor pump which is driven the same number of steps each cycle and a pulse width modulated (PWM) pump with a shaft encoder for precise control.

The retentate aliquot collector and the retentate extractor are positive means of ensuring that the volume of retentate aliquot is well defined and constant independent of other processing variables. The reliable recovery of a defined volume of retentate aliquot is important to rapidly establish steady state operation at the start of a filtration run and to maintain a steady operation throughout the filtration run. Without such reliable control the amount of retentate aliquot recovered would depend on other processing variables, for example, the viscosity of the retentate, processing pressures and temperature. Without positive volume control, a change in concentration factor may result in a corresponding change in the amount of retentate collected.

In one embodiment, stopping the retentate extractor 2370 is equivalent to closing the retentate release valve 1871. Recovering a retentate aliquot in is accomplished by operating the retentate extractor 2370 to recover a predetermined constant volume of retentate aliquot. This is done, for example, by a operating the a pump for a fixed amount of time, driving a pulse width modulated (PWM) pump with a fixed PWM signal or driving a stepper motor pump with a fixed number of steps each cycle.

In other embodiments a pulsating flow may be superimposed in the feed and wash streams. Pulsating flow induces mixing in the direction perpendicular to the bulk flow, thereby reducing mixing along the direction of bulk flow;

this is a well-known fluid mechanical phenomenon. Pulsating flow can be induced on the feed and wash stream directly by attaching a pulsating element onto the feed and/or wash lines (e.g., a piston or diaphragm assembly) or indirectly by pulsating a planar stack having compression chambers to compress the membrane against the retentate plate as described earlier. In the latter case the fluid used to compress the compression chamber would be pulsed at a desired frequency to induce pulsating flow within the stack.

Figure 24A:
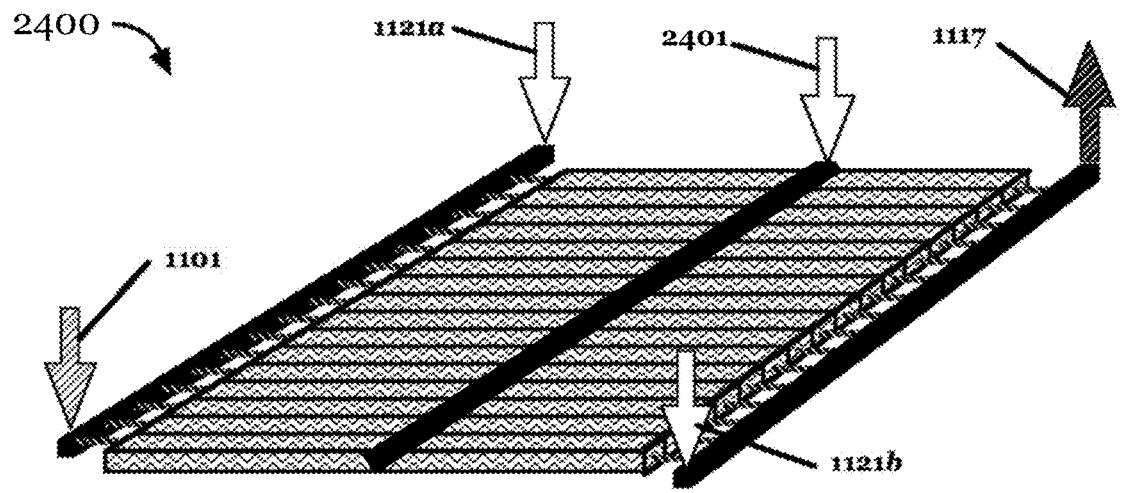
FIGS. 24A and 24B are schematic perspective views of a parallel array of cUTF channels including manifolds according to embodiments disclosed herein.
Figure 24B:
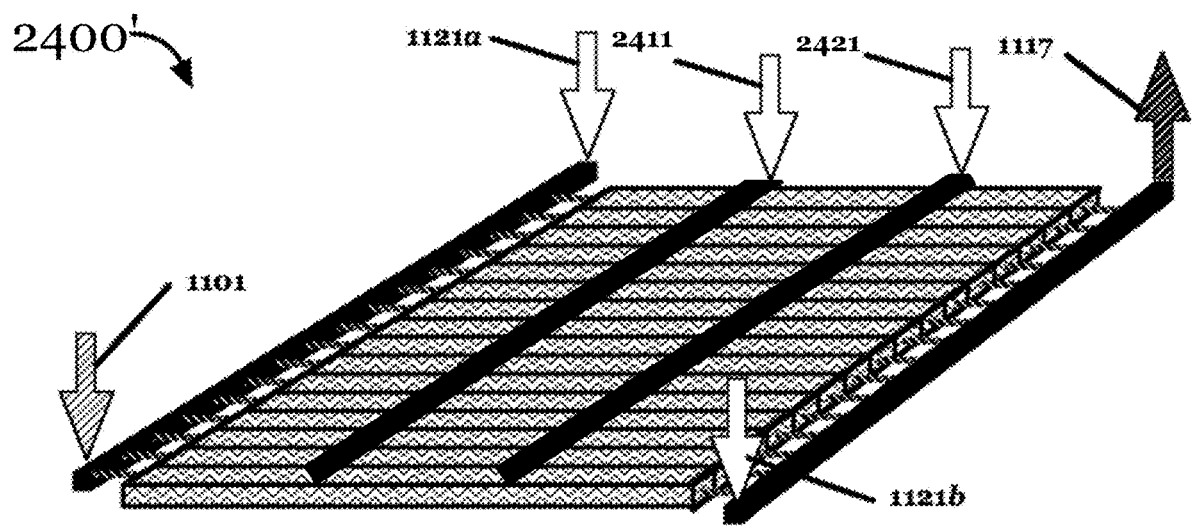

In other embodiments of cUTF washing modules comprise three or more wash streams. In this case the third, fourth, fifth, etc. wash streams are injected into the cUTF channels at a location intermediate between the feed end and retentate end of the cUTF channels. FIG. 24A is a perspective schematic view of a cUTF module 2400 similar to that shown in FIG. 11B, wherein there is a third wash stream located in the middle of the cUTF channel. In this embodiment, during the wash step, wash streams 1121a, 1121b are fed to the feed and retentate manifolds 1112 and 1118, respectively, whereas wash stream 2411 is fed near the middle of the cUTF channel. All three wash streams may be injected simultaneously or sequentially, or in a combination of simultaneous and sequential injections between the feed injection step and the retentate recovery step. FIG. 24B is a perspective schematic view of a cUTF module 2400' similar to that shown in FIG. 24A, further including a fourth wash stream 2421 located near the middle of the cUTF channel. In some embodiments more than four streams may be utilized. As shown above in FIG. 12B, large parallel channel arrays comprising three or more wash streams may benefit from isoflow distributors to obtain a more uniform fluid distribution compared to the simple straight distributors shown in FIGS. 24A and 24B. The isoflow distributors can also be used with the embodiments shown in FIGS. 24A and 24B.

In still other embodiments a multi-stage cUTF washing process is facilitated by recovering retentate aliquots smaller than the volume of the cUTF channel array combined with three or more wash streams. Referring back to FIG. 24A, in operation a two-stage washing process is affected as follows:
(1) feed stream 1101 is first fed to feed manifold 1112;
(2) wash streams 1121a, 2411 and 1121b are injected sequentially or simultaneously, or in a combination of sequential and simultaneous injections, into the cUTF array 1230; and
(3) a retentate stream 1117 is collected by retentate manifold 1118, here the retentate aliquot comprises about half of the volume of cUTF channel array 1230.
In this manner, the retentate is "shuttled" from the first half of the cUTF channel to the second half of the cUTF channel with washing steps in between each shuttling event, in effect washing the retentate stream twice. Therefore, a two-stage cUTF washing process can be affected with a wash stream in middle of the cUTF channel array; likewise a three-stage cUTF washing process would be affected with two wash streams in the middle of the cUTF channel array and so on. Multi-stage cUTF washing modules may also benefit from segregating the permeate compartment into multiple compartments in a manner corresponding to the location of the injection of the intermediate wash streams.

While the descriptions given have focused on the use of the invention for the recovery of retentate or permeate from a fluid, it is understood that these embodiments also are applicable to processes using ultrafiltration membranes used to separate molecular and cellular components in solution.

It is understood that although the embodiments described herein relate specifically to separations of interest in biomolecular applications, the principles, practice and designs described herein are also useful in other applications, including but not limited to the manufacture of vaccines and other macromolecules not necessarily of a biological nature.

All literature and similar material cited in this application, including, patents, patent applications, articles, books, treatises, dissertations and web pages, regardless of the format of such literature and similar materials, are expressly incorporated by reference in their entirety. In the event that one or more of the incorporated literature and similar materials differs from or contradicts this application, including defined terms, term usage, described techniques, or the like, this application controls.

The section headings used herein are for organizational purposes only and are not to be construed as limiting the subject matter described in any way. The descriptions and diagrams of the methods described herein can be performed in any suitable order unless otherwise indicated herein or otherwise clearly contradicted by context.

The claims should not be read as limited to the described order or elements unless stated to that effect. It should be understood that various changes in form and detail may be made without departing from the scope of the appended claims. Therefore, all embodiments that come within the scope and spirit of the following claims and equivalents thereto are claimed. The use of the terms "a" and "an" and "the" and similar referents in the context of describing the invention (especially in the context of the following claims) are to be construed to cover both the singular and the plural, unless otherwise indicated herein or clearly contradicted by context. The terms "including," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A cycling ultra-thin channel filtration (cUTF) system comprising
 a cUTF module comprising:
  first and second planar sheets,
  a planar filtration membrane, sandwiched between the first and second planar sheets, separating an interior of said cUTF module into a retentate compartment and a permeate compartment;

a feed port fluidly coupled to a first end of the retentate compartment;
a retentate port fluidly coupled to a second end of the retentate compartment;
a permeate port fluidly coupled to the permeate compartment;
a retentate extractor coupled to the retentate port;
a permeate pressurization valve coupled to the permeate port;
an array of substantially similar open channels, disposed between the planar membrane and at least one of the first and second planar sheets, having a feed end fluidly coupled to the feed port and a retentate end fluidly coupled to the retentate port;
a cycle controller controllably connected to the retentate extractor and the permeate pressurization valve;
wherein the cycle controller includes at least one of:
a timing circuit to control the retentate extractor and the permeate pressurization valve;
a load detector to control the retentate extractor and the permeate pressurization valve; and
a recovery detector to control the retentate extractor and the permeate pressurization valve; and
wherein the cycle controller operates a control program to open and close the permeate pressurization valve and start and stop the retentate extractor at least once during a cycle for a plurality of cycles to collect a boundary layer with minimum mixing.

2. The cUTF system of claim 1, wherein the retentate compartment further comprises:
a plurality of feed distribution passageways in fluid communication with the feed end of the array of substantially similar channels; and
a plurality of retentate distribution passageways in fluid communication with the retentate end of the array of substantially similar channels.

3. The cUTF system of claim 2, wherein each of the substantially similar channels has an effective channel height less than about 150 µm and a dimensionless length less than about 1000.

4. The cUTF system of claim 2, wherein the cUTF module further comprises:
at least one wash port and a corresponding wash shut-off valve connected to the cycle controller controllably coupling a wash source through a plurality of wash distribution passageways to at least one of:
the feed end of the array of substantially similar channels; and
the retentate end of the array of substantially similar channels.

5. The cUTF system of claim 2, wherein the plurality of feed distribution passageways and the plurality of retentate distribution passageways comprise isoflow distributors.

6. The cUTF system of claim 1 further comprising a permeate pressurizer fluidly coupled to the permeate port, the permeate pressurizer comprising a permeate accumulator fluidly coupled to the permeate port and coupled to a ventable pressure source and the permeate pressurization valve.

7. The cUTF system of claim 6, wherein the ventable pressure source comprises a pressure source coupled to the permeate accumulator through a three-way valve.

8. The cUTF system of claim 1, wherein the load detector comprises at least one sensor to detect a volume or a mass of a feed aliquot.

9. The cUTF system of claim 1, further comprising a retentate aliquot cavity having an adjustable constant volume and fluidly coupled to the retentate port.

10. A method of fractionation of a feed stream comprising:
providing a cycling ultra-thin channel filtration (cUTF) system comprising:
a cUTF module comprising:
first and second planar sheets,
a planar filtration membrane, sandwiched between the first and second planar sheets, separating an interior of said cUTF module into a retentate compartment having an array of substantially similar open channels and a permeate compartment;
a feed port fluidly coupled to a feed end of the array of substantially similar channels;
a retentate port fluidly coupled to a retentate end of the array of substantially similar channels;
a permeate port fluidly coupled to the permeate compartment;
a retentate extractor fluidly coupled to the retentate port;
a permeate pressurization valve fluidly coupled to the permeate port;
loading a feed aliquot of the feed stream into the cUTF module and inducing permeation of the feed stream to build a boundary layer by:
operating the retentate extractor to recover a predetermined constant volume of retentate aliquot;
opening the permeate pressurization valve; and
pressurizing the feed stream through the feed port;
closing the permeate pressurization valve stopping permeation at least once during a cycle, for a plurality of cycles to collect a boundary layer with minimum mixing; and
recovering a retentate aliquot from the retentate port by operating the retentate extractor to provide a positive volume control;
restarting and repeating the steps of loading, operating, opening, pressurizing, stopping and recovering steps; and
wherein the retentate extractor comprises a precision positive displacement pump.

11. The method of claim 10 wherein stopping permeation further comprises pressurizing the permeate compartment to rapidly stop permeation.

12. The method of claim 10 wherein recovering a retentate aliquot further comprises inducing reverse permeation to displace the boundary layer with minimal mixing by one of:
no injection of the feed stream; and
a small controlled injection of the feed stream.

13. The method of claim 12 further comprising recovering a predetermined constant volume of retentate aliquot on successive cycles.

14. The method of claim 10, wherein inducing reverse permeation further comprises one of:
injecting the feed stream during reverse permeation; and
injecting a wash stream at a feed end of the cUTF module during reverse permeation.

15. The method of claim 10 further comprising washing a built up boundary layer between the steps of loading and stopping permeation.

16. The method of claim 15 wherein washing comprises washing on the feed end of the cUTF module followed by washing on the retentate end on each cycle of the cUTF module.

17. The method of claim 10, further comprising:
controlling a volume of the feed aliquot by controlling in a continuous rapid cycling process one of:
an elapsed time of loading a feed aliquot;
a volume or mass of the feed stream injected;
a volume of a permeate stream generated during a loading step; and
controlling the volume of the retentate aliquot collected during a recovery step by controlling in a continuous rapid cycling process one of:
an elapsed time of recovering a retentate aliquot;
a volume or mass of the retentate aliquot extracted during the recovery step; and
a concentration on the retentate stream collected during the recovery step.

18. The method of claim 10 further comprising distributing the feed aliquot substantially equally across each of the array of substantially similar channels by using an isoflow distributor.

19. The cUTF system of claim 1, wherein the retentate extractor comprises a precision positive displacement pump.

\* \* \* \* \*